US008438500B2

(12) United States Patent
Rapp et al.

(10) Patent No.: US 8,438,500 B2
(45) Date of Patent: May 7, 2013

(54) DEVICE, METHOD, AND GRAPHICAL USER INTERFACE FOR MANIPULATION OF USER INTERFACE OBJECTS WITH ACTIVATION REGIONS

(75) Inventors: Peter William Rapp, Pittsburgh, PA (US); Akiva Dov Leffert, San Francisco, CA (US); Jason Robert Marr, Cupertino, CA (US); Christopher Douglas Weeldreyer, San Carlos, CA (US); Jay Christopher Capela, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 522 days.

(21) Appl. No.: 12/567,697

(22) Filed: Sep. 25, 2009

(65) Prior Publication Data

US 2011/0078597 A1  Mar. 31, 2011

(51) Int. Cl.
*G06F 3/048* (2006.01)
*G06F 3/041* (2006.01)

(52) U.S. Cl.
USPC .......................... 715/810; 715/800; 715/765

(58) Field of Classification Search .................. 715/800, 715/810
See application file for complete search history.

(56) References Cited

U.S. PATENT DOCUMENTS

| 5,513,309 | A | 4/1996 | Meier et al. .................. 395/155 |
| 5,565,894 | A | 10/1996 | Bates et al. |
| 5,627,567 | A | 5/1997 | Davidson |
| 5,649,133 | A | 7/1997 | Arquié ......................... 395/348 |
| 5,757,358 | A | 5/1998 | Osaga |
| 5,936,625 | A | 8/1999 | Kahl et al. |
| 5,946,647 | A | 8/1999 | Miller et al. |
| 6,075,537 | A * | 6/2000 | Adapathya et al. ........... 715/760 |
| 6,249,290 | B1 | 6/2001 | Herndon et al. |
| 6,717,600 | B2 * | 4/2004 | Dutta et al. ................... 715/862 |
| 6,989,847 | B2 * | 1/2006 | Konar et al. .................. 715/858 |
| 7,075,512 | B1 | 7/2006 | Fabre et al. |
| 7,103,852 | B2 | 9/2006 | Kairis, Jr. |
| 7,164,410 | B2 | 1/2007 | Kupka |
| 7,197,718 | B1 | 3/2007 | Westerman et al. |

(Continued)

OTHER PUBLICATIONS

International Search Report and Written Opinion dated Nov. 29, 2010, received in International Application No. PCT/US2010/047433, which corresponds to U.S. Appl. No. 12/567,697.

(Continued)

*Primary Examiner* — Omar Abdul-Ali
*Assistant Examiner* — Haimei Jiang
(74) *Attorney, Agent, or Firm* — Morgan, Lewis & Bockius LLP

(57) ABSTRACT

A computing device with a display simultaneously displays a plurality of user interface objects, a currently selected user interface object, and a plurality of resizing handles for the currently selected user interface object. Each respective resizing handle has a corresponding handle activation region with a default position relative to the respective resizing handle, a default size, and a default shape. The device detects a first input on a first handle activation region for a first resizing handle in the plurality of resizing handles. In response to detecting the first input, the device: resizes the currently selected user interface object, and for at least one resizing handle in the plurality of resizing handles, modifies a corresponding handle activation region by changing the position of the handle activation region relative to the resizing handle from the default position to a modified position.

22 Claims, 52 Drawing Sheets

U.S. PATENT DOCUMENTS

| | | | |
|---|---|---|---|
| 7,213,214 B2 | 5/2007 | Baar et al | |
| 7,489,306 B2 | 2/2009 | Kolmykov-Zotov et al. | |
| 7,546,550 B1 * | 6/2009 | Buck | 715/834 |
| 7,614,008 B2 | 11/2009 | Ording | 715/773 |
| 7,694,290 B2 | 4/2010 | Liu et al. | |
| 7,747,958 B2 | 6/2010 | Luo et al. | |
| 7,814,055 B2 | 10/2010 | Hullot et al. | |
| 8,051,380 B2 | 11/2011 | Knapp et al. | |
| 8,166,409 B2 | 4/2012 | Koike et al. | |
| 2005/0024322 A1 * | 2/2005 | Kupka | 345/156 |
| 2005/0039142 A1 | 2/2005 | Jalon et al. | |
| 2005/0132291 A1 | 6/2005 | Wagner et al. | |
| 2006/0132460 A1 * | 6/2006 | Kolmykov-Zotov et al. | 345/173 |
| 2006/0195790 A1 | 8/2006 | Beaupre et al. | |
| 2007/0097151 A1 | 5/2007 | Rosenberg | |
| 2007/0152980 A1 * | 7/2007 | Kocienda et al. | 345/173 |
| 2008/0022225 A1 | 1/2008 | Erl | |
| 2008/0077871 A1 * | 3/2008 | Baar et al. | 715/762 |
| 2008/0165148 A1 * | 7/2008 | Williamson et al. | 345/173 |
| 2008/0177782 A1 | 7/2008 | Poston et al. | |
| 2008/0252661 A1 | 10/2008 | Hilton | |
| 2008/0273813 A1 * | 11/2008 | Takashima | 382/284 |
| 2009/0007122 A1 | 1/2009 | Peyton et al. | |
| 2009/0073132 A1 | 3/2009 | Lee et al. | |
| 2009/0083665 A1 * | 3/2009 | Anttila et al. | 715/834 |
| 2009/0164936 A1 * | 6/2009 | Kawaguchi | 715/788 |
| 2009/0217206 A1 * | 8/2009 | Liu et al. | 715/846 |
| 2009/0265656 A1 * | 10/2009 | Jetha et al. | 715/781 |
| 2009/0319935 A1 * | 12/2009 | Figura | 715/773 |
| 2010/0058226 A1 | 3/2010 | Flake et al. | |
| 2010/0073565 A1 * | 3/2010 | Hwang et al. | 348/564 |
| 2010/0262907 A1 * | 10/2010 | Shoemaker et al. | 715/702 |
| 2010/0325529 A1 * | 12/2010 | Sun | 715/234 |
| 2011/0074697 A1 | 3/2011 | Rapp et al. | |
| 2012/0056840 A1 * | 3/2012 | Benko et al. | 345/173 |
| 2012/0206497 A1 | 8/2012 | Sarjanoja | |

OTHER PUBLICATIONS

Office Action dated Oct. 15, 2012, received in U.S. Appl. No. 12/788,280, 13 pages (van Os).

Notice of Allowance dated Aug. 22, 2012, received in U.S. Appl. No. 12/567,699, 10 pages (Rapp).

Notice of Allowance dated Sep. 12, 2012, received in U.S. Appl. No. 12/567,700, 10 pages (Rapp).

* cited by examiner

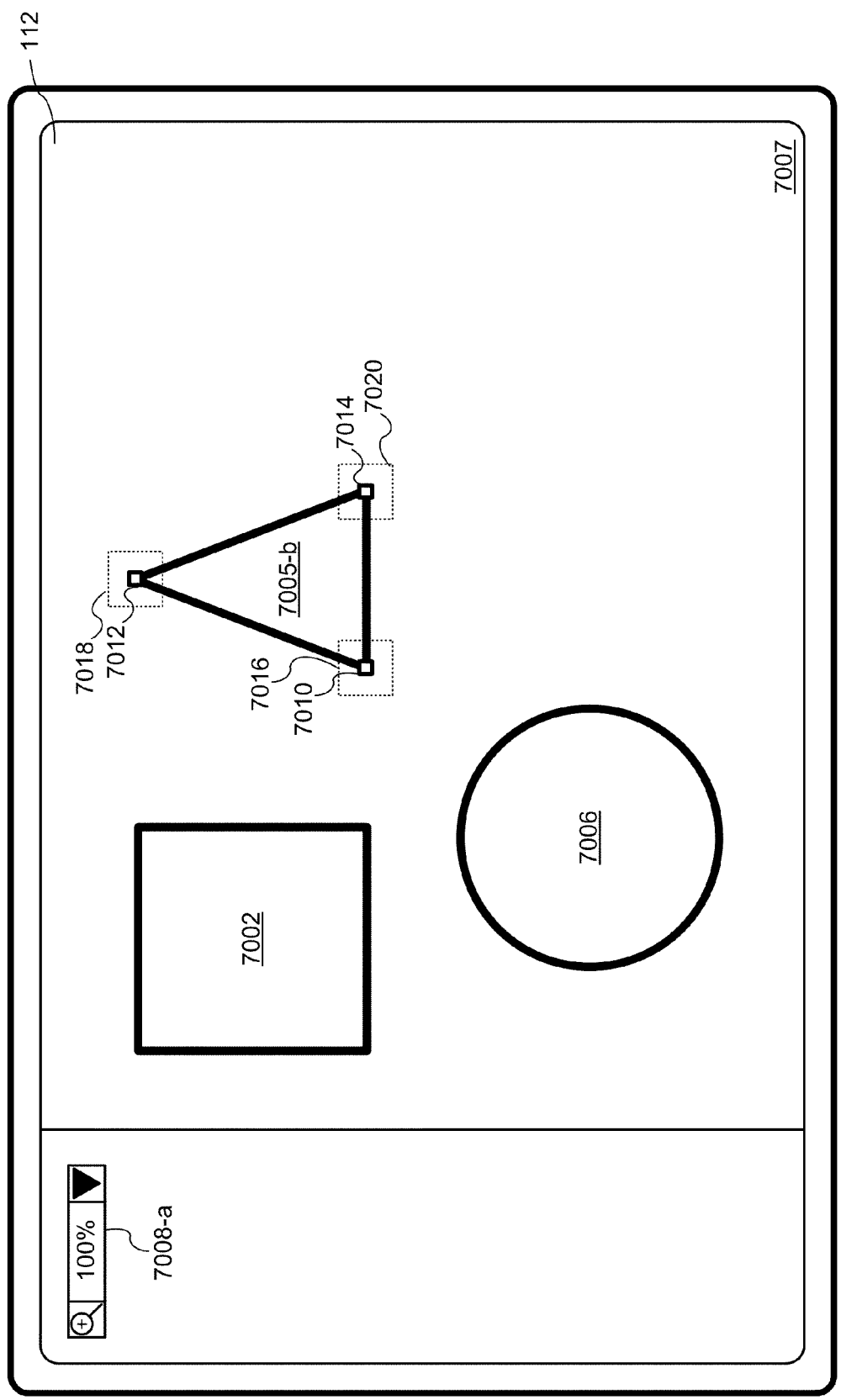

DEVICE, METHOD, AND GRAPHICAL USER INTERFACE FOR MANIPULATION OF USER INTERFACE OBJECTS WITH ACTIVATION REGIONS

RELATED APPLICATIONS

This application is related to the following applications: (1) U.S. patent application Ser. No. 12/567,699, "Device, Method, and Graphical User Interface for Manipulation of User Interface Objects with Activation Regions," filed Sep. 25, 2009; and (2) U.S. patent application Ser. No. 12/567,700, "Device, Method, and Graphical User Interface for Manipulation of User Interface Objects with Activation Regions," filed Sep. 25, 2009, which are incorporated herein by reference in their entirety.

TECHNICAL FIELD

The disclosed embodiments relate generally to electronic computing devices with touch-sensitive surfaces, and more particularly, to electronic computing devices with touch-sensitive surfaces that are operable to manipulate user interface objects displayed on a display of the electronic computing device.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include adjusting the position, rotation, and/or size of one or more user interface objects. Exemplary user interface objects include digital images, video, text, icons, and other graphics. A user may need to perform such manipulations on user interface objects in, an electronic document authoring application such as a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), or a spreadsheet application (e.g., Numbers from Apple Inc. of Cupertino, Calif.).

But existing methods for performing these manipulations are cumbersome and inefficient. For example, handle activation regions for resizing handles may be shaped and positioned such that it is difficult to accurately select a desired resizing handle, and thus a user must perform additional steps such as manually increasing the magnification level of the display to accurately select the resizing handle. Similarly, even if the desired resizing handle is selected, a user may wish to precisely reposition the resizing handle, and must perform additional steps such as manually increasing the magnification level of the display to accurately reposition the resizing handle. Existing manipulations are tedious and create a significant cognitive burden on a user. In addition, existing methods take longer than necessary, thereby wasting energy. This latter consideration is particularly important in battery-operated devices.

Accordingly, there is a need for computing devices with faster, more efficient methods and interfaces for more accurately manipulating user interface objects, while minimizing the number of user inputs required to perform the user interface object manipulation tasks. Such methods and interfaces may complement or replace conventional methods for manipulating user interface objects. Such methods and interfaces reduce the cognitive burden on a user and produce a more efficient human-machine interface. For battery-operated computing devices, such methods and interfaces conserve power and increase the time between battery charges.

SUMMARY

The above deficiencies and other problems associated with user interfaces for computing devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a method is performed at a computing device with a display. The method includes simultaneously displaying on the display: a plurality of user interface objects, wherein at least some of the user interface objects are configured to be resizable; a currently selected user interface object; and a plurality of resizing handles for the currently selected user interface object, wherein each respective resizing handle has a corresponding handle activation region with a default position relative to the respective resizing handle, a default size, and a default shape. The method further includes detecting a first input on a first handle activation region for a first resizing handle in the plurality of resizing handles; and in response to detecting the first input: resizing the currently selected user interface object. The method additionally includes, for at least one resizing handle in the plurality of resizing handles, modifying a corresponding handle activation region by changing the position of the handle activation region relative to the resizing handle from the default position to a modified position.

In accordance with some embodiments, a graphical user interface on a computing device with a display, a memory, and one or more processors to execute one or more programs stored in the memory includes a plurality of user interface objects, wherein at least some of the user interface objects are configured to be resizable; a currently selected user interface object; and a plurality of resizing handles for the currently selected user interface object, wherein each respective resizing handle has a corresponding handle activation region with a default position relative to the respective resizing handle, a default size, and a default shape. A first input is detected on a first handle activation region for a first resizing handle in the plurality of resizing handles. In response to detecting the first input: the currently selected user interface object is resized;

and for at least one resizing handle in the plurality of resizing handles, a corresponding handle activation region is modified by changing the position of the handle activation region relative to the resizing handle from the default position to a modified position.

In accordance with some embodiments, a computing device includes a display, one or more processors, memory, and one or more programs. The one or more programs are stored in the memory and configured to be executed by the one or more processors. The one or more programs include instructions for: simultaneously displaying on the display: a plurality of user interface objects, wherein at least some of the user interface objects are configured to be resizable; a currently selected user interface object; and a plurality of resizing handles for the currently selected user interface object, wherein each respective resizing handle has a corresponding handle activation region with a default position relative to the respective resizing handle, a default size, and a default shape. The one or more programs also include instructions for detecting a first input on a first handle activation region for a first resizing handle in the plurality of resizing handles; and in response to detecting the first input: resizing the currently selected user interface object; and for at least one resizing handle in the plurality of resizing handles, modifying a corresponding handle activation region by changing the position of the handle activation region relative to the resizing handle from the default position to a modified position.

In accordance with some embodiments, a computer readable storage medium has stored therein instructions which when executed by a computing device with a display, cause the device to: simultaneously display on the display: a plurality of user interface objects, wherein at least some of the user interface objects are configured to be resizable; a currently selected user interface object; and a plurality of resizing handles for the currently selected user interface object, wherein each respective resizing handle has a corresponding handle activation region with a default position relative to the respective resizing handle, a default size, and a default shape. The instructions, when executed, further cause the device to detect a first input on a first handle activation region for a first resizing handle in the plurality of resizing handles; and in response to detecting the first input: resize the currently selected user interface object; and for at least one resizing handle in the plurality of resizing handles, modify a corresponding handle activation region by changing the position of the handle activation region relative to the resizing handle from the default position to a modified position.

In accordance with some embodiments, a computing device includes: a display; means for simultaneously displaying on the display: a plurality of user interface objects, wherein at least some of the user interface objects are configured to be resizable; a currently selected user interface object; and a plurality of resizing handles for the currently selected user interface object, wherein each respective resizing handle has a corresponding handle activation region with a default position relative to the respective resizing handle, a default size, and a default shape. The device further includes means for detecting a first input on a first handle activation region for a first resizing handle in the plurality of resizing handles; and means, responsive to detecting the first input, for: resizing the currently selected user interface object; and for at least one resizing handle in the plurality of resizing handles, modifying a corresponding handle activation region by changing the position of the handle activation region relative to the resizing handle from the default position to a modified position.

In accordance with some embodiments, an information processing apparatus for use in a computing device with a display includes: means for simultaneously displaying on the display: a plurality of user interface objects, wherein at least some of the user interface objects are configured to be resizable; a currently selected user interface object; and a plurality of resizing handles for the currently selected user interface object, wherein each respective resizing handle has a corresponding handle activation region with a default position relative to the respective resizing handle, a default size, and a default shape. The apparatus further includes means for detecting a first input on a first handle activation region for a first resizing handle in the plurality of resizing handles; and means, responsive to detecting the first input, for: resizing the currently selected user interface object; and for at least one resizing handle in the plurality of resizing handles, modifying a corresponding handle activation region by changing the position of the handle activation region relative to the resizing handle from the default position to a modified position.

In accordance with some embodiments, a method is performed at a computing device with a touch screen display. The method includes: simultaneously displaying a plurality of user-repositionable user interface objects. Each user interface object includes one or more activation regions. The method further includes receiving a first input from the user at a position on the touch screen that corresponds to at least one of the activation regions; and based at least in part on the first input, determining a first plurality of candidate actions. Each candidate action is associated with one of the user interface objects and the candidate actions are ordered in accordance with a first ordering. The method further includes performing a first candidate action of the first plurality of candidate actions as determined in accordance with the first ordering; after performing the first candidate action, receiving a second input that corresponds to a request to undo the first candidate action; in response to the second input, undoing the first candidate action. The method additionally includes receiving a third input that is a repetition of the first input and determining, based at least in part on the third input, a second plurality of candidate actions associated with one or more of the plurality of user interface objects. The second plurality of candidate actions are ordered in accordance with a second ordering that is different from the first ordering. A second candidate action in the second plurality of candidate actions is distinct from the first candidate action and has a higher position than the first candidate action in the second ordering. The method further includes performing the second candidate action.

In accordance with some embodiments, a graphical user interface on a computing device with a touch screen display, a memory, and one or more processors to execute one or more programs stored in the memory includes a plurality of user-repositionable user interface objects, wherein each user interface object includes one or more activation regions. A first input is received from the user at a position on the touch screen that corresponds to at least one of the activation regions. Based at least in part on the first input, a first plurality of candidate actions is determined. Each candidate action is associated with one of the user interface objects and the candidate actions are ordered in accordance with a first ordering. A first candidate action of the first plurality of candidate actions, as determined in accordance with the first ordering, is performed. After performing the first candidate action, a second input is received that corresponds to a request to undo the first candidate action. In response to the second input, the first candidate action is undone. A third input that is a repetition of the first input is received. Based at least in part on the third input, a second plurality of candidate actions associated with one or more of the plurality of user interface objects is determined. The second plurality of candidate actions are ordered in accordance with a second ordering that is different from the first ordering. A second candidate action in the second plurality of candidate actions is distinct from the first candidate action and has a higher position than the first candidate action in the second ordering. The second candidate action is performed.

In accordance with some embodiments, a computing device includes a touch screen display, one or more processors, memory, and one or more programs. The one or more programs are stored in the memory and configured to be executed by the one or more processors. The one or more programs include instructions for simultaneously displaying a plurality of user-repositionable user interface objects. Each user interface object includes one or more activation regions. The one or more programs further include instructions for receiving a first input from the user at a position on the touch screen that corresponds to at least one of the activation regions; and based at least in part on the first input, determining a first plurality of candidate actions. Each candidate action is associated with one of the user interface objects and the candidate actions are ordered in accordance with a first ordering. The one or more programs additionally include instructions for performing a first candidate action of the first plurality of candidate actions as determined in accordance with the first ordering and after performing the first candidate action, receiving a second input that corresponds to a request to undo the first candidate action. The one or more programs further include instructions for, in response to the second input, undoing the first candidate action. The one or more programs additionally include instructions for receiving a third input that is a repetition of the first input; and determining, based at least in part on the third input, a second plurality of candidate actions associated with one or more of the plurality of user interface objects. The second plurality of candidate actions are ordered in accordance with a second ordering that is different from the first ordering. A second candidate action in the second plurality of candidate actions is distinct from the first candidate action and has a higher position than the first candidate action in the second. The one or more programs additionally include instructions for performing the second candidate action.

In accordance with some embodiments, a computer readable storage medium has stored therein instructions which when executed by a computing device with a touch screen display cause the device to simultaneously display a plurality of user-repositionable user interface objects. Each user interface object includes one or more activation regions. The instructions also cause the device to receive a first input from the user at a position on the touch screen that corresponds to at least one of the activation regions; and based at least in part on the first input, determine a first plurality of candidate actions. Each candidate action is associated with one of the user interface objects and the candidate actions are ordered in accordance with a first ordering. The instructions further cause the device to perform a first candidate action of the first plurality of candidate actions as determined in accordance with the first ordering; and after performing the first candidate action, receive a second input that corresponds to a request to undo the first candidate action. The instructions also cause the device to, in response to the second input, undo the first candidate action. The instructions further cause the device to receive a third input that is a repetition of the first input and determine, based at least in part on the third input, a second plurality of candidate actions associated with one or more of the plurality of user interface objects. The second plurality of candidate actions are ordered in accordance with a second ordering that is different from the first ordering. A second candidate action in the second plurality of candidate actions is distinct from the first candidate action and has a higher position than the first candidate action in the second ordering. The instructions further cause the device to perform the second candidate action.

In accordance with some embodiments, a computing device includes: a touch screen display; means for simultaneously displaying a plurality of user-repositionable user interface objects. Each user interface object includes one or more activation regions. The device further includes means for receiving a first input from the user at a position on the touch screen that corresponds to at least one of the activation regions; and means for, based at least in part on the first input, determining a first plurality of candidate actions. Each candidate action is associated with one of the user interface objects and the candidate actions are ordered in accordance with a first ordering. The device additionally includes means for performing a first candidate action of the first plurality of candidate actions as determined in accordance with the first ordering; and means for, after performing the first candidate action, receiving a second input that corresponds to a request to undo the first candidate action. The device further includes means, responsive to the second input, for undoing the first candidate action. The device additionally includes means for receiving a third input that is a repetition of the first input and means for determining, based at least in part on the third input, a second plurality of candidate actions associated with one or more of the plurality of user interface objects. The second plurality of candidate actions are ordered in accordance with a second ordering that is different from the first ordering. A second candidate action in the second plurality of candidate actions is distinct from the first candidate action and has a higher position than the first candidate action in the second ordering. The device additionally includes means for performing the second candidate action.

In accordance with some embodiments, an information processing apparatus for use in a computing device with a touch screen display includes: means for simultaneously displaying a plurality of user-repositionable user interface objects. Each user interface object includes one or more activation regions. The apparatus further includes means for receiving a first input from the user at a position on the touch screen that corresponds to at least one of the activation regions; and means for, based at least in part on the first input, determining a first plurality of candidate actions. Each candidate action is associated with one of the user interface objects and the candidate actions are ordered in accordance with a first ordering. The apparatus additionally includes means for performing a first candidate action of the first plurality of candidate actions as determined in accordance with the first ordering; and means for, after performing the first candidate action, receiving a second input that corresponds to a request to undo the first candidate action. The apparatus further includes means, responsive to the second input, for undoing the first candidate action. The apparatus additionally includes means for receiving a third input that is a repetition of the first input and means for determining, based at least in part on the third input, a second plurality of candidate actions associated with one or more of the plurality of user interface objects. The second plurality of candidate actions are ordered in accordance with a second ordering that is different from the first ordering. A second candidate action in the second plurality of candidate actions is distinct from the first candidate action and has a higher position than the first candidate action in the second ordering. The apparatus additionally includes means for performing the second candidate action.

In accordance with some embodiments, a method is performed at a computing device with a touch screen display. The method includes simultaneously displaying a plurality of user-repositionable user interface objects. Each user interface object includes one or more activation regions. The method further includes receiving a first input from the user at a position on the touch screen that corresponds to at least one of the activation regions; and based at least in part on the first input, determining a first plurality of candidate actions. Each candidate action is associated with one of the user interface objects and the candidate actions are ordered in accordance with a first ordering. The method additionally includes performing a first candidate action of the first plurality of candidate actions as determined in accordance with the first ordering; and after performing the first candidate action, receiving a second input that is a repetition of the first input. The method further includes in response to the second input: undoing the first candidate action; determining, based at least in part on the second input, a second plurality of candidate actions associated with one or more of the plurality of user interface objects, wherein the second plurality of candidate actions are ordered in accordance with a second ordering that is different from the first ordering; wherein a second candidate action in the second plurality of candidate actions is distinct from the first candidate action and has a higher position than the first candidate action in the second ordering; and performing the second candidate action.

In accordance with some embodiments, a graphical user interface on a computing device with a touch screen display, a memory, and one or more processors to execute one or more programs stored in the memory includes a plurality of user-repositionable user interface objects. Each user interface object includes one or more activation regions. A first input is received from the user at a position on the touch screen that corresponds to at least one of the activation regions. Based at least in part on the first input, a first plurality of candidate actions is determined. Each candidate action is associated with one of the user interface objects and the candidate actions are ordered in accordance with a first ordering. A first candidate action of the first plurality of candidate actions, as determined in accordance with the first ordering, is performed. After performing the first candidate action, a second input that is a repetition of the first input is received. In response to the second input: the first candidate action is undone; based at least in part on the second input, a second plurality of candidate actions associated with one or more of the plurality of user interface objects is determined, wherein the second plurality of candidate actions are ordered in accordance with a second ordering that is different from the first ordering; wherein a second candidate action in the second plurality of candidate actions is distinct from the first candidate action and has a higher position than the first candidate action in the second ordering; and the second candidate action is performed.

In accordance with some embodiments, a computing device includes a touch screen display, one or more processors, memory, and one or more programs. The one or more programs are stored in the memory and configured to be executed by the one or more processors. The one or more programs include instructions for simultaneously displaying a plurality of user-repositionable user interface objects. Each user interface object includes one or more activation regions. The one or more programs further include instructions for receiving a first input from the user at a position on the touch screen that corresponds to at least one of the activation regions; and based at least in part on the first input, determining a first plurality of candidate actions. Each candidate action is associated with one of the user interface objects and the candidate actions are ordered in accordance with a first ordering. The one or more programs additionally include instructions for performing a first candidate action of the first plurality of candidate actions as determined in accordance with the first ordering; and after performing the first candidate action, receiving a second input that is a repetition of the first input. The one or more programs further include instructions for, in response to the second input: undoing the first candidate action; determining, based at least in part on the second input, a second plurality of candidate actions associated with one or more of the plurality of user interface objects, wherein the second plurality of candidate actions are ordered in accordance with a second ordering that is different from the first ordering; wherein a second candidate action in the second plurality of candidate actions is distinct from the first candidate action and has a higher position than the first candidate action in the second ordering; and performing the second candidate action.

In accordance with some embodiments, a computer readable storage medium has stored therein instructions which when executed by a computing device with a touch screen display, cause the device to simultaneously display a plurality of user-repositionable user interface objects. Each user interface object includes one or more activation regions. The instructions further cause the device to receive a first input from the user at a position on the touch screen that corresponds to at least one of the activation regions; and based at least in part on the first input, determine a first plurality of candidate actions. Each candidate action is associated with one of the user interface objects and the candidate actions are ordered in accordance with a first ordering. The instructions also cause the device to perform a first candidate action of the first plurality of candidate actions as determined in accordance with the first ordering; and after performing the first candidate action, receive a second input that is a repetition of the first input. The instructions further cause the device to in response to the second input: undo the first candidate action; determine, based at least in part on the second input, a second plurality of candidate actions associated with one or more of the plurality of user interface objects, wherein the second plurality of candidate actions are ordered in accordance with a second ordering that is different from the first ordering; wherein a second candidate action in the second plurality of candidate actions is distinct from the first candidate action and has a higher position than the first candidate action in the second ordering; and perform the second candidate action.

In accordance with some embodiments, a computing device includes: a touch screen display; means for simultaneously displaying a plurality of user-repositionable user interface objects. Each user interface object includes one or more activation regions; means for receiving a first input from the user at a position on the touch screen that corresponds to at least one of the activation regions. The device also includes means for, based at least in part on the first input, determining a first plurality of candidate actions. Each candidate action is associated with one of the user interface objects and the candidate actions are ordered in accordance with a first ordering. The device further includes means for performing a first candidate action of the first plurality of candidate actions as determined in accordance with the first ordering; and means for, after performing the first candidate action, receiving a second input that is a repetition of the first input. The device further includes means, responsive to the second input, for:

undoing the first candidate action; determining, based at least in part on the second input, a second plurality of candidate actions associated with one or more of the plurality of user interface objects, wherein the second plurality of candidate actions are ordered in accordance with a second ordering that is different from the first ordering; wherein a second candidate action in the second plurality of candidate actions is distinct from the first candidate action and has a higher position than the first candidate action in the second ordering; and performing the second candidate action.

In accordance with some embodiments, an information processing apparatus for use in a computing device with a touch screen display includes: means for simultaneously displaying a plurality of user-repositionable user interface objects. Each user interface object includes one or more activation regions; means for receiving a first input from the user at a position on the touch screen that corresponds to at least one of the activation regions. The apparatus also includes means for, based at least in part on the first input, determining a first plurality of candidate actions. Each candidate action is associated with one of the user interface objects and the candidate actions are ordered in accordance with a first ordering. The apparatus further includes means for performing a first candidate action of the first plurality of candidate actions as determined in accordance with the first ordering; and means for, after performing the first candidate action, receiving a second input that is a repetition of the first input. The apparatus further includes means, responsive to the second input, for: undoing the first candidate action; determining, based at least in part on the second input, a second plurality of candidate actions associated with one or more of the plurality of user interface objects, wherein the second plurality of candidate actions are ordered in accordance with a second ordering that is different from the first ordering; wherein a second candidate action in the second plurality of candidate actions is distinct from the first candidate action and has a higher position than the first candidate action in the second ordering; and performing the second candidate action.

In accordance with some embodiments, a method is performed at a computing device with a touch screen display. The method includes simultaneously displaying on the touch screen display: a plurality of user interface objects displayed at a first magnification level in a display area; a currently selected user interface object; and a plurality of handles for the currently selected user interface object. Each handle has a corresponding handle activation region. The method further includes detecting a first contact at a first location on the touch screen display that corresponds to a first handle activation region for a first handle in the plurality of handles; continuing to detect the first contact at the first location for a predefined amount of time; and in response to continuing to detect the first contact at the first location for the predefined amount of time, zooming the display area to a second magnification level. The second magnification level is greater than the first magnification level. The method additionally includes, while the display area is at the second magnification level: detecting a movement of the first contact across the touch screen display; moving the first handle to a second location in the display area in accordance with the detected movement of the first contact; and detecting liftoff of the first contact. The method further includes, in response to detecting liftoff of the first contact, zooming the display area to the first magnification level.

In accordance with some embodiments, a graphical user interface on a computing device with a touch screen display, a memory, and one or more processors to execute one or more programs stored in the memory includes a plurality of user interface objects displayed at a first magnification level in a display area; a currently selected user interface object; and a plurality of handles for the currently selected user interface object. Each handle has a corresponding handle activation region. A first contact is detected at a first location on the touch screen display that corresponds to a first handle activation region for a first handle in the plurality of handles. The first contact continues to be detected at the first location for a predefined amount of time. In response to continuing to detect the first contact at the first location for the predefined amount of time, the display area is zoomed to a second magnification level. The second magnification level is greater than the first magnification level. While the display area is at the second magnification level: a movement of the first contact is detected across the touch screen display; the first handle is moved to a second location in the display area in accordance with the detected movement of the first contact; and liftoff of the first contact is detected. In response to detecting liftoff of the first contact, the display area is zoomed to the first magnification level.

In accordance with some embodiments, a computing device includes a touch screen display, one or more processors, memory, and one or more programs. The one or more programs are stored in the memory and configured to be executed by the one or more processors. The one or more programs include instructions for simultaneously displaying on the touch screen display: a plurality of user interface objects displayed at a first magnification level in a display area; a currently selected user interface object; and a plurality of handles for the currently selected user interface object. Each handle has a corresponding handle activation region. The one or more programs further include instructions for: detecting a first contact at a first location on the touch screen display that corresponds to a first handle activation region for a first handle in the plurality of handles; continuing to detect the first contact at the first location for a predefined amount of time; and in response to continuing to detect the first contact at the first location for the predefined amount of time, zooming the display area to a second magnification level. The second magnification level is greater than the first magnification level. The one or more programs additionally include instructions for, while the display area is at the second magnification level: detecting a movement of the first contact across the touch screen display; moving the first handle to a second location in the display area in accordance with the detected movement of the first contact; and detecting liftoff of the first contact. The one or more programs further include instructions for, in response to detecting liftoff of the first contact, zooming the display area to the first magnification level.

In accordance with some embodiments, a computer readable storage medium has stored therein instructions which when executed by a computing device with a touch screen display, cause the device to simultaneously display on the touch screen display: a plurality of user interface objects displayed at a first magnification level in a display area; a currently selected user interface object; and a plurality of handles for the currently selected user interface object. Each handle has a corresponding handle activation region. The instructions further cause the device to: detect a first contact at a first location on the touch screen display that corresponds to a first handle activation region for a first handle in the plurality of handles; continue to detect the first contact at the first location for a predefined amount of time; and in response to continuing to detect the first contact at the first location for the predefined amount of time, zoom the display area to a second magnification level. The second magnification level is greater than the first magnification level. The instructions additionally cause the device to, while the display area is at the second magnification level: detect a movement of the first contact across the touch screen display; move the first handle to a second location in the display area in accordance with the detected movement of the first contact; and detect liftoff of the first contact. The instructions further cause the device to, in response to detecting liftoff of the first contact, zoom the display area to the first magnification level.

In accordance with some embodiments, a computing device includes: a touch screen display; means for simultaneously displaying on the touch screen display: a plurality of user interface objects displayed at a first magnification level in a display area; a currently selected user interface object; and a plurality of handles for the currently selected user interface object. Each handle has a corresponding handle activation region. The device further includes: means for detecting a first contact at a first location on the touch screen display that corresponds to a first handle activation region for a first handle in the plurality of handles; means for continuing to detect the first contact at the first location for a predefined amount of time; and means, responsive to continuing to detect the first contact at the first location for the predefined amount of time for, zooming the display area to a second magnification level. The second magnification level is greater than the first magnification level. The device additionally includes, while the display area is at the second magnification level: means for detecting a movement of the first contact across the touch screen display; means for moving the first handle to a second location in the display area in accordance with the detected movement of the first contact; and means for detecting liftoff of the first contact. The device further includes means, responsive to detecting liftoff of the first contact for, zooming the display area to the first magnification level.

In accordance with some embodiments, an information processing apparatus for use in a computing device with a touch screen display includes: means for simultaneously displaying on the touch screen display: a plurality of user interface objects displayed at a first magnification level in a display area; a currently selected user interface object; and a plurality of handles for the currently selected user interface object. Each handle has a corresponding handle activation region. The apparatus further includes: means for detecting a first contact at a first location on the touch screen display that corresponds to a first handle activation region for a first handle in the plurality of handles; means for continuing to detect the first contact at the first location for a predefined amount of time; and means, responsive to continuing to detect the first contact at the first location for the predefined amount of time for, zooming the display area to a second magnification level. The second magnification level is greater than the first magnification level. The apparatus additionally includes, while the display area is at the second magnification level: means for detecting a movement of the first contact across the touch screen display; means for moving the first handle to a second location in the display area in accordance with the detected movement of the first contact; and means for detecting liftoff of the first contact. The apparatus further includes means, responsive to detecting liftoff of the first contact for, zooming the display area to the first magnification level.

Thus, computing devices with displays and touch-sensitive surfaces and/or touch screen displays are provided with faster, more efficient methods and interfaces for manipulating user interface objects, thereby increasing the effectiveness, efficiency, and user satisfaction with such devices. Such methods and interfaces may complement or replace conventional methods for manipulating user interface objects.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 7A-7G illustrate exemplary user interfaces for automatically zooming a display area to finely manipulate a user interface object in accordance with some embodiments.

DESCRIPTION OF EMBODIMENTS

Figure 1A:
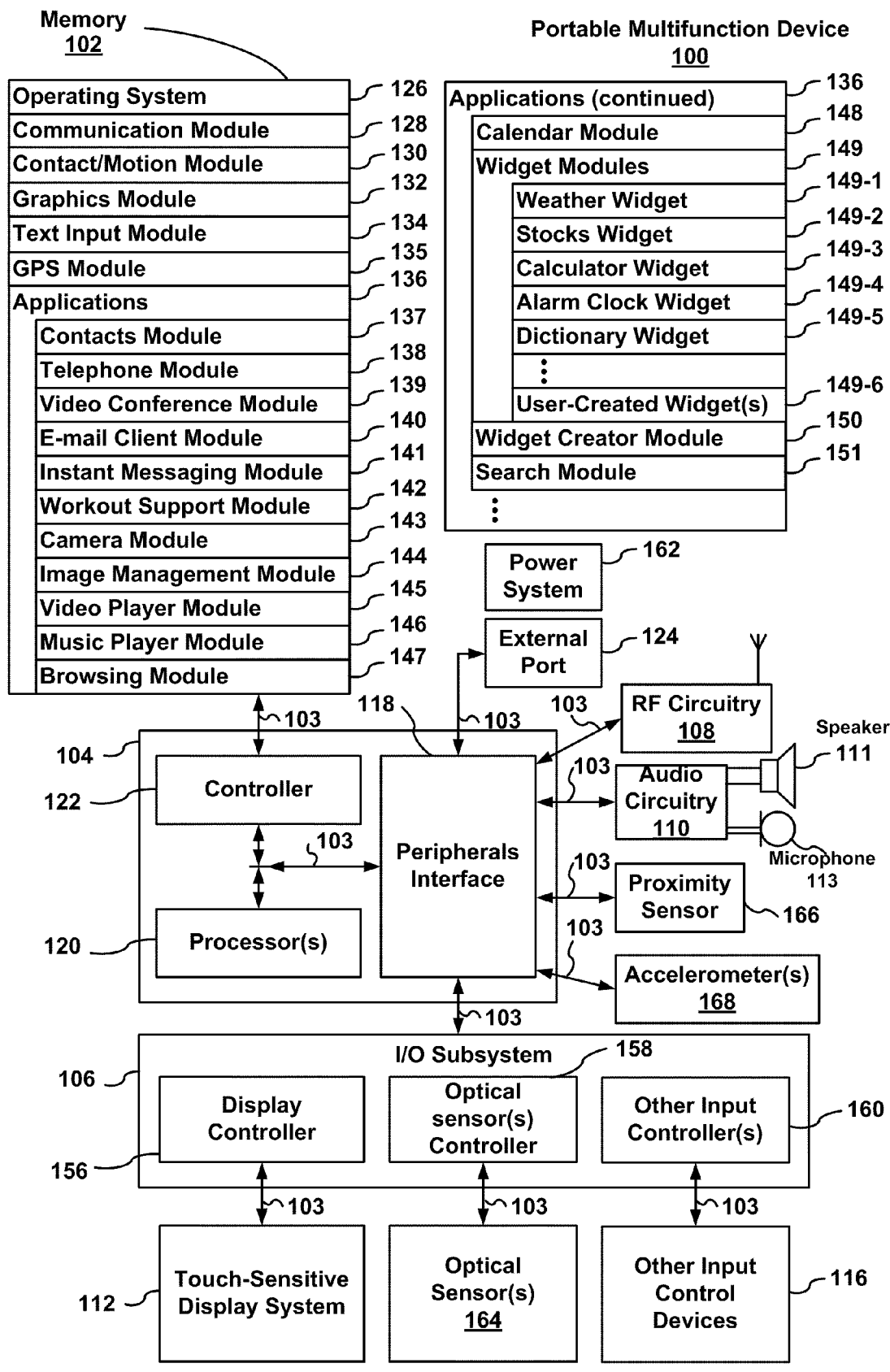
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone® and iPod Touch® devices from Apple Inc. of Cupertino, Calif. Other portable devices such as laptops or tablet computers with touch-sensitive surfaces (e.g., touch screen displays and/or touch pads) may also be used. It should also be understood that, in some embodiments, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. Nos. 11/459,606, "Keyboards For Portable Electronic Devices," filed Jul. 24, 2006, and 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
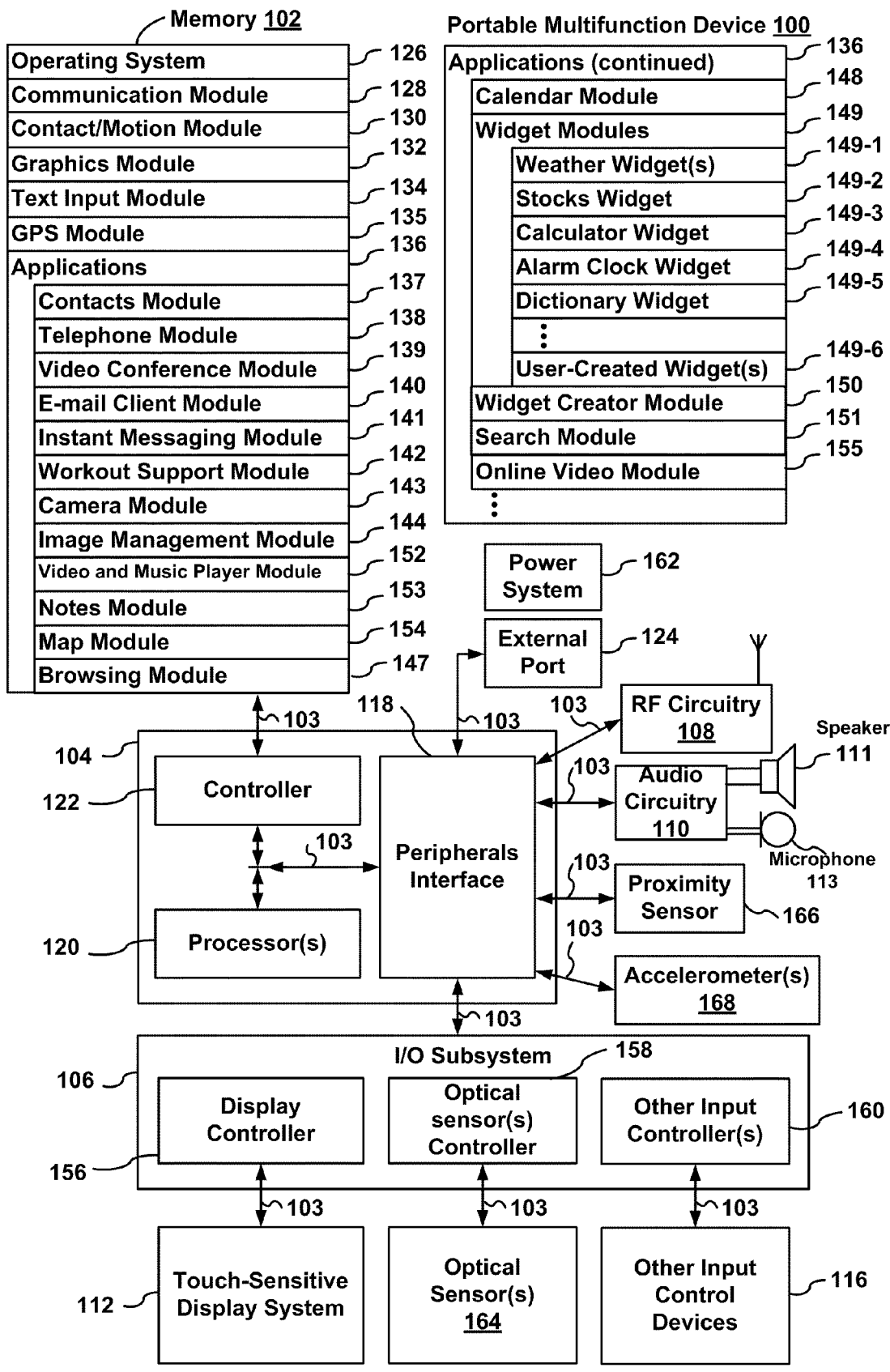

Attention is now directed towards embodiments of portable devices with touch-sensitive displays. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of the touch screen 112 may be analogous to the multi-touch sensitive touchpads described in the following U.S. Pat. Nos. 6,323,846 (Westerman et al.), 6,570,557 (Westerman et al.), and/or 6,677,932 (Westerman), and/or U.S. Patent Publication 2002/0015024A1, each of which is hereby incorporated by reference in its entirety. However, a touch screen 112 displays visual output from the portable device 100, whereas touch sensitive touchpads do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (e.g., icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. Nos. 11/241,839, "Proximity Detector In Handheld Device"; 11/240,788, "Proximity Detector In Handheld Device"; 11/620,702, "Using Ambient Light Sensor To Augment Proximity Sensor Output"; 11/586,862, "Automated Response To And Sensing Of User Activity In Portable Devices"; and 11/638,251, "Methods And Systems For Automatic Configuration Of Peripherals," which are hereby incorporated by reference in their entirety. In some embodiments, the proximity sensor turns off and disables the touch screen 112 when the multifunction device is placed near the user's ear (e.g., when the user is making a phone call).

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). The contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 detects contact on a touchpad. In some embodiments, the contact/motion module 130 and the controller 160 detects contact on a click wheel.

The contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up event.

The graphics module 132 includes various known software components for rendering and displaying graphics on the touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, the graphics module 132 stores data representing graphics to be used. Each graphic may be assigned a corresponding code. The graphics module 132 receives, from applications etc., one or more codes specifying graphics to be displayed along with, if necessary, coordinate data and other graphic property data, and then generates screen image data to output to display controller 156.

The text input module 134, which may be a component of graphics module 132, provides soft keyboards for entering text in various applications (e.g., contacts 137, e-mail 140, IM 141, browser 147, and any other application that needs text input).

The GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

The applications 136 may include the following modules (or sets of instructions), or a subset or superset thereof:
- a contacts module 137 (sometimes called an address book or contact list);
- a telephone module 138;
- a video conferencing module 139;
- an e-mail client module 140;
- an instant messaging (IM) module 141;
- a workout support module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, the workout support module 142 may be used to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
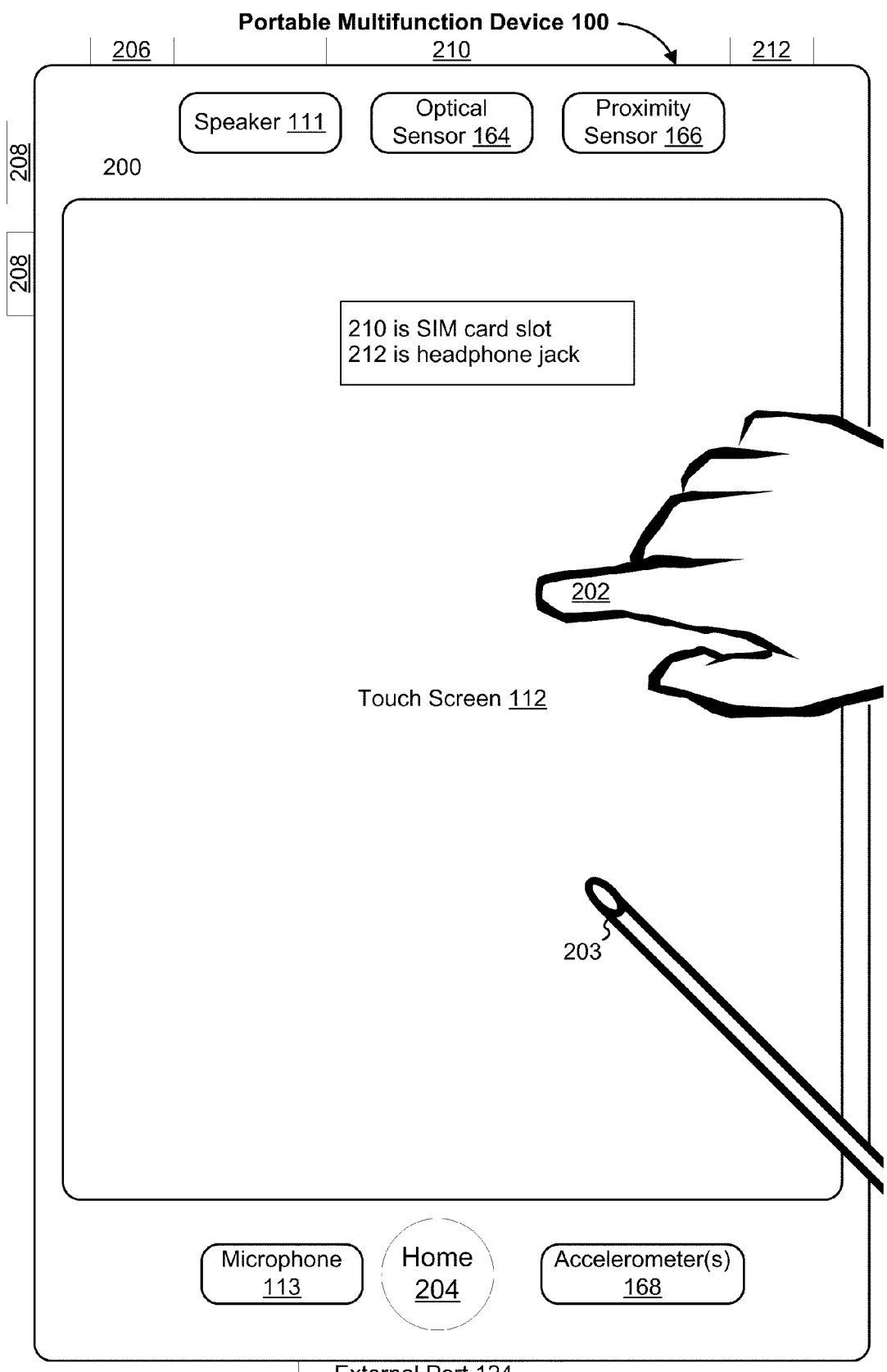
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Figure 3:
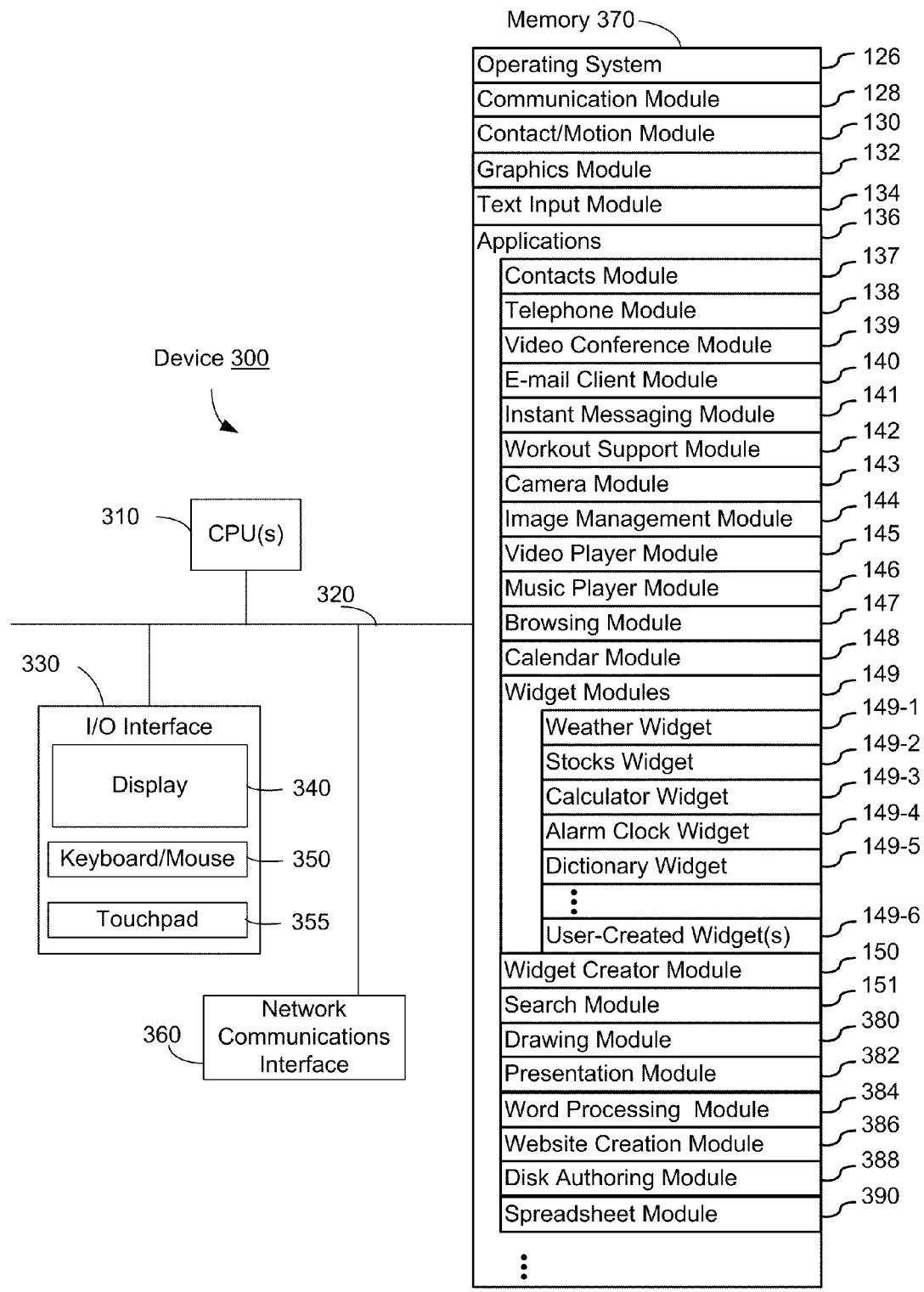
FIG. 3 is a block diagram of an exemplary multifunction device with a display and a touch-sensitive surface in accordance with some embodiments.

FIG. 3 is a block diagram of an exemplary multifunction device with a display and a touch-sensitive surface in accordance with some embodiments. Device 300 need not be portable. In some embodiments, the device 300 is a laptop computer, a desktop computer, a tablet computer, a multimedia player device, a navigation device, an educational device (such as a child's learning toy), a gaming system, or a control device (e.g., a home or industrial controller). The device 300 typically includes one or more processing units (CPU's) 310, one or more network or other communications interfaces 360, memory 370, and one or more communication buses 320 for interconnecting these components. The communication buses 320 may include circuitry (sometimes called a chipset) that interconnects and controls communications between system components. The device 300 includes an input/output (I/O) interface 330 comprising a display 340, which is typically a touch screen display 112. The I/O interface 330 also may include a keyboard and/or mouse (or other pointing device) 350 and a touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from the CPU(s) 310. In some embodiments, memory 370 stores programs, modules, and data structures analogous to the programs, modules, and data structures stored in the memory 102 of portable multifunction device 100 (FIG. 1), or a subset thereof. Furthermore, memory 370 may store additional programs, modules, and data structures not present in the memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on a portable multifunction device 100.

Figure 4A:
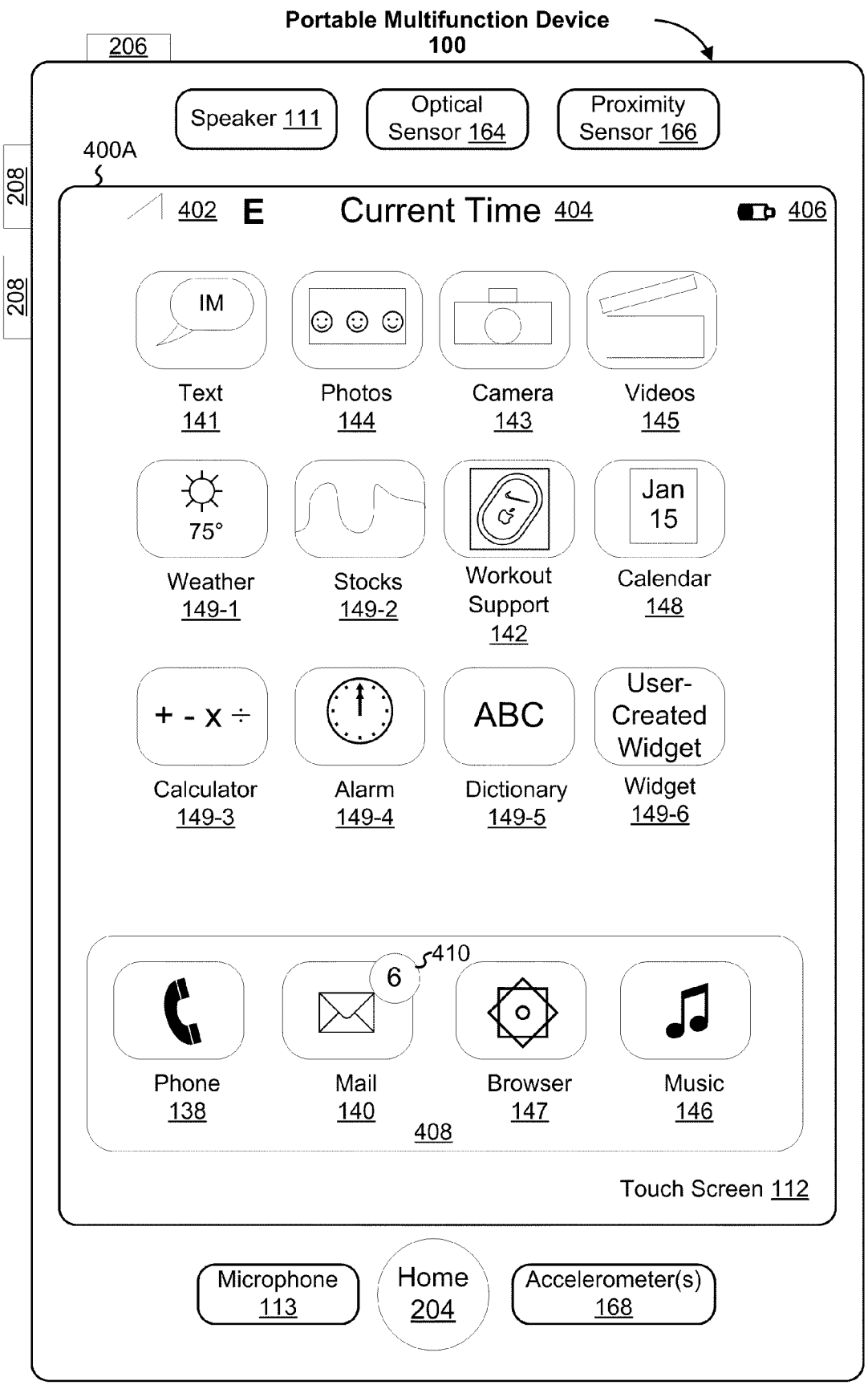
FIGS. 4A and 4B illustrate exemplary user interfaces for a menu of applications on a portable multifunction device in accordance with some embodiments.
Figure 4B:
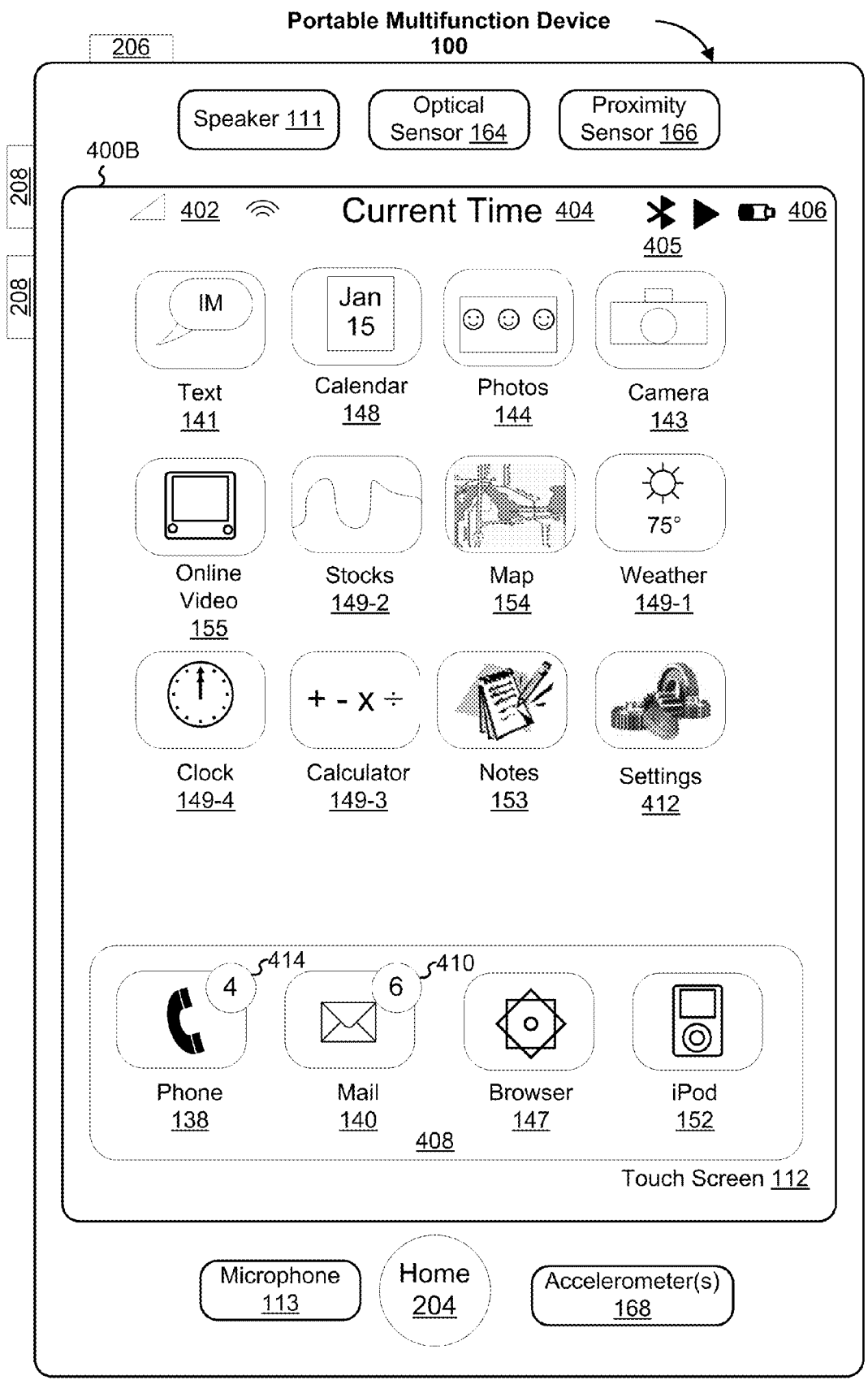

FIGS. 4A and 4B illustrate exemplary user interfaces for a menu of applications on a portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Music player 146; and
Icons for other applications, such as:
  IM 141;
  Image management 144;
  Camera 143;
  Video player 145;
  Weather 149-1;
  Stocks 149-2;
  Workout support 142;
  Calendar 148;
  Calculator 149-3;
  Alarm clock 149-4;
  Dictionary 149-5; and
  User-created widget 149-6.

In some embodiments, user interface 40013 includes the following elements, or a subset or superset thereof:

402, 404, 405, 406, 141, 148, 144, 143, 149-3, 149-2, 149-1, 149-4, 410, 414, 138, 140, and 147, as described above;
Map 154;
Notes 153;
Settings 412, which provides access to settings for the device 100 and its various applications 136, as described further below;
Video and music player module 152, also referred to as iPod (trademark of Apple Inc.) module 152; and
Online video module 155, also referred to as YouTube (trademark of Google, Inc.) module 155.

Figure 4C:
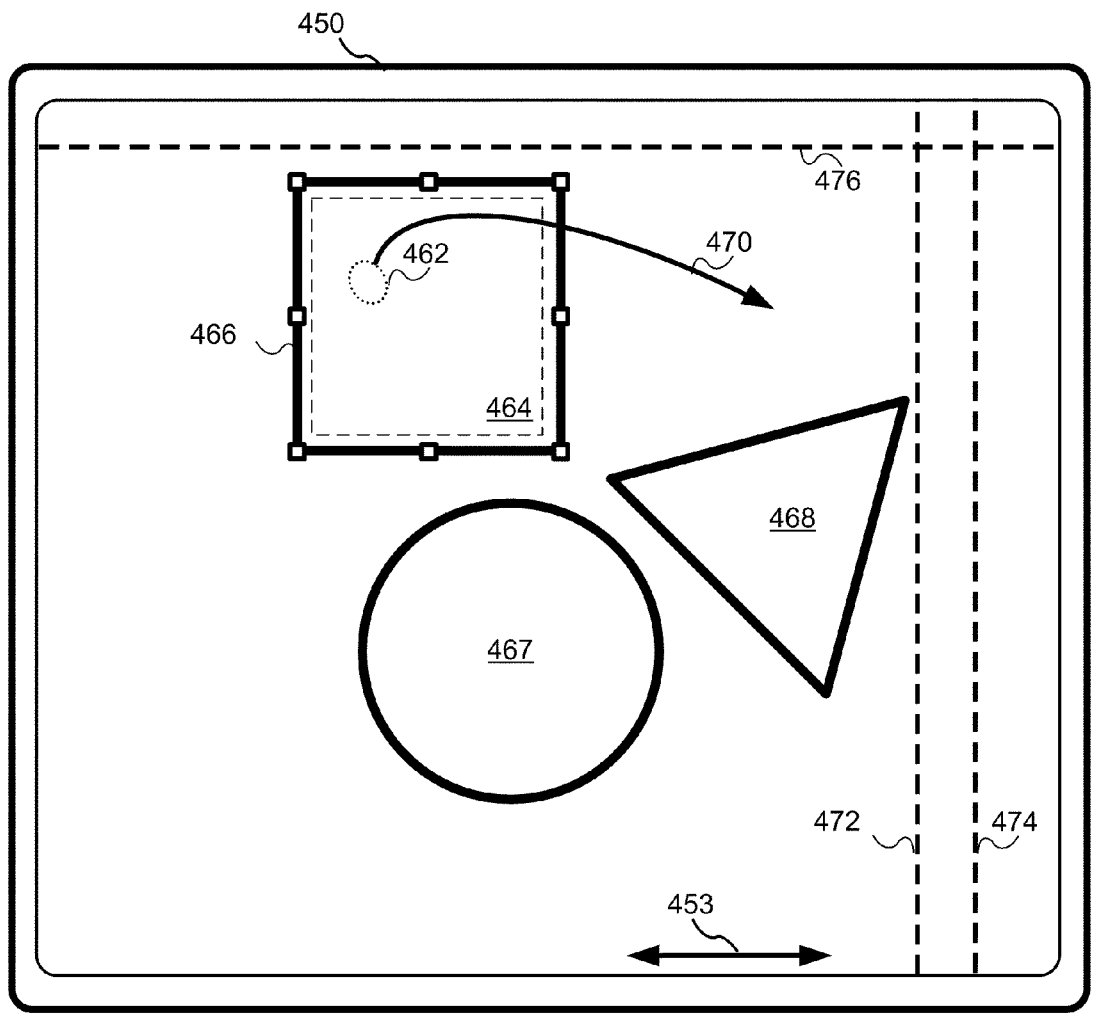
FIG. 4C illustrates an exemplary user interface for a computing device with a touch-sensitive surface that is separate from the display in accordance with some embodiments.
Figure 4C:
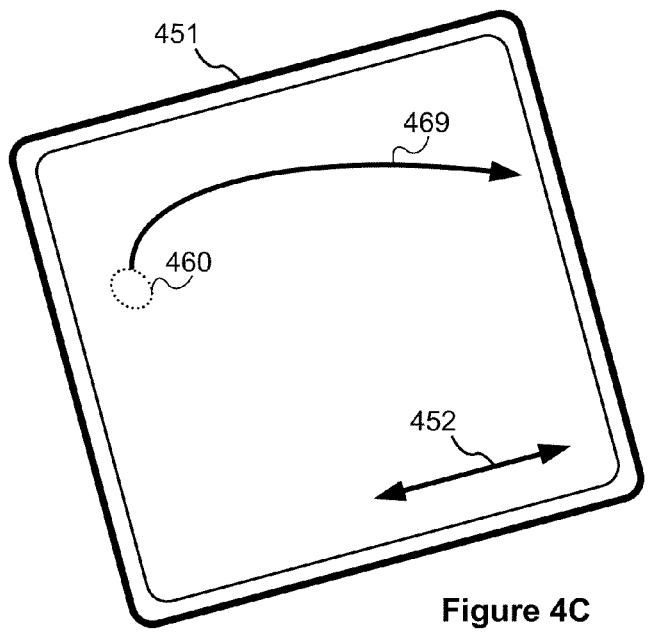

FIG. 4C illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on a touch screen display 112 (where the touch sensitive surface and the display are combined), in some embodiments, the device detects inputs on a touch-sensitive surface that is separate from the display, as shown in FIG. 4C. In some embodiments the touch sensitive surface (e.g., 451 in FIG. 4C) has a primary axis (e.g., 452 in FIG. 4C) that corresponds to a primary axis (e.g., 453 in FIG. 4C) on the display (e.g., 450). In accordance with these embodiments, the device detects a contact (e.g., 460 in FIG. 4C) with the touch-sensitive surface 451 at a location that corresponds to a respective location on the display (e.g., in FIG. 4C 460 corresponds to 462). In this way, user inputs (e.g., contact 460) detected by the device on the touch-sensitive surface (e.g., 451 in FIG. 4C) are used by the device to manipulate the user interface on the display (e.g., 450 in FIG. 4C) of the multifunction device when the touch-sensitive surface is separate from the display. It should be understood that similar methods may be used for other user interfaces described herein.

In FIG. 4C, a first input on the touch-sensitive surface 451 includes a contact 462 associated with an object activation region 464 for a respective user interface object 466 of a plurality of user interface objects (e.g., circle user interface object 467 and triangle user interface object 468) displayed on the display and subsequent movement 469 of the contact 460 across the touch-sensitive surface 451 to new contact location. This movement of the contact on the touch sensitive surface corresponds to movement 470 of the user interface objects 466 across the display to a respective position on the display that is proximate to a first guide 472 and a second guide 474, and the device moves the user interface object 466 to the respective position. In some embodiments, the respective position is also proximate to a third guide 476 as discussed in greater detail below. As discussed in greater detail below with reference to FIGS. 6E-6H, the device determines a first plurality of candidate action and a first order for the first plurality of candidate actions, and performs the first candidate action based on the first ordering. While the present example is given with reference to a single embodiment, it should be understood that any of the examples given below with reference to touch screen display could similarly be performed on device with a display and a separate touch-sensitive surface.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact). Similarly, when multiple user inputs are simultaneously detected, it should be understood that multiple computer mice may be used simultaneously, or a mouse and finger contacts may be used simultaneously.

Attention is now directed towards embodiments of user interfaces ("UI") and associated processes that may be implemented on a computing device with a display and a touch-sensitive surface, such as device 300 or portable multifunction device 100.

Figure 5A:
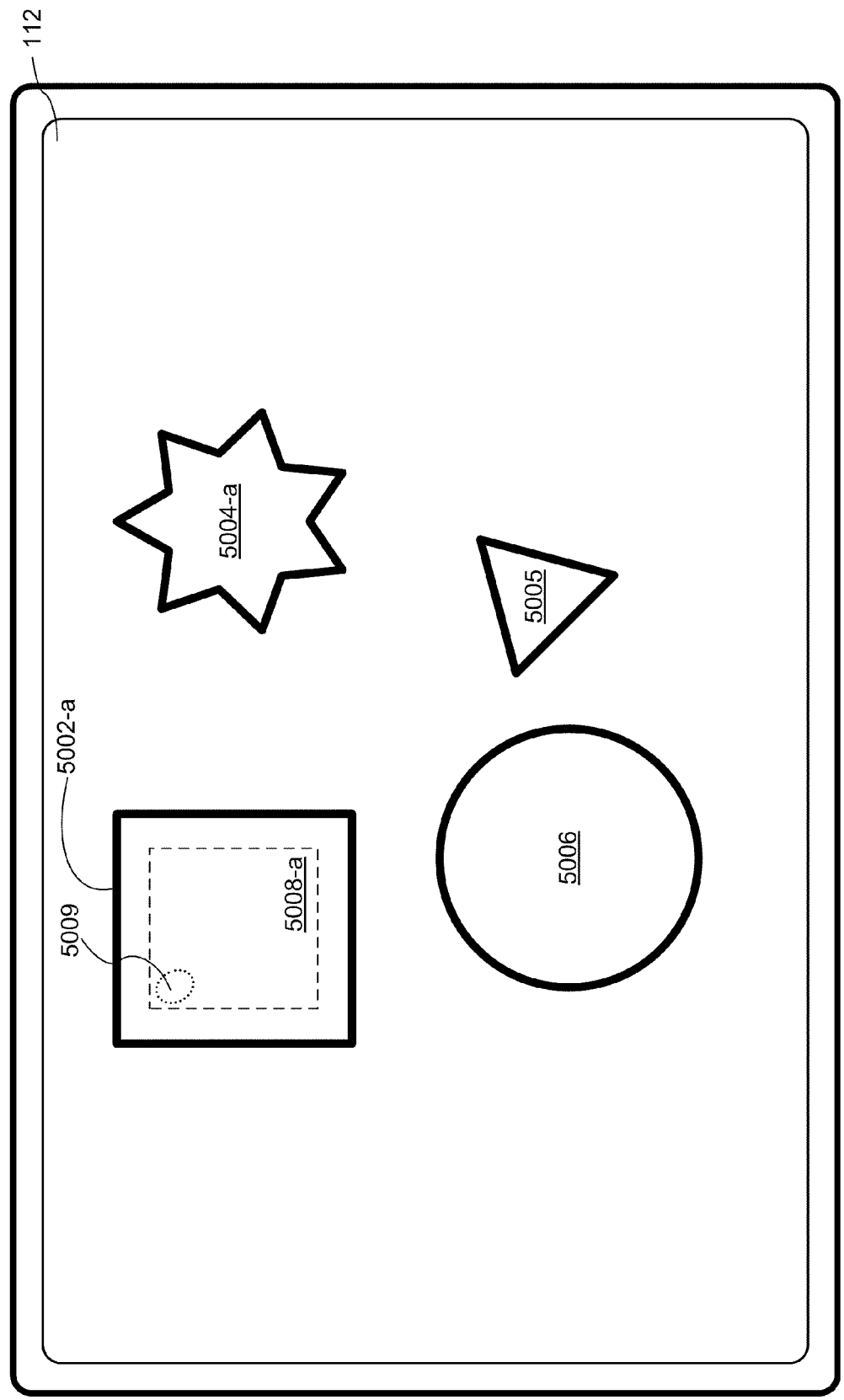
FIGS. 5A-5J illustrate exemplary user interfaces for modifying handle activation regions for resizing handles of a user interface object in accordance with some embodiments.
Figure 5B:
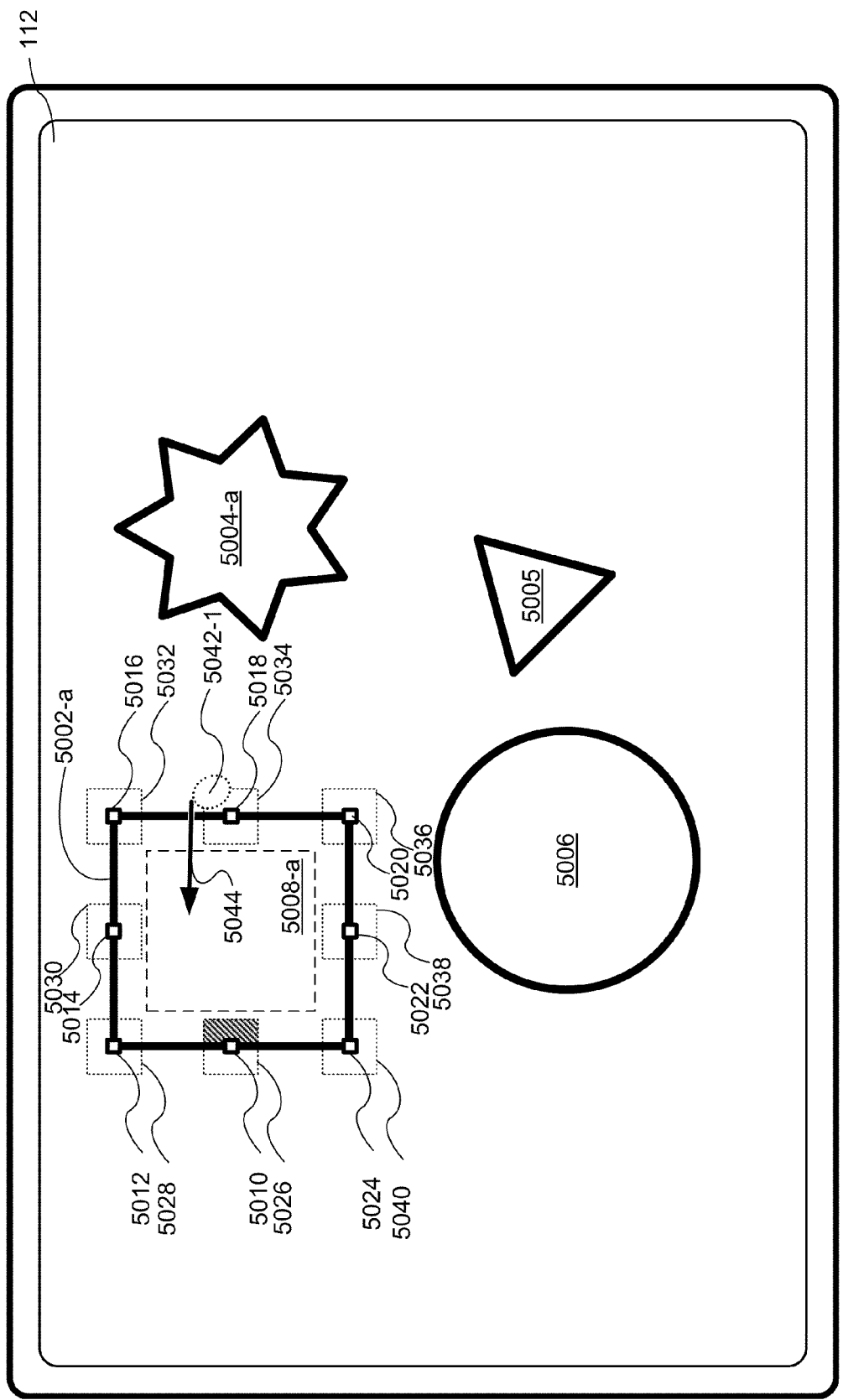
Figure 5C:
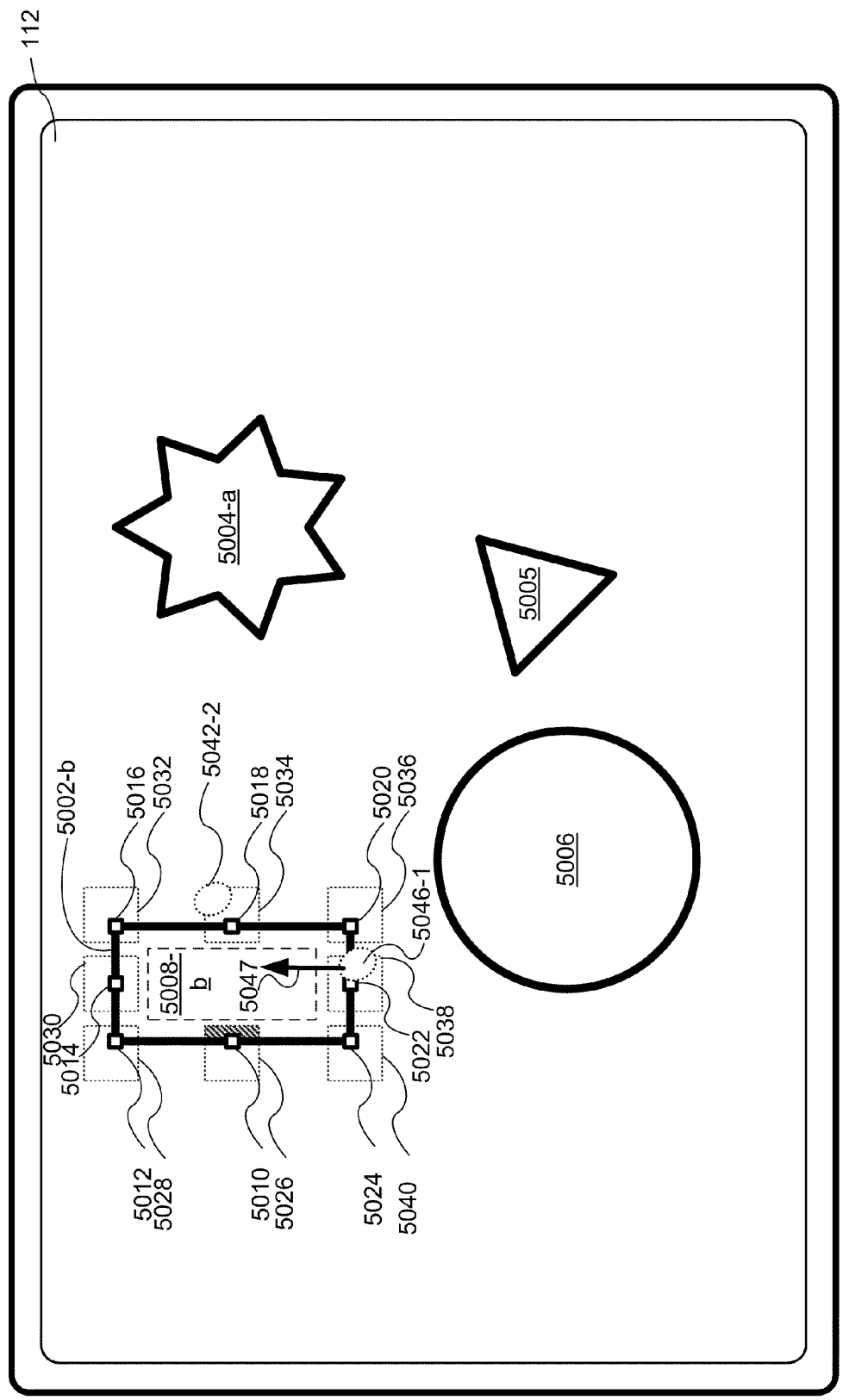
Figure 5D:
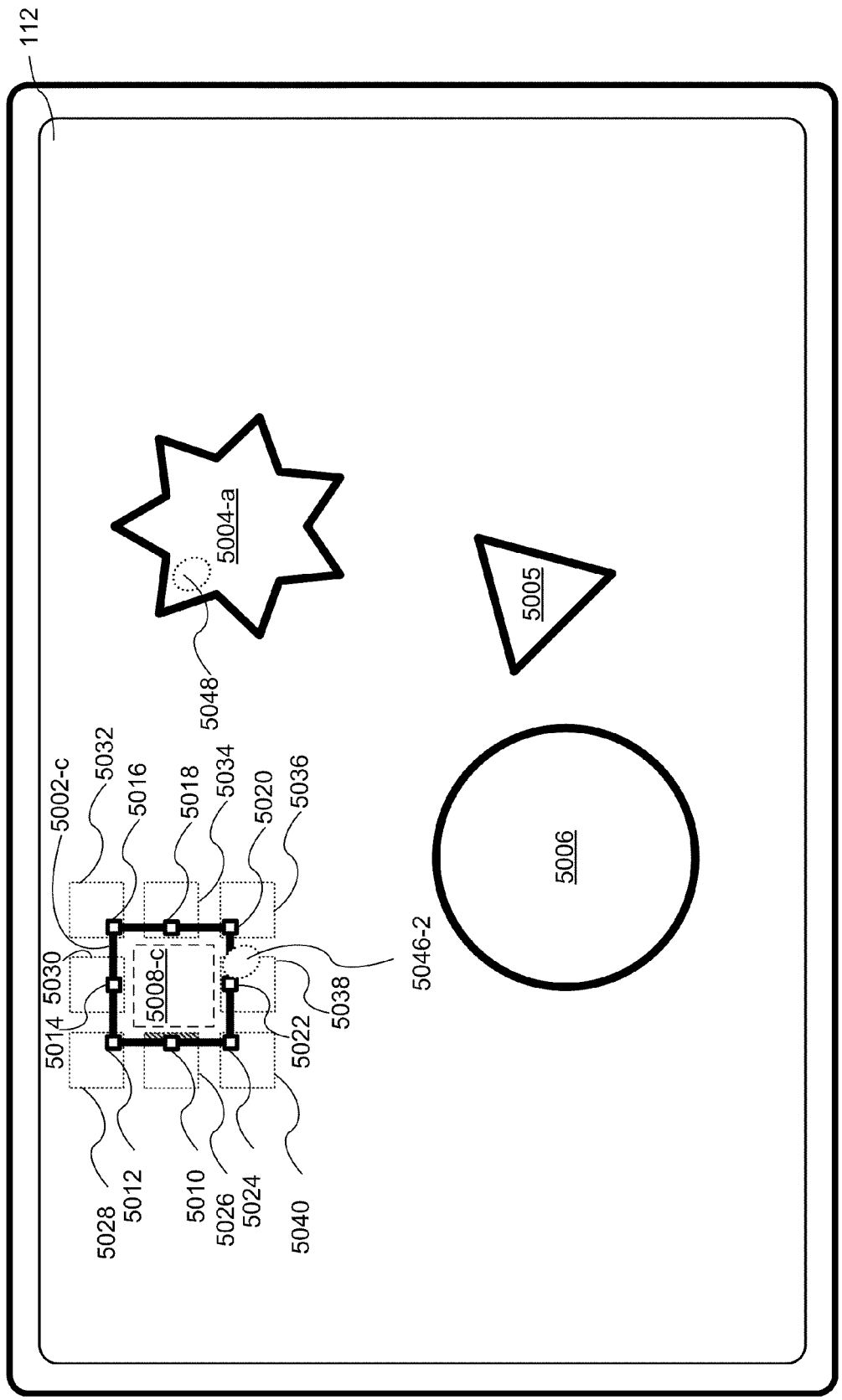

FIGS. 5A-5D illustrate exemplary user interfaces for selecting a user interface object in response to detecting an input on the user interface object (e.g., tap gesture 5009 on the square user interface object 5002-a), resizing the currently selected user interface object 5002 in accordance with a first input (e.g., the movement 5044 of a first contact 5042 from a first contact location 5042-1 in FIG. 5B to a second contact location 5042-2 in FIG. 5C) and moving the position of a first handle activation region (e.g., 5026 in FIGS. 5B-5D) relative to an associated resizing handle (e.g., 5010 in FIGS. 5B-5D), and repeating these steps for an additional input (e.g., the movement 5047 of a first contact 5046 from a first contact location 5046-1 in FIG. 5C to a second contact location 5046-2 in FIG. 5D) in accordance with some embodiments.

The user interfaces in these figures are used to illustrate the processes described below, including the processes described in reference to FIGS. 8A-8D.

Figure 5E:
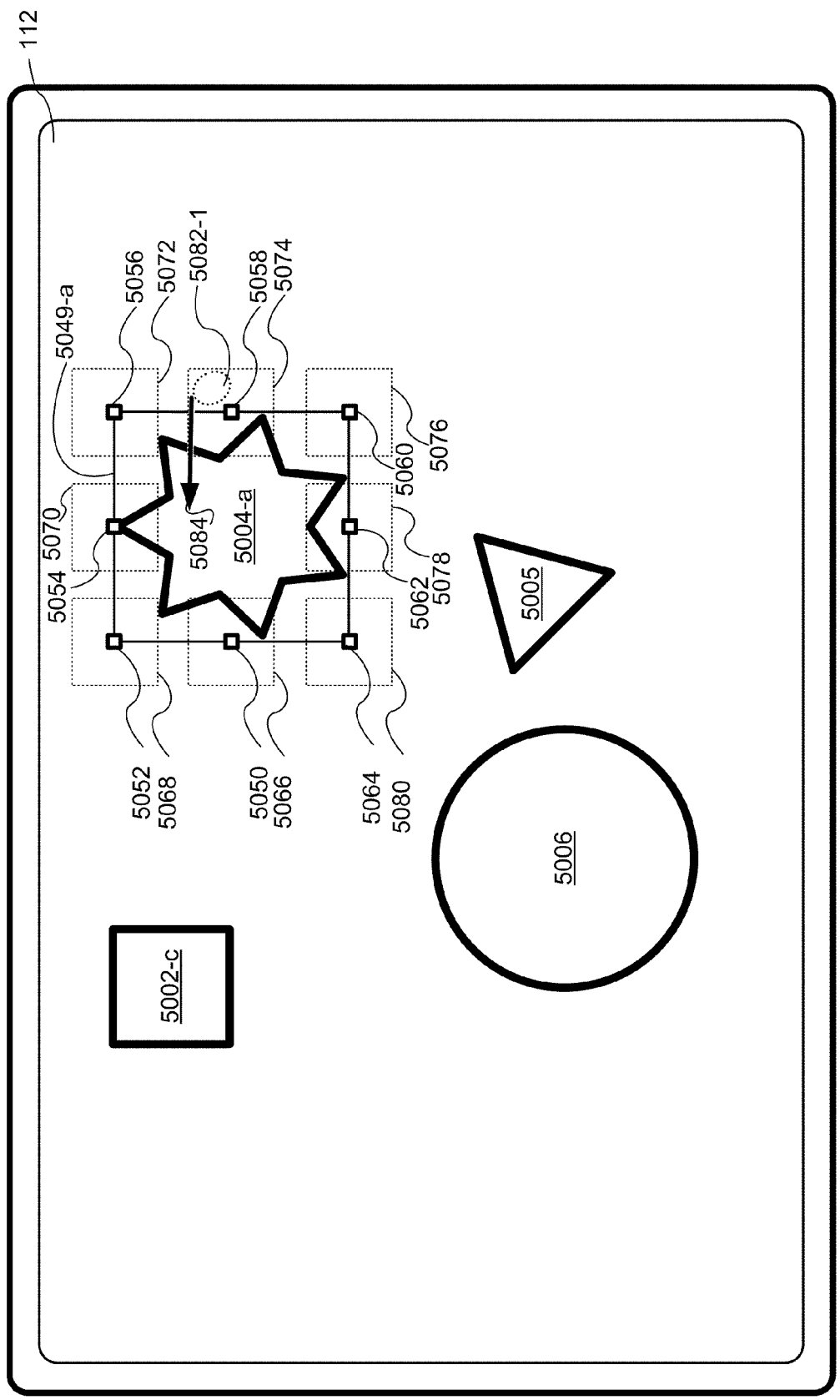
Figure 5F:
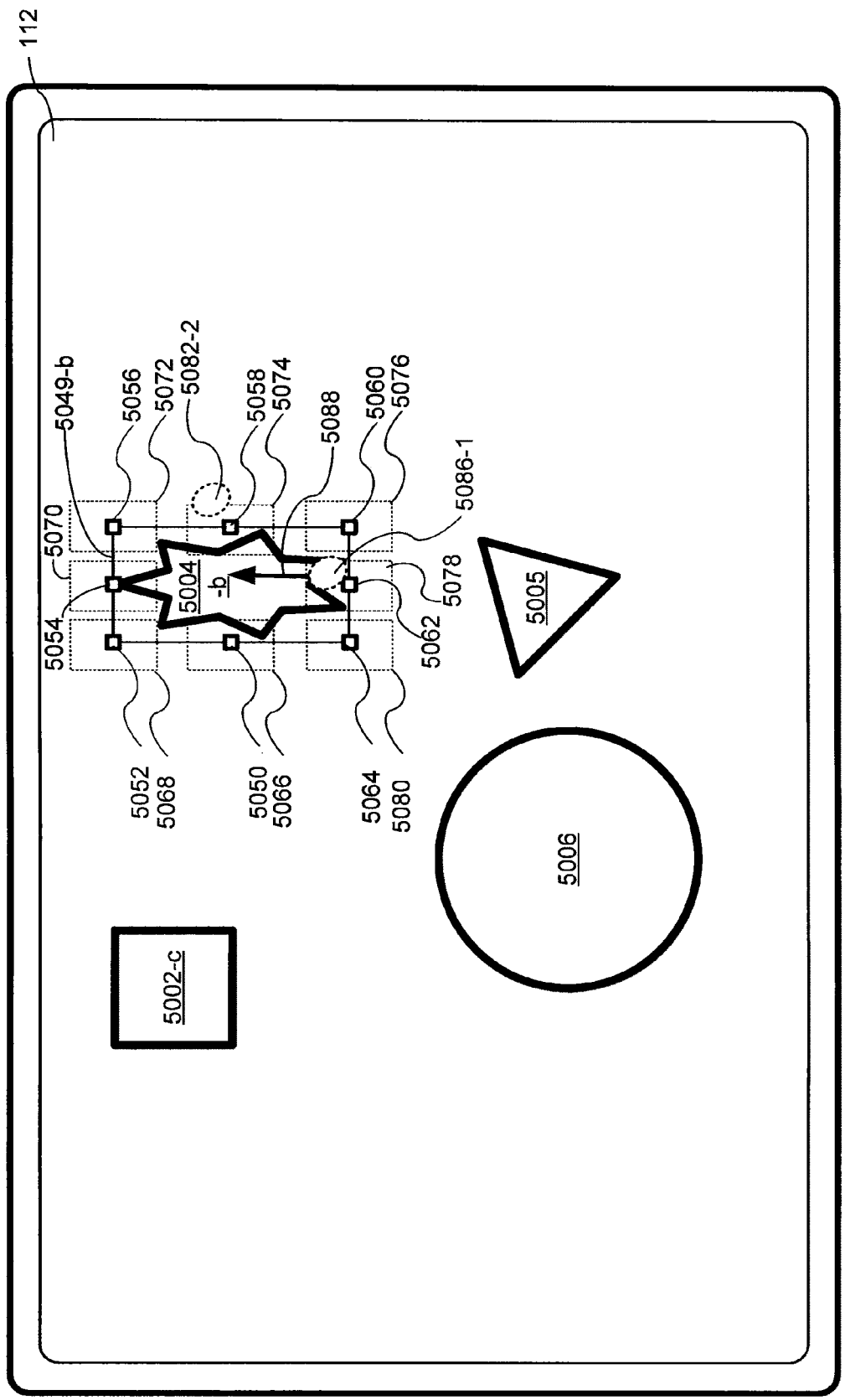
Figure 5G:
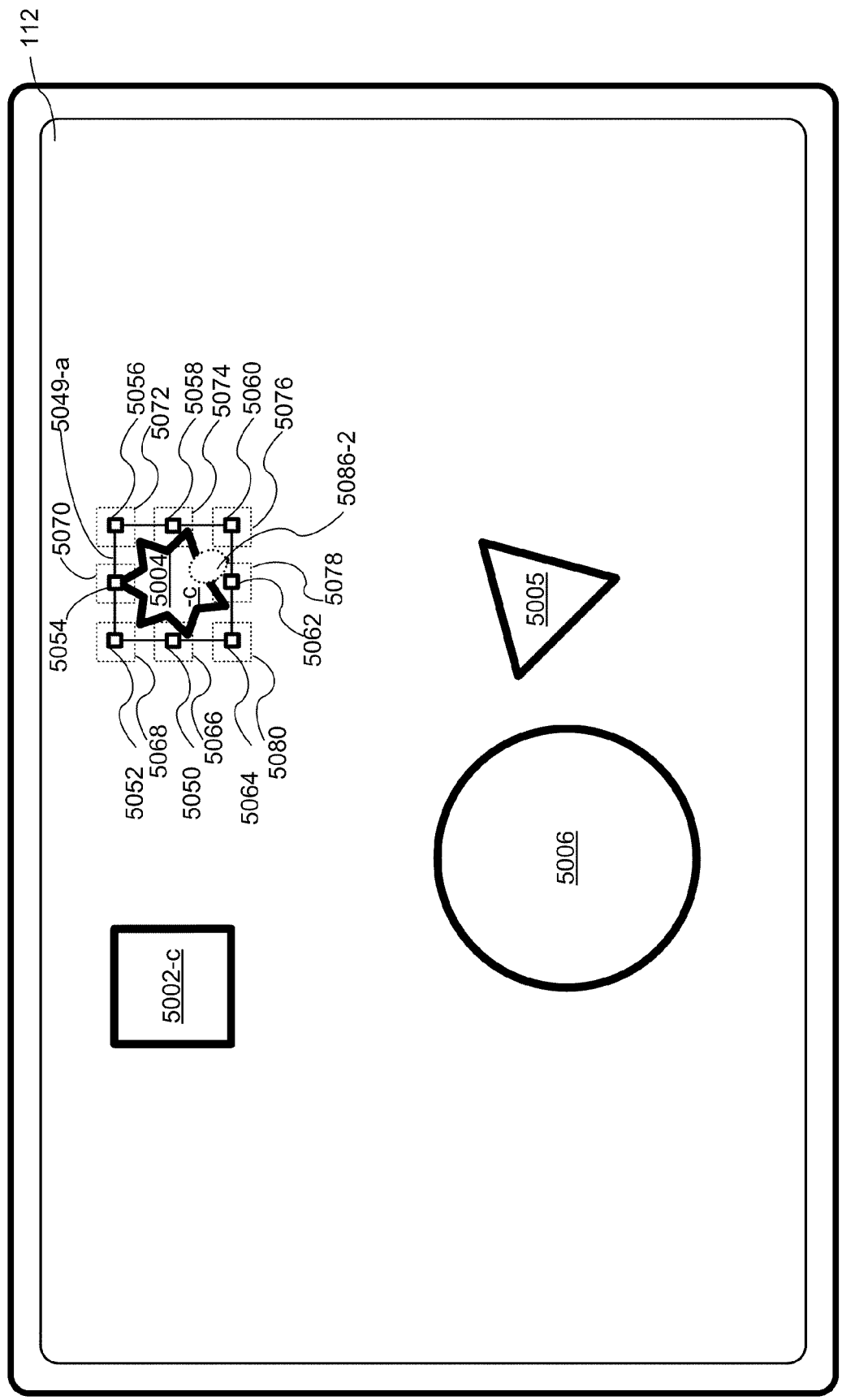

FIGS. 5E-5G illustrate exemplary user interfaces for resizing the currently selected user interface object 5004 with a bounding box 5049 in accordance with a first input (e.g., the movement 5084 of a first contact 5082 from a first contact location 5082-1 in FIG. 5E to a second contact location 5082-2 in FIG. 5F) and changing the size of a first handle activation region (e.g., 5074 in FIGS. 5E-5G) that is associated with a first resizing handle (e.g. 5058 in FIGS. 5E-5G) of the bounding box 5049 for the user interface object, and repeating these steps for an additional input (e.g. the movement 5088 of contact 5086 from an initial contact location 5086-1 in FIG. 5F to a second contact location 5086-2 in FIG. 5G) in accordance with some embodiments. The user interfaces in these figures are used to illustrate the processes described below, including the processes described in reference to FIGS. 8A-8D.

Figure 5H:
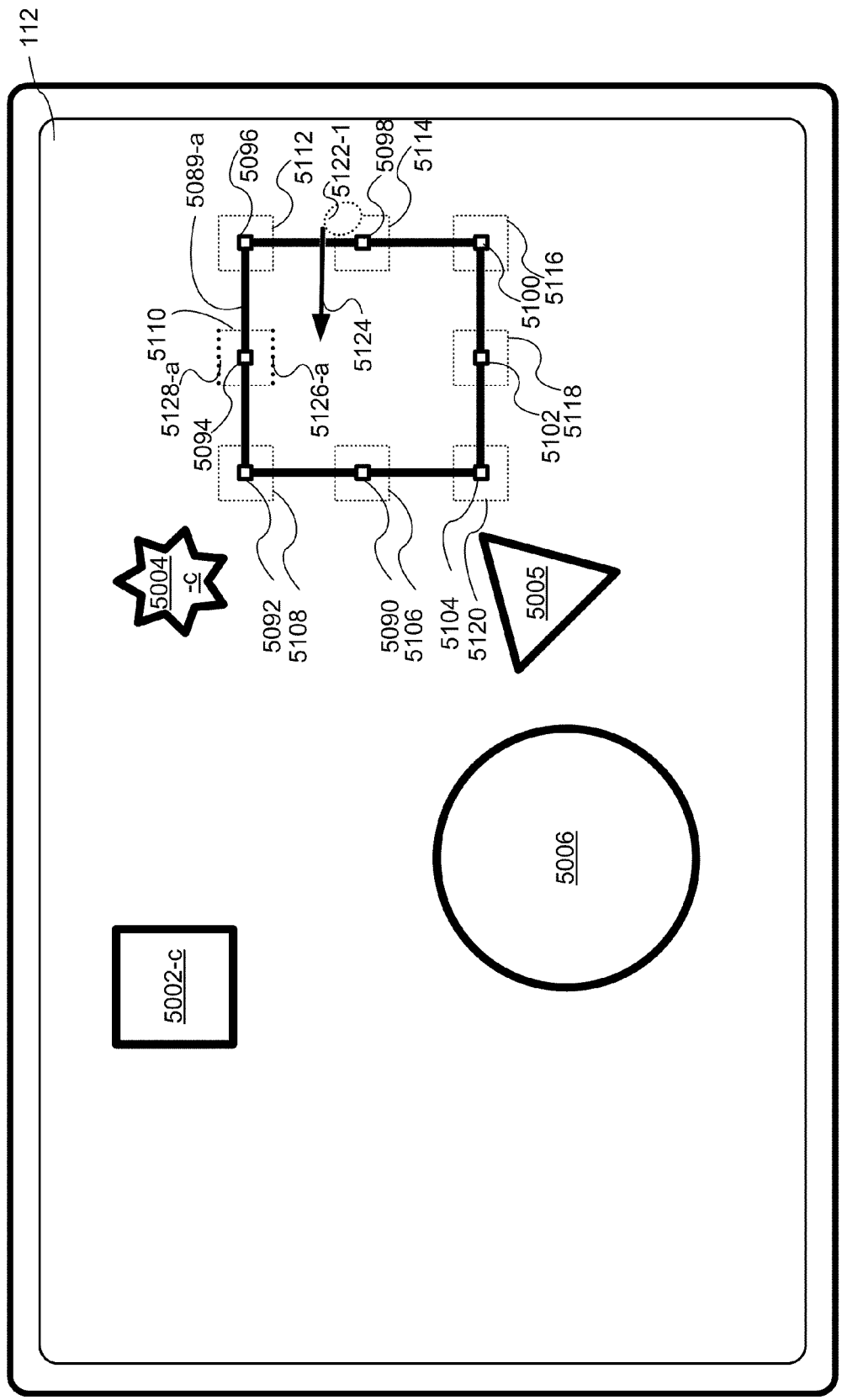
Figure 5I:
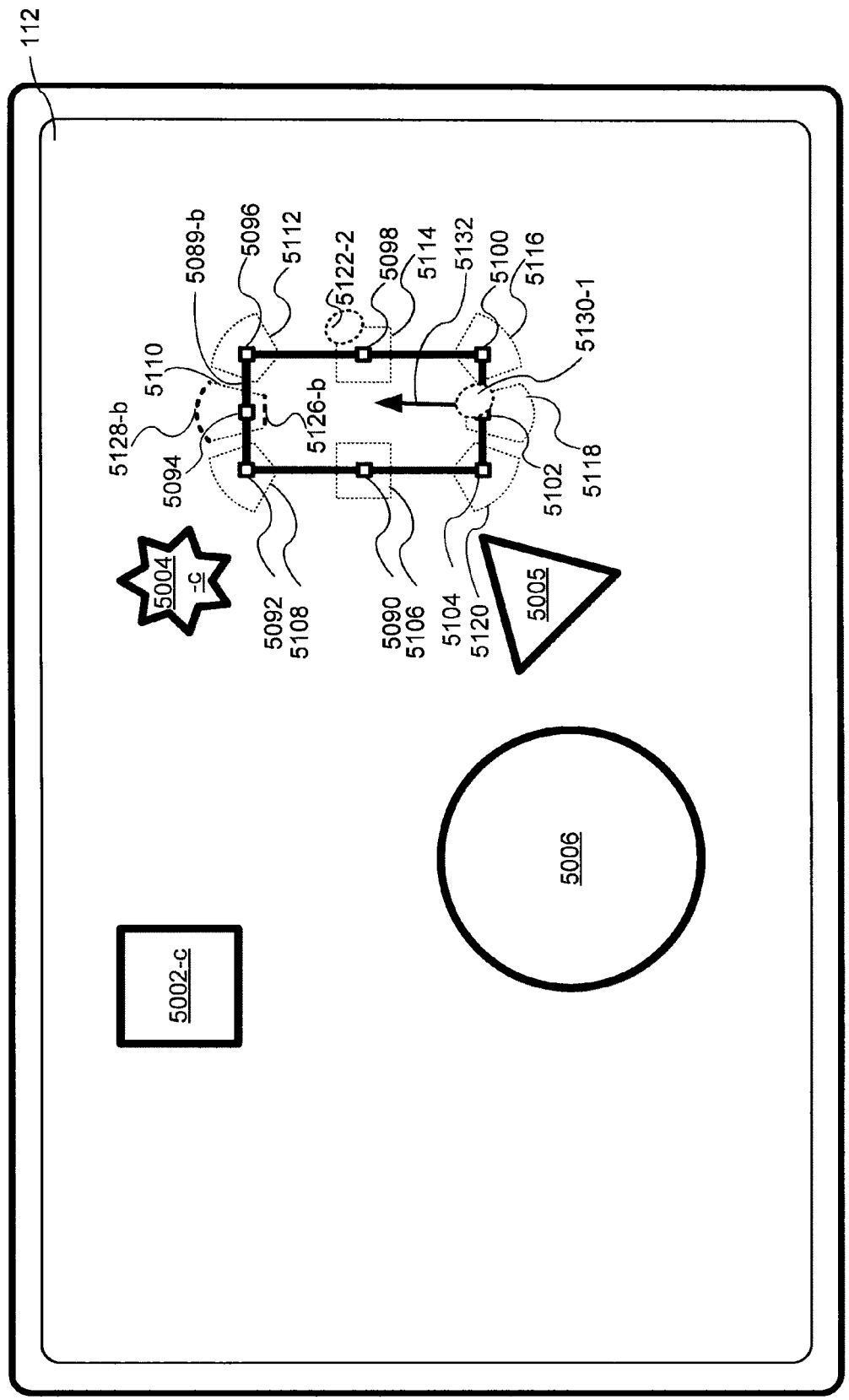
Figure 5J:
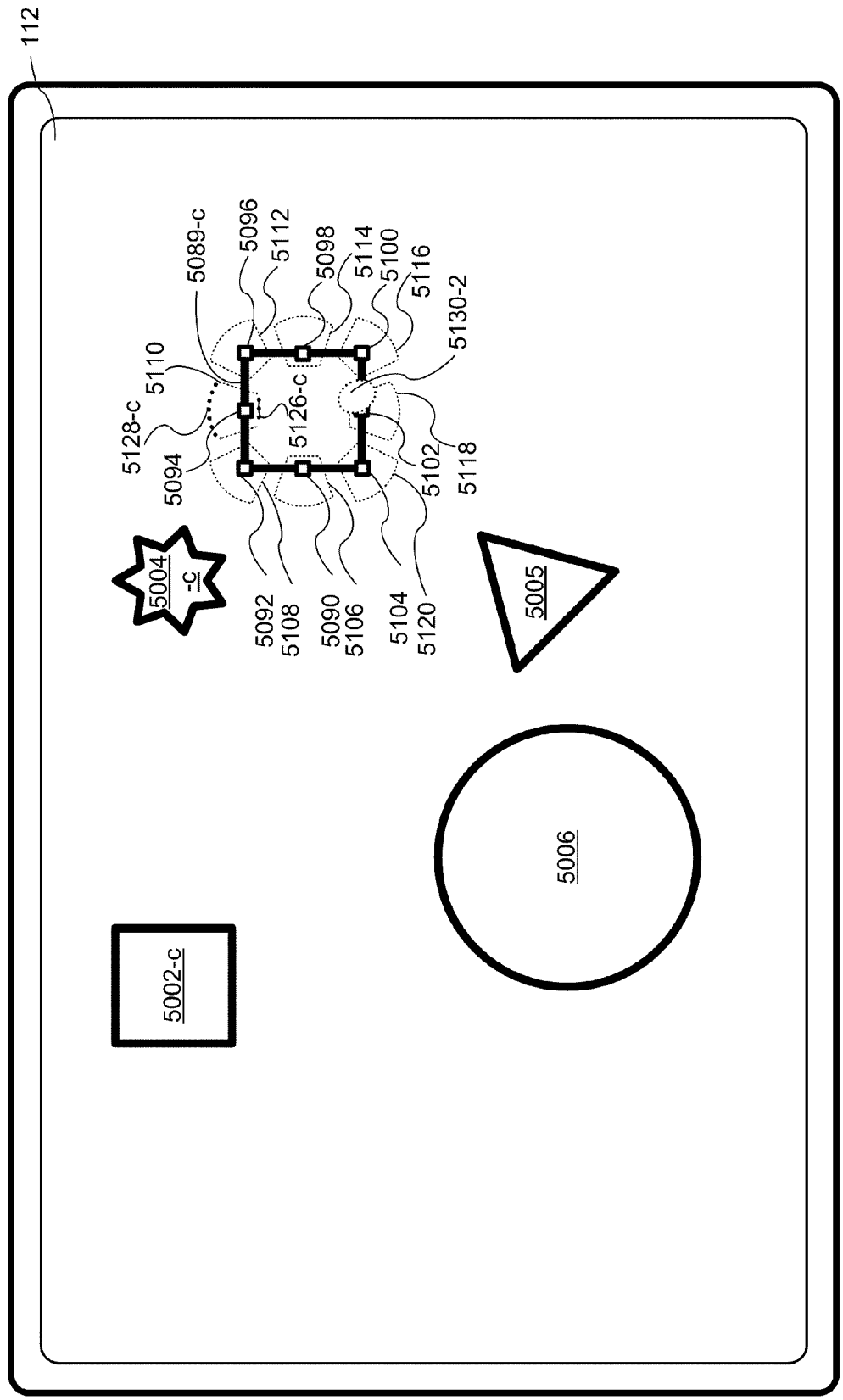

FIGS. 5H-5J illustrate exemplary user interfaces for resizing the currently selected user interface object 5089 in accordance with a first input (e.g., the movement 5124 of a first contact 5122 from a first contact location 5122-1 in FIG. 5H to a second contact location 5122-2 in FIG. 5I) and changing the shape of a first handle activation region (e.g., 5110 in FIGS. 5H-5J) that is associated with a first resizing handle (e.g. 5094 in FIGS. 5H-5J), and repeating these steps for an additional input (e.g. the movement 5132 of contact 5130 from an initial contact location 5130-1 in FIG. 5I to a second contact location 5130-2 in FIG. 5J) in accordance with some embodiments. The user interfaces in these figures are used to illustrate the processes described below, including the processes described in reference to FIGS. 8A-8D.

Figure 6A:
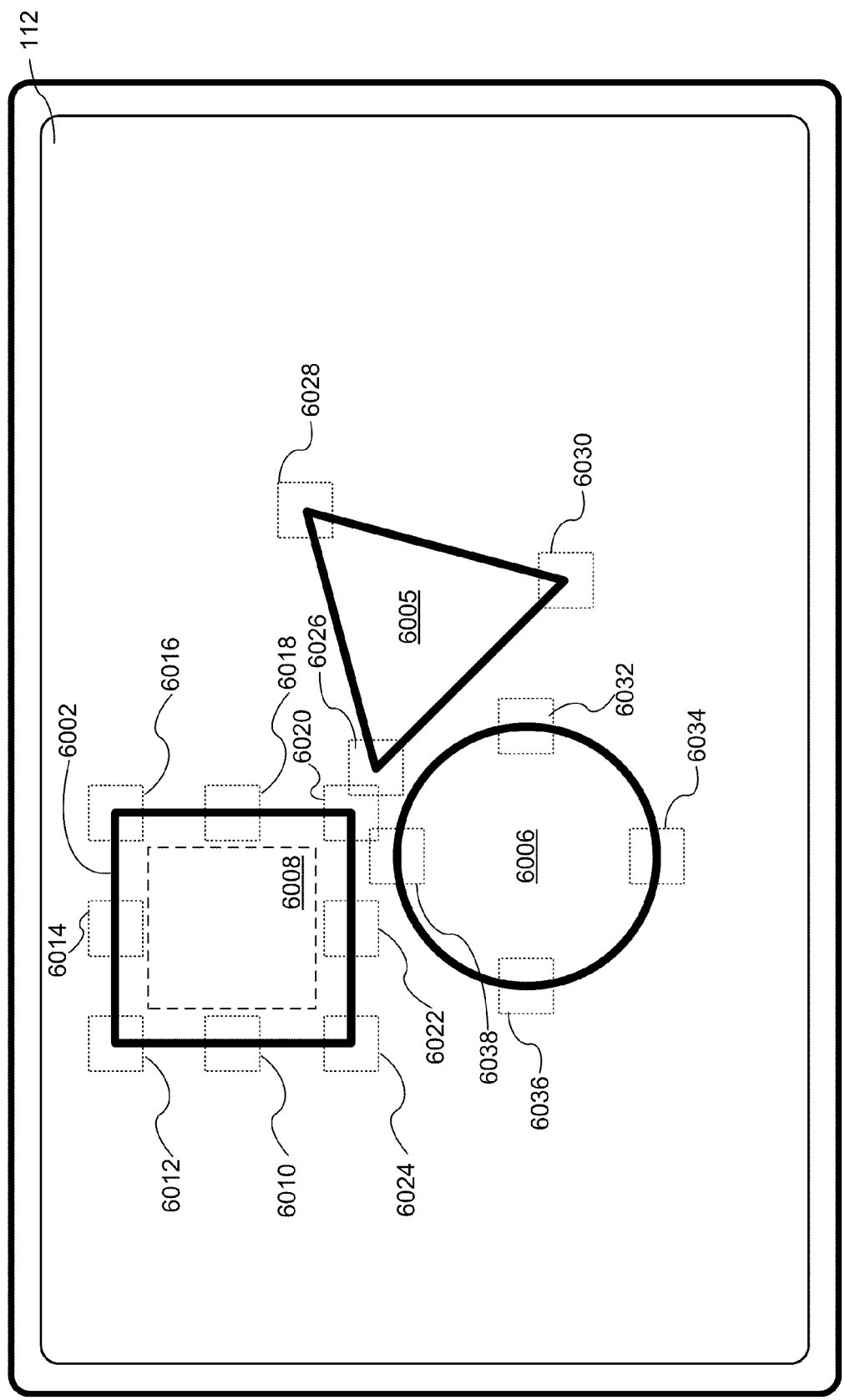
FIGS. 6A-6P illustrate exemplary user interfaces for selecting an alternative candidate action to perform based on previously canceled candidate actions in accordance with some embodiments.
Figure 6B:
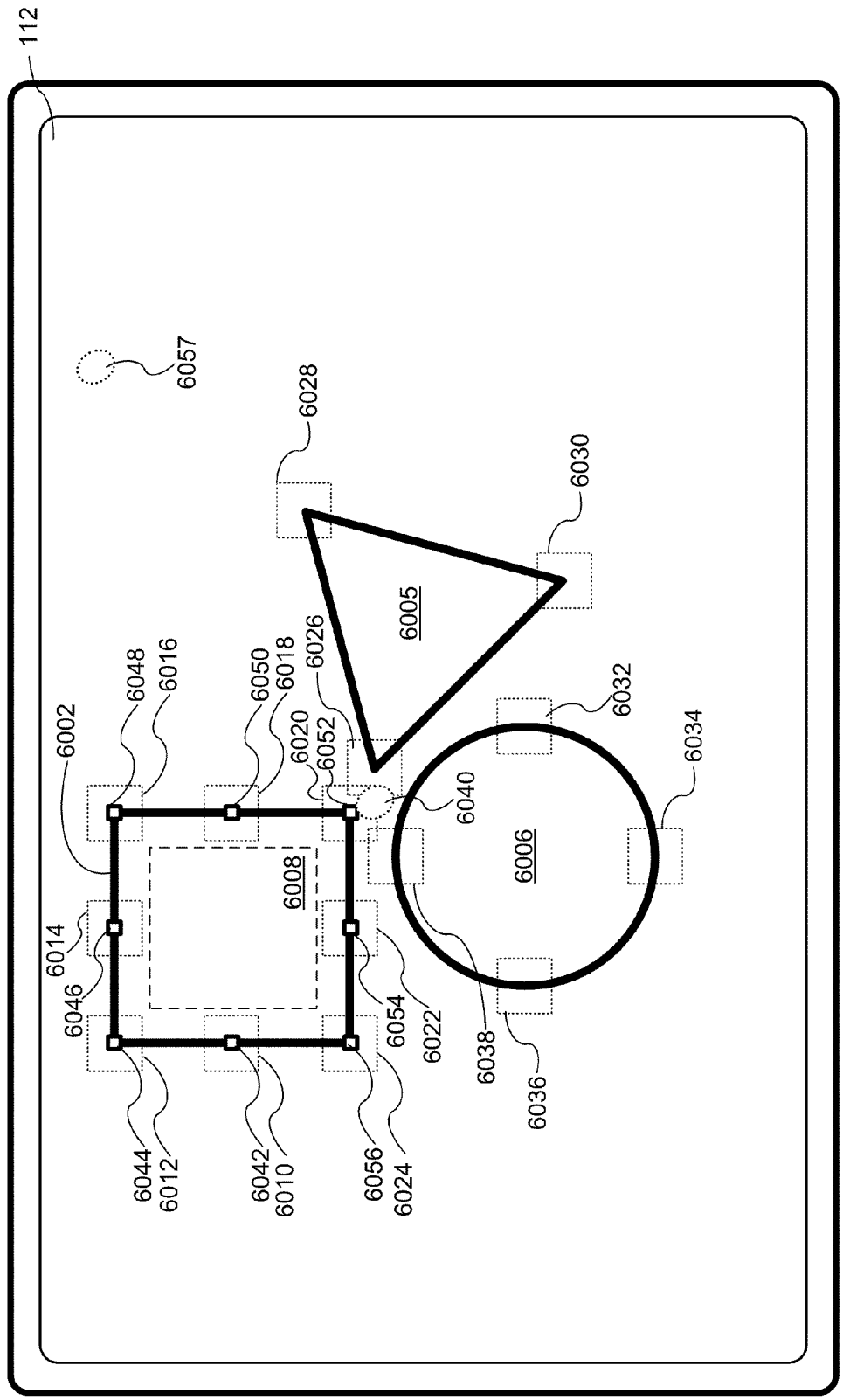
Figure 6C:
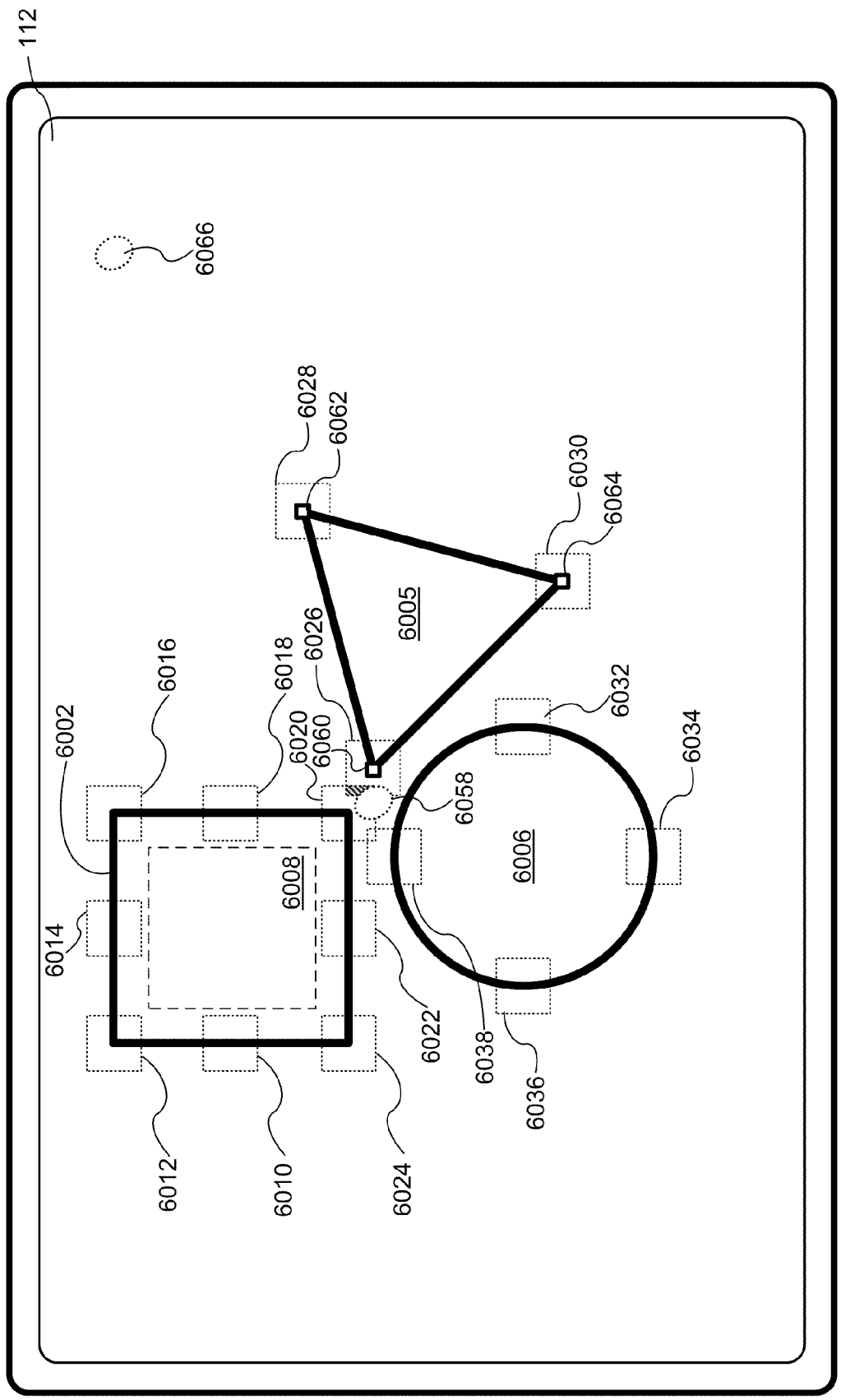
Figure 6D:
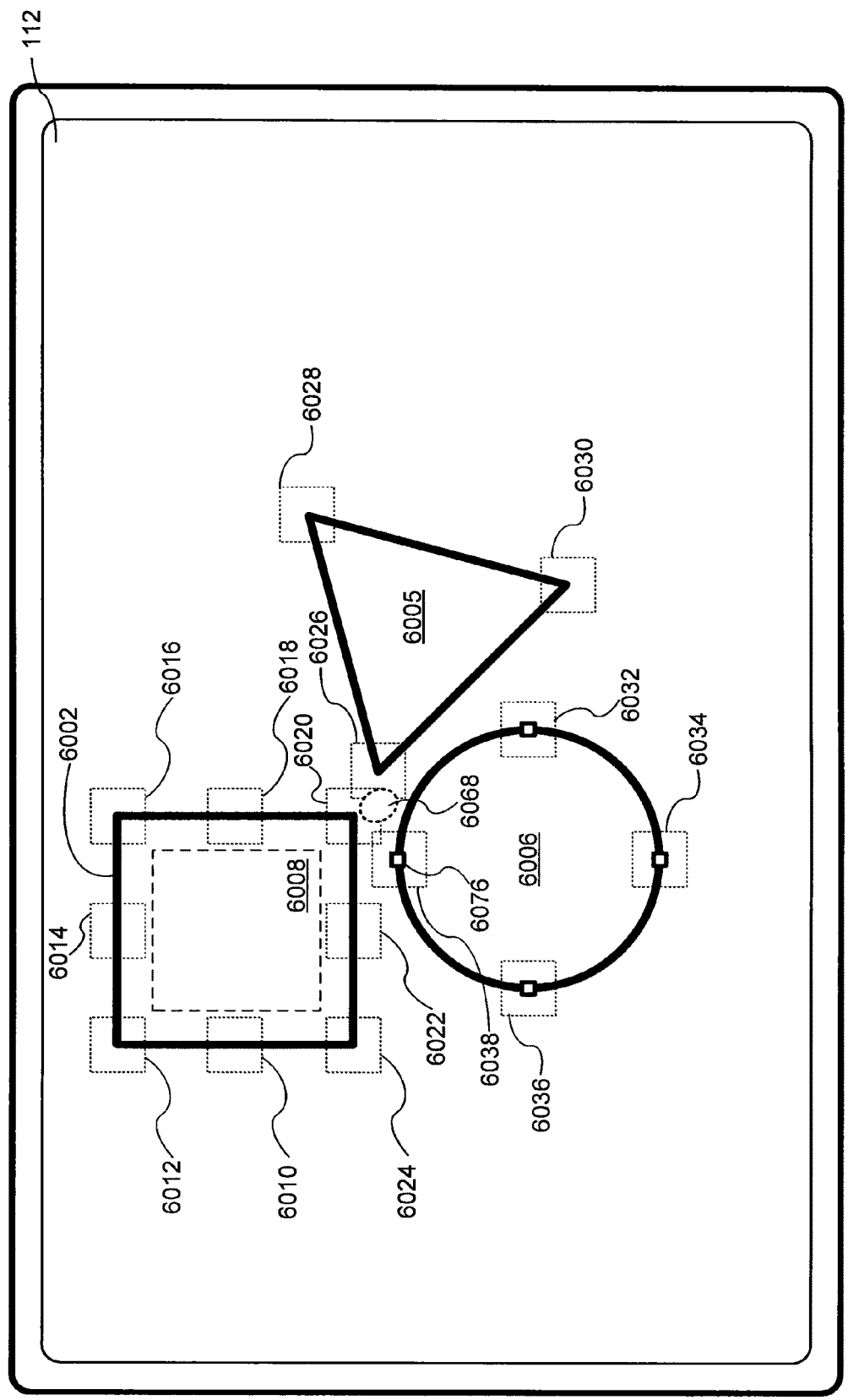

FIGS. 6A-6D illustrate exemplary user interfaces for simultaneously displaying a plurality of user interface objects (e.g., 6002, 6005 and 6006 in FIGS. 6A-6D), detecting a first input (e.g., tap and hold gesture 6040 in FIG. 6B); determining a first plurality of candidate actions (e.g., selecting respective resizing handle associated with activation regions 6020, 6026, and 6038) with a first ordering; performing a first candidate action (e.g., selecting resizing handle 6052 that is associated with an activation region 6020 for the square in FIG. 6B); detecting a second input (e.g., tap gesture 6057 in FIG. 6B); undoing the first candidate action (e.g., deselecting the resizing handle 6052 that is associated with an activation region 6020 for the square, as illustrated in FIG. 6C); determining a second plurality of candidate actions with a second ordering and performing a second candidate action (e.g., selecting resizing handle 6060 that is associated with an activation region 6026 for the triangle in FIG. 6C); and repeating these steps for an additional candidate action (e.g., selecting resizing handle 6076 that is associated with an activation region 6038 for the circle in FIG. 6D) in accordance with some embodiments. The user interfaces in these figures are used to illustrate the processes described below, including the processes described in reference to FIGS. 9A-9D.

FIGS. 6A-6C also illustrate exemplary user interfaces for simultaneously displaying a plurality of user interface objects (e.g., 6002, 6005 and 6006 in FIGS. 6A-6D), detecting a first input (e.g., tap and hold gesture 6040 in FIG. 6B); determining a first plurality of candidate actions (e.g., selecting respective resizing handle associated with activation regions 6020, 6026, and 6038) with a first ordering; performing a first candidate action (e.g., selecting resizing handle 6052 that is associated with an activation region 6020 for the square in FIG. 6B); receiving a second input (e.g., tap and hold gesture 6058 in FIG. 6C); determining a second plurality of candidate actions with a second ordering; undoing the first candidate action (e.g., deselecting the resizing handle 6052 that is associated with an activation region 6020 for the square, as illustrated in FIG. 6C) and performing a second candidate action (e.g., selecting resizing handle 6060 that is associated with an activation region 6026 for the triangle in FIG. 6C) in accordance with some embodiments. The user interfaces in these figures are used to illustrate the processes described below, including the processes described in reference to FIG. 10.

Figure 6E:
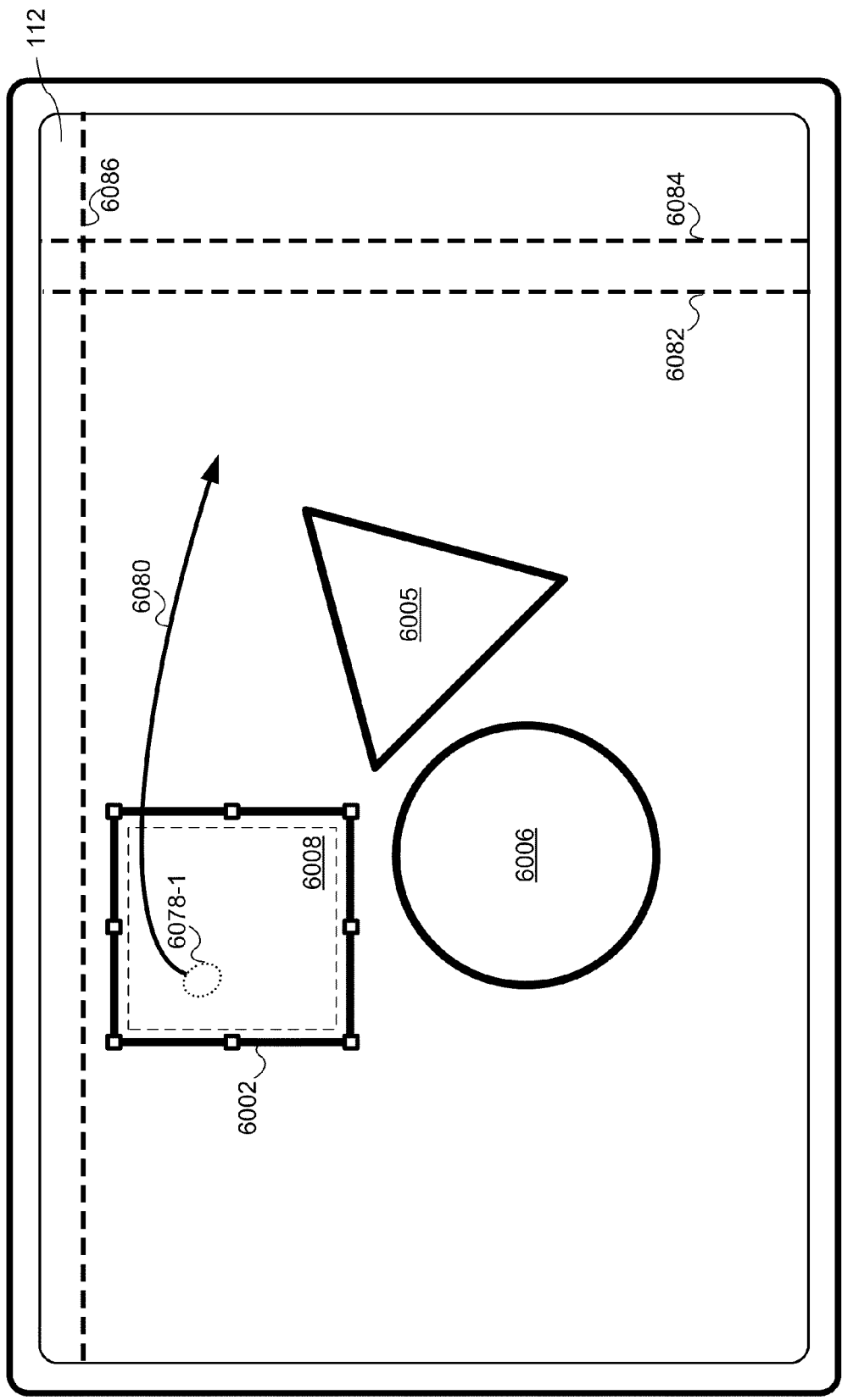
Figure 6F:
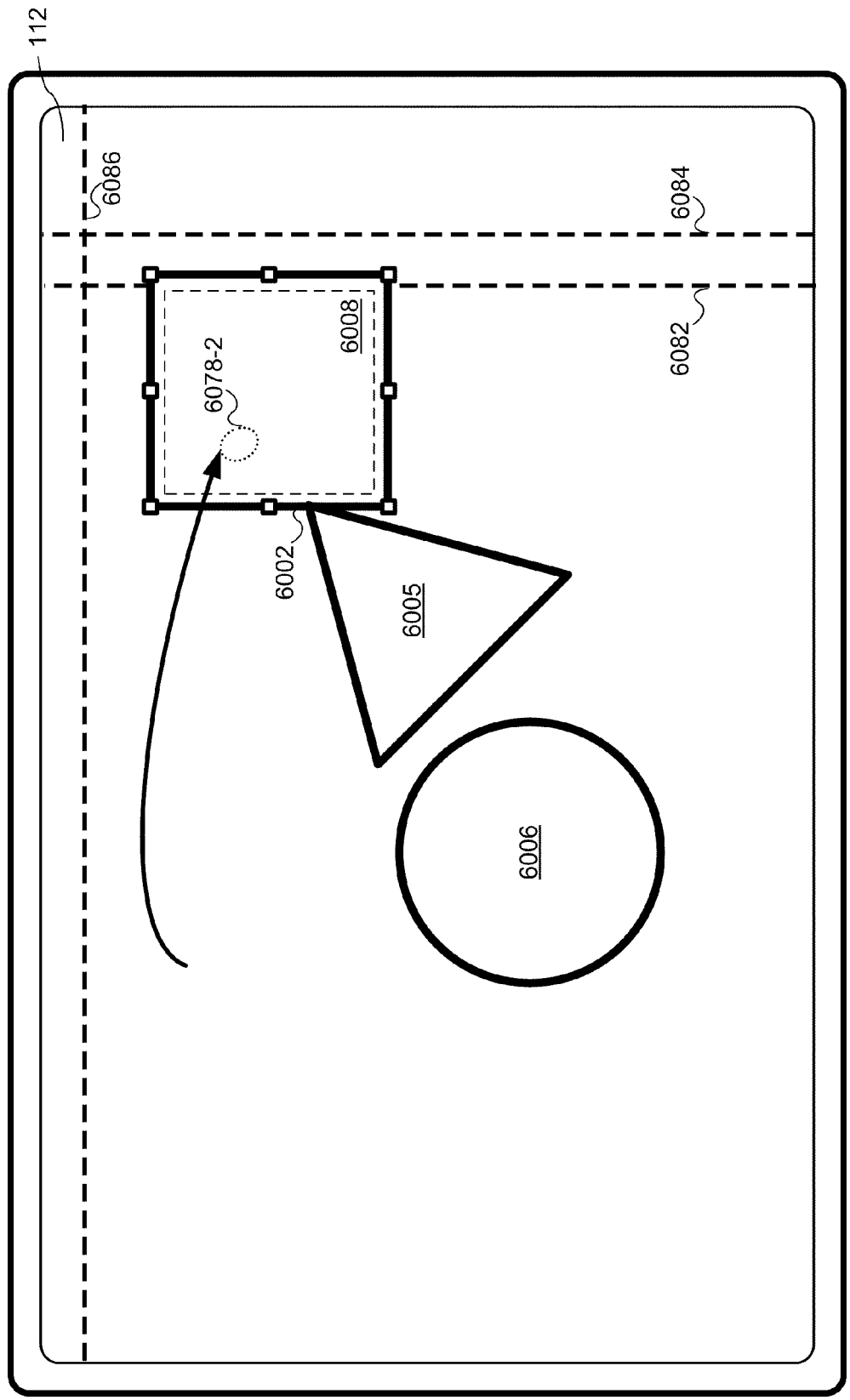
Figure 6G:
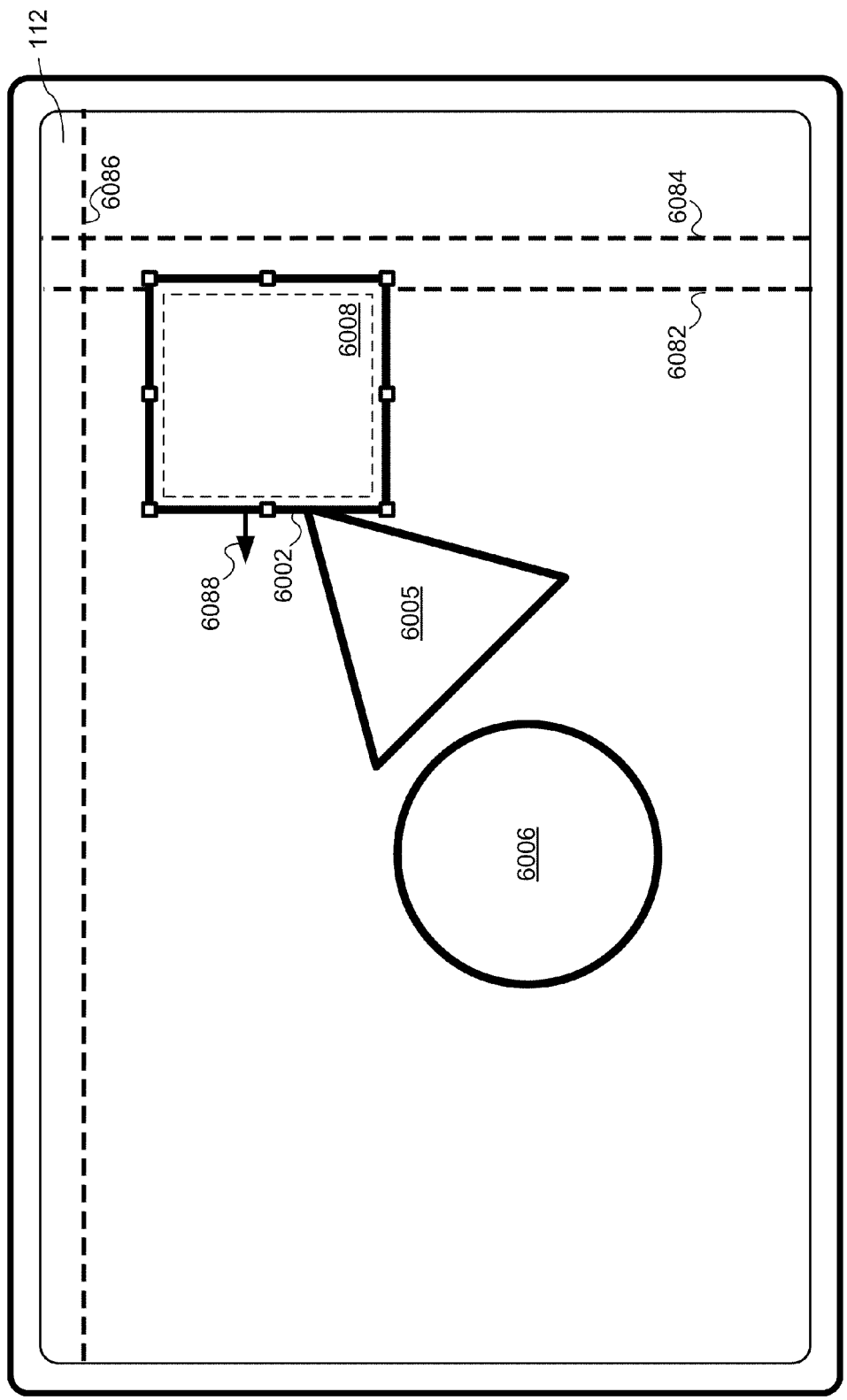
Figure 6H:
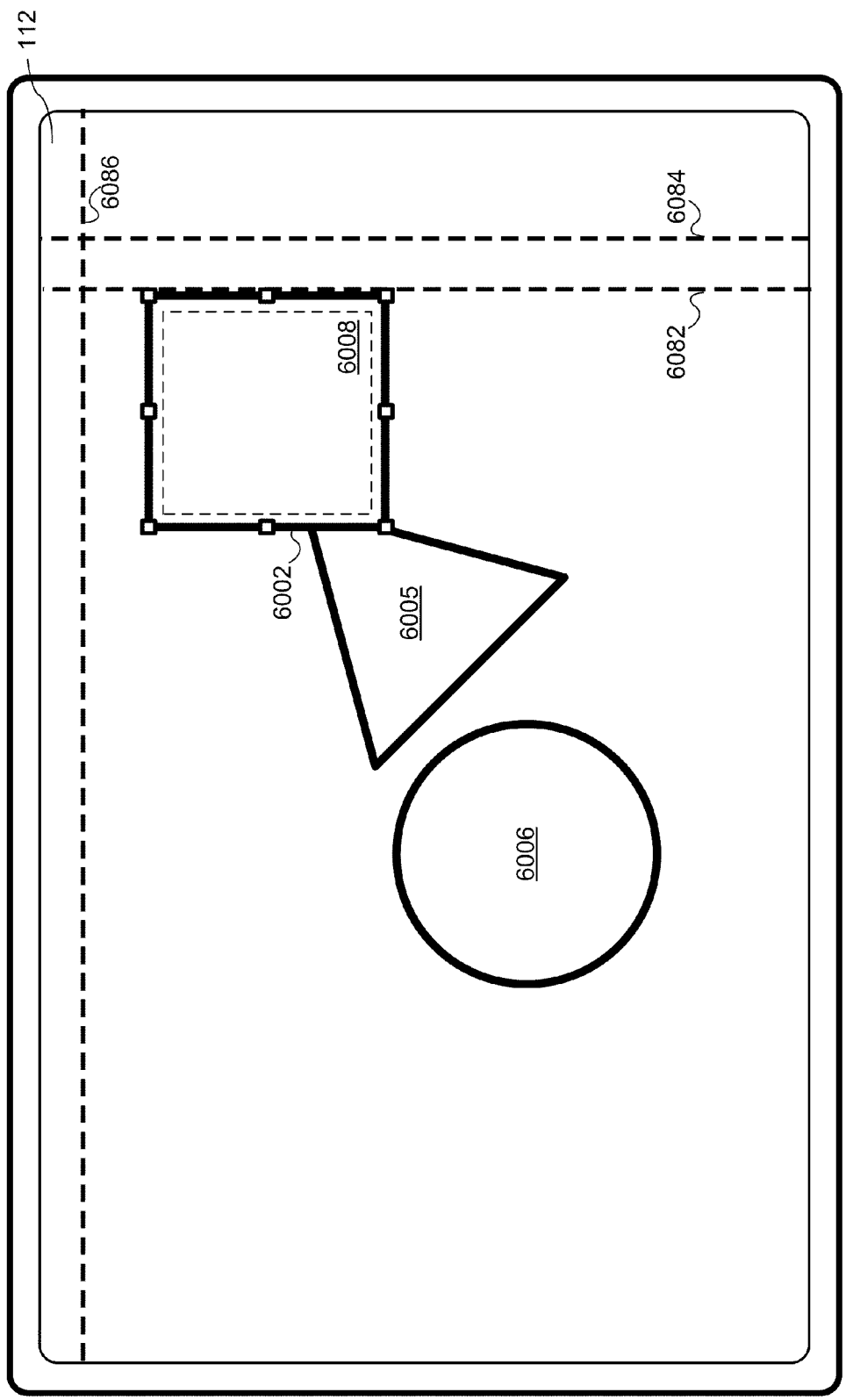
Figure 6I:
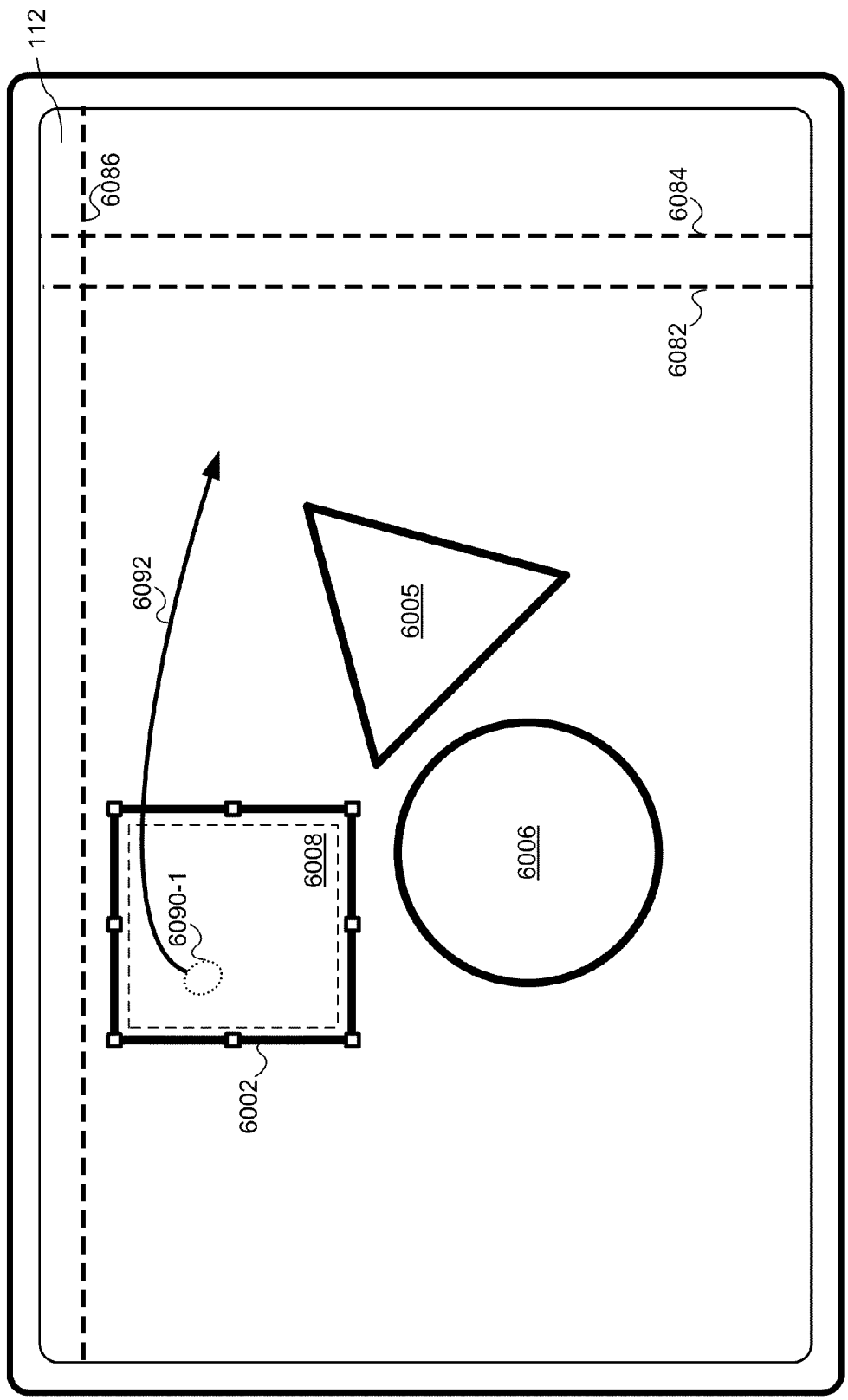
Figure 6J:
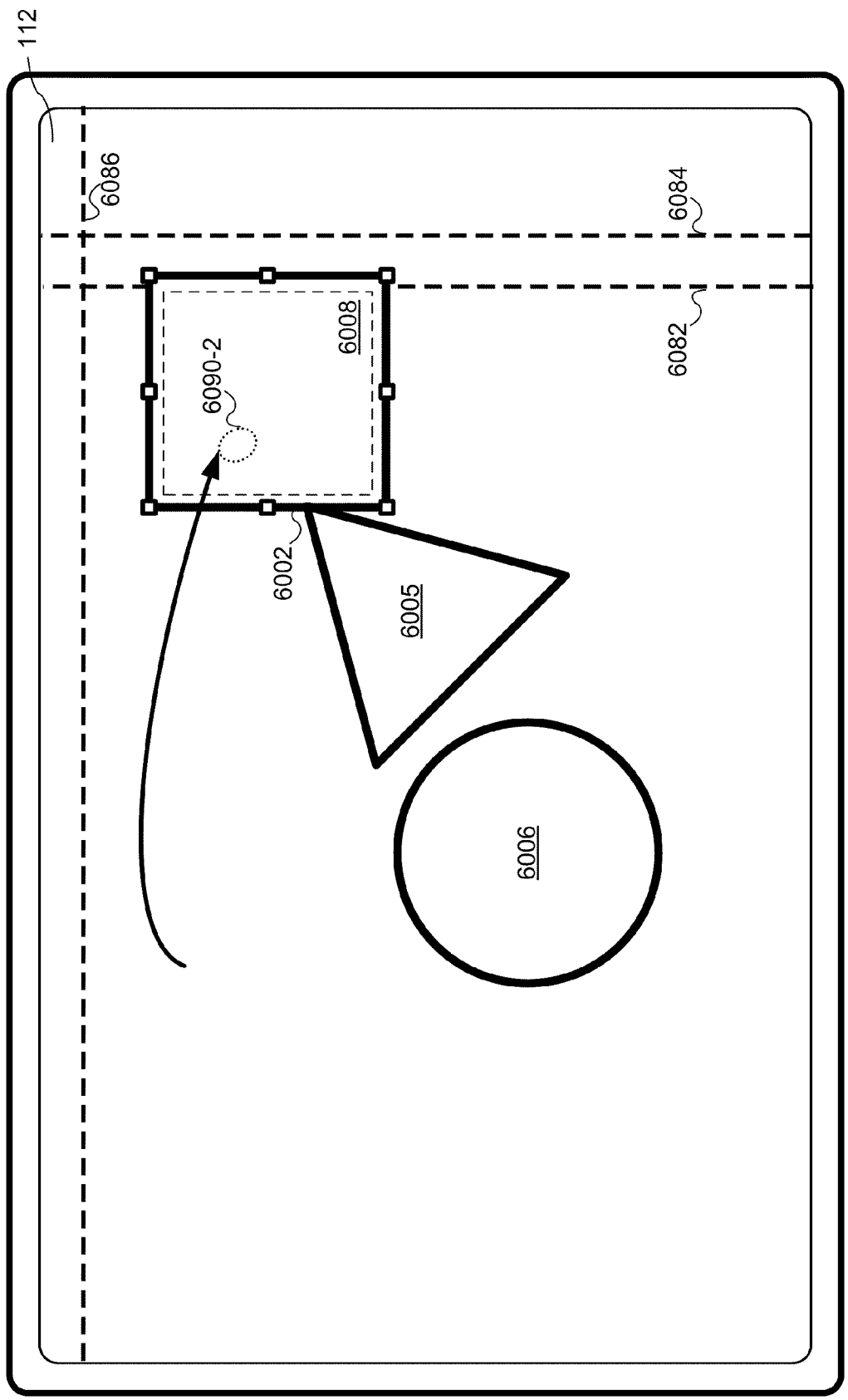
Figure 6K:
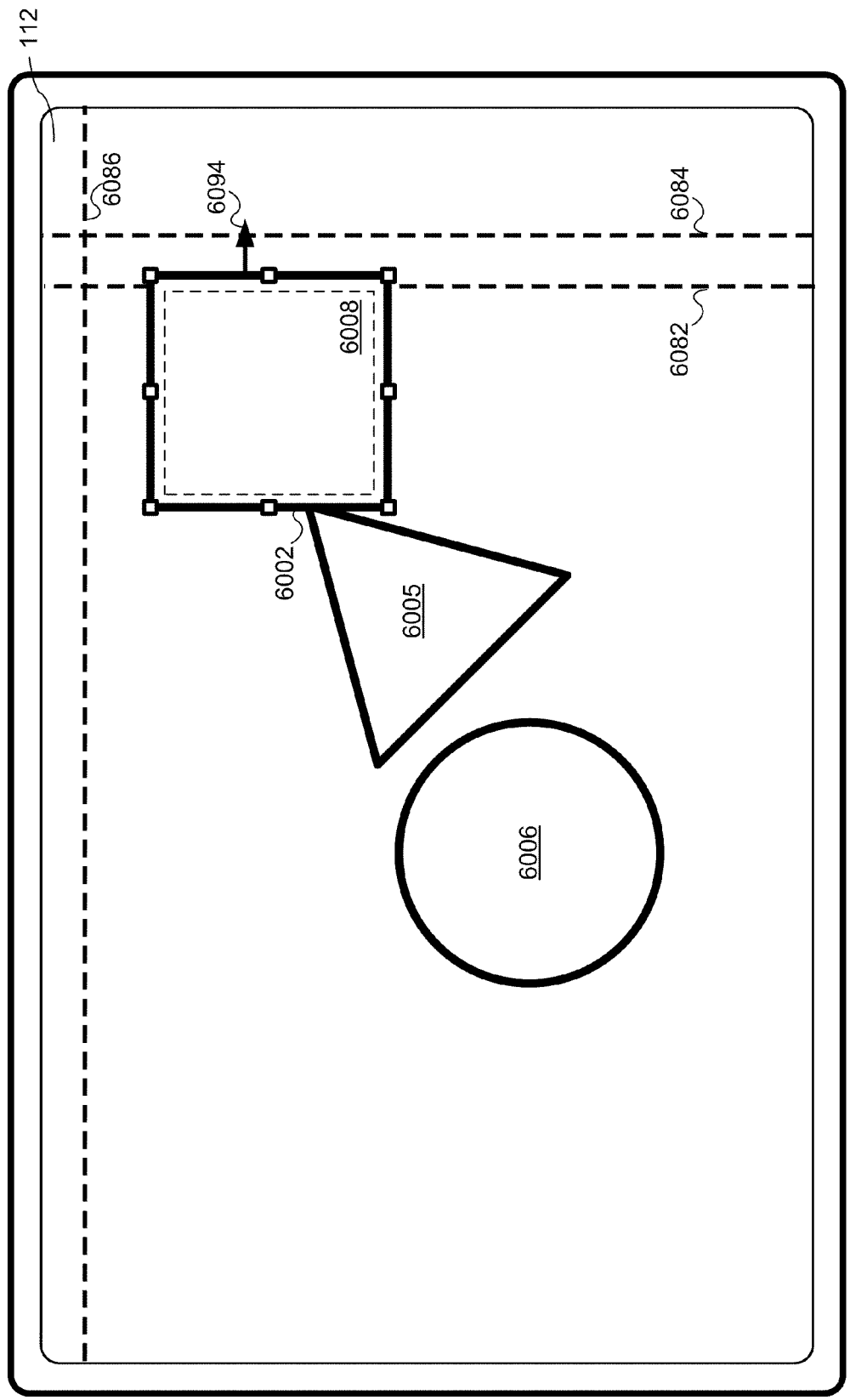
Figure 6L:
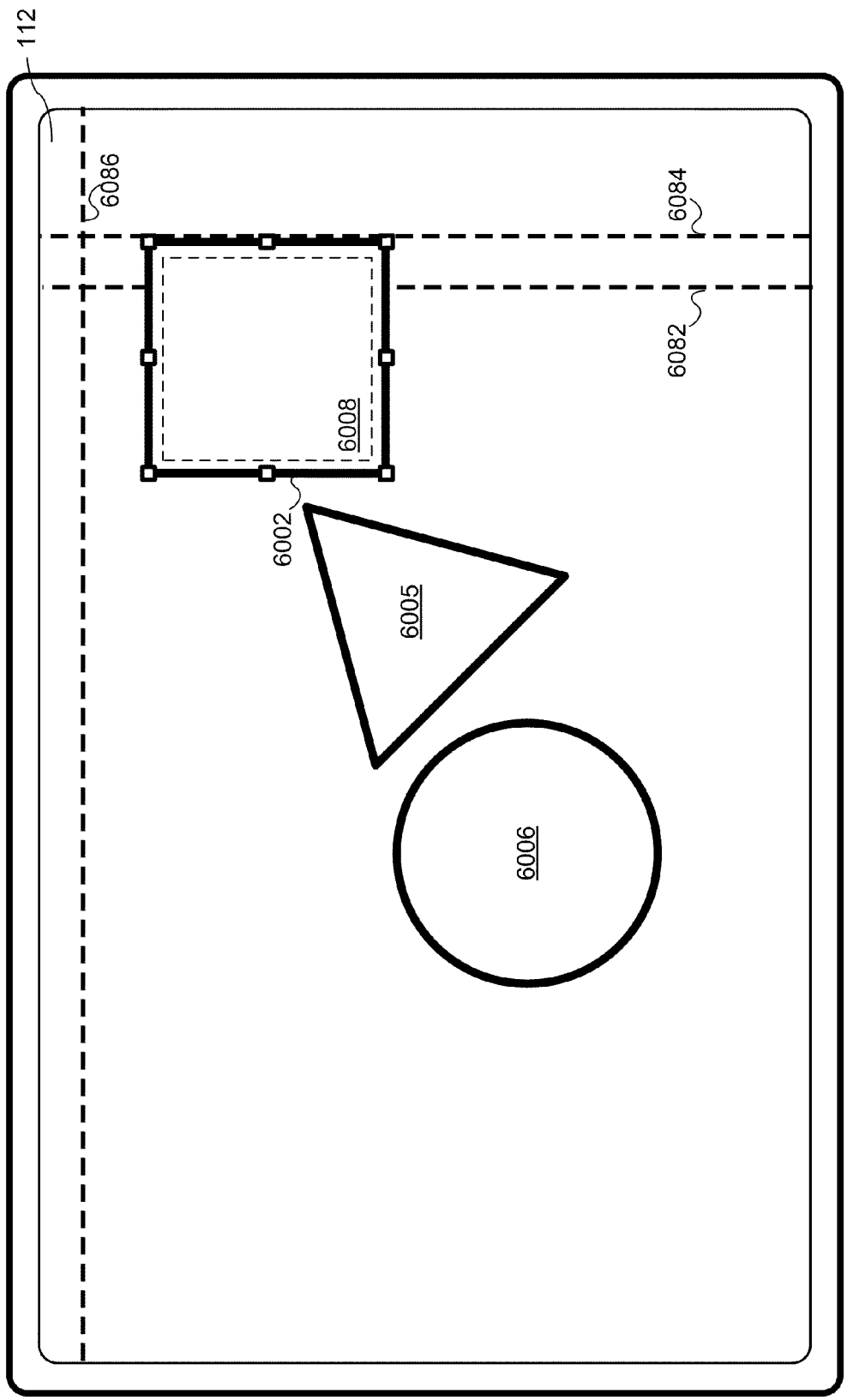
Figure 6M:
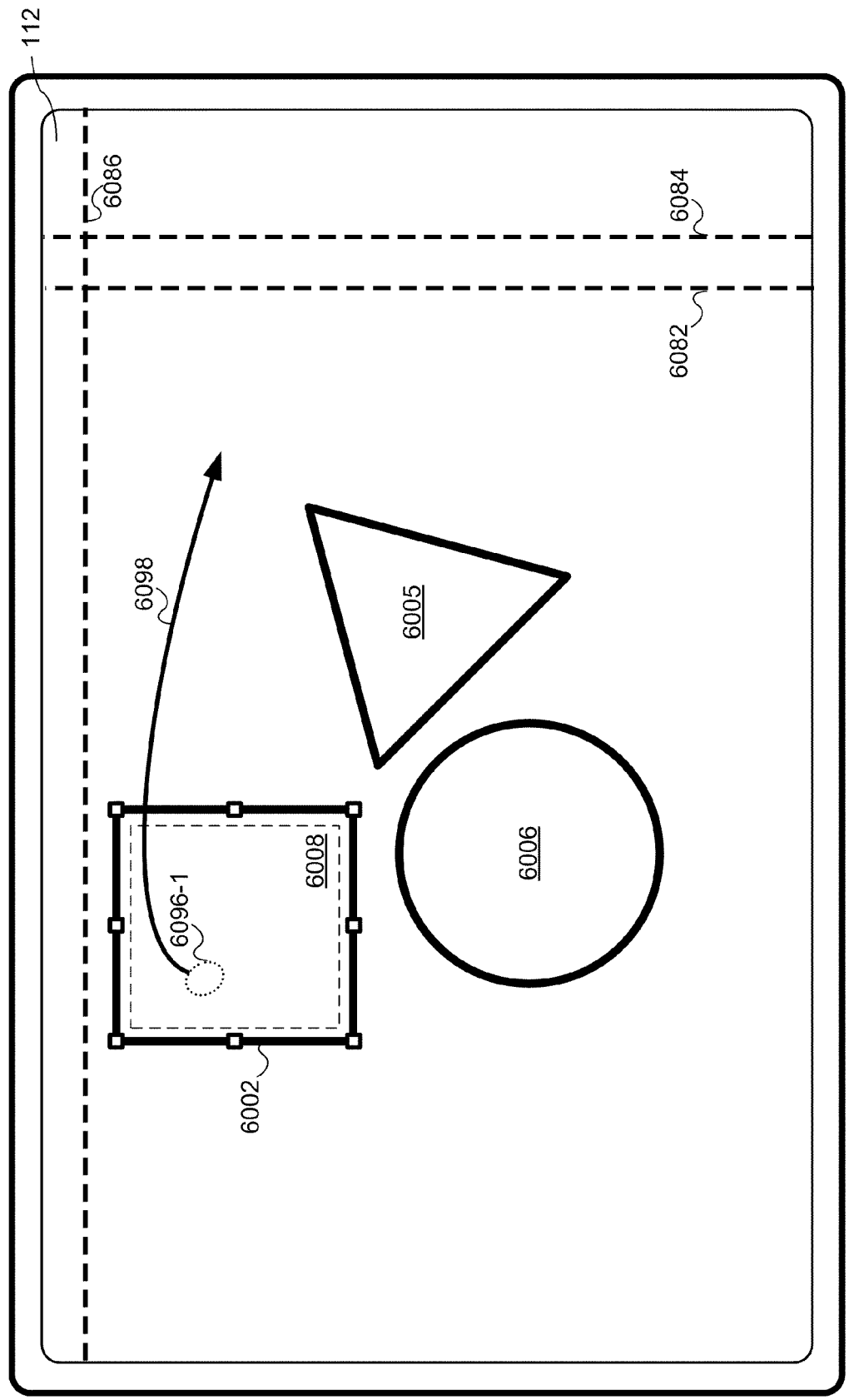
Figure 6N:
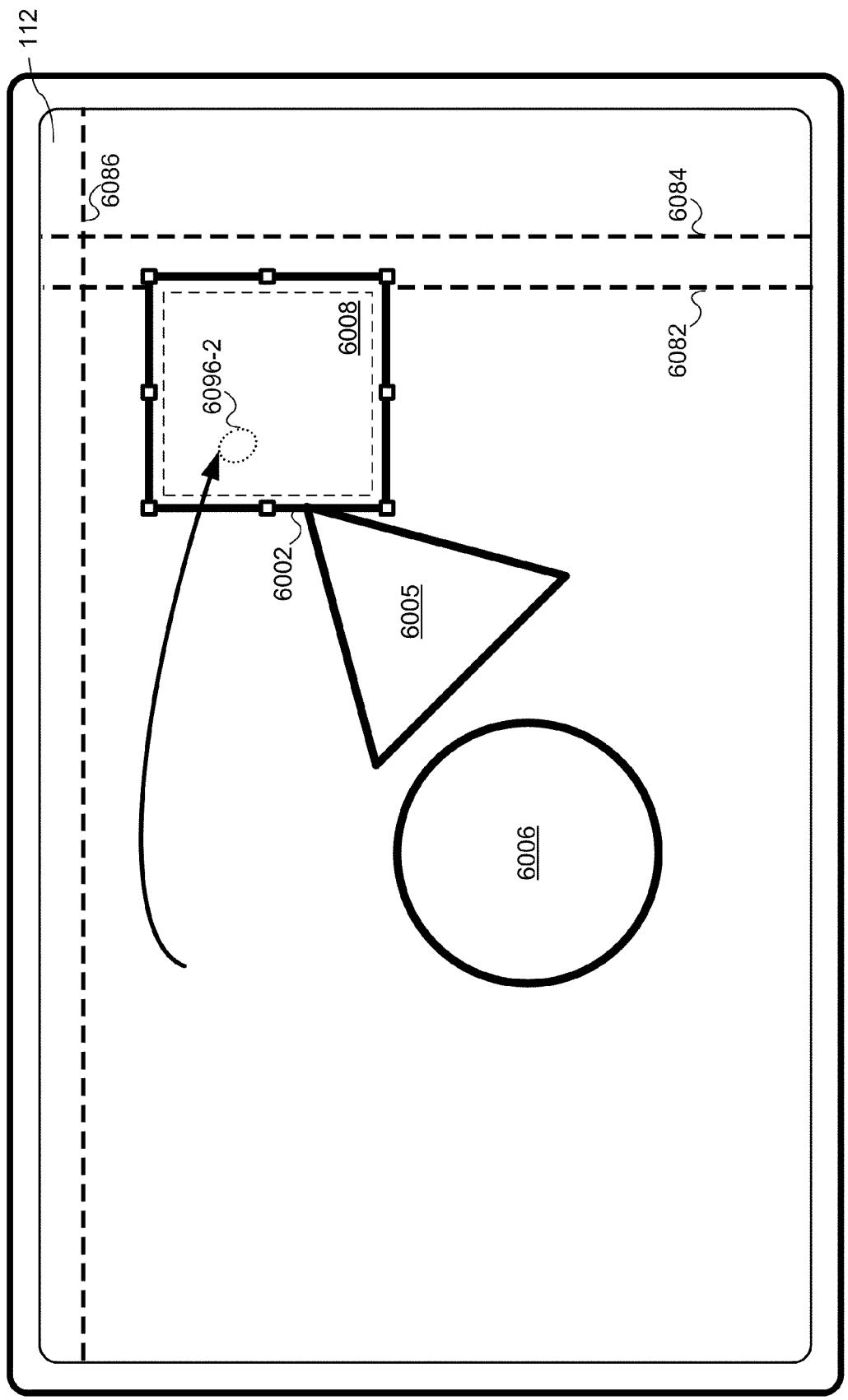
Figure 6O:
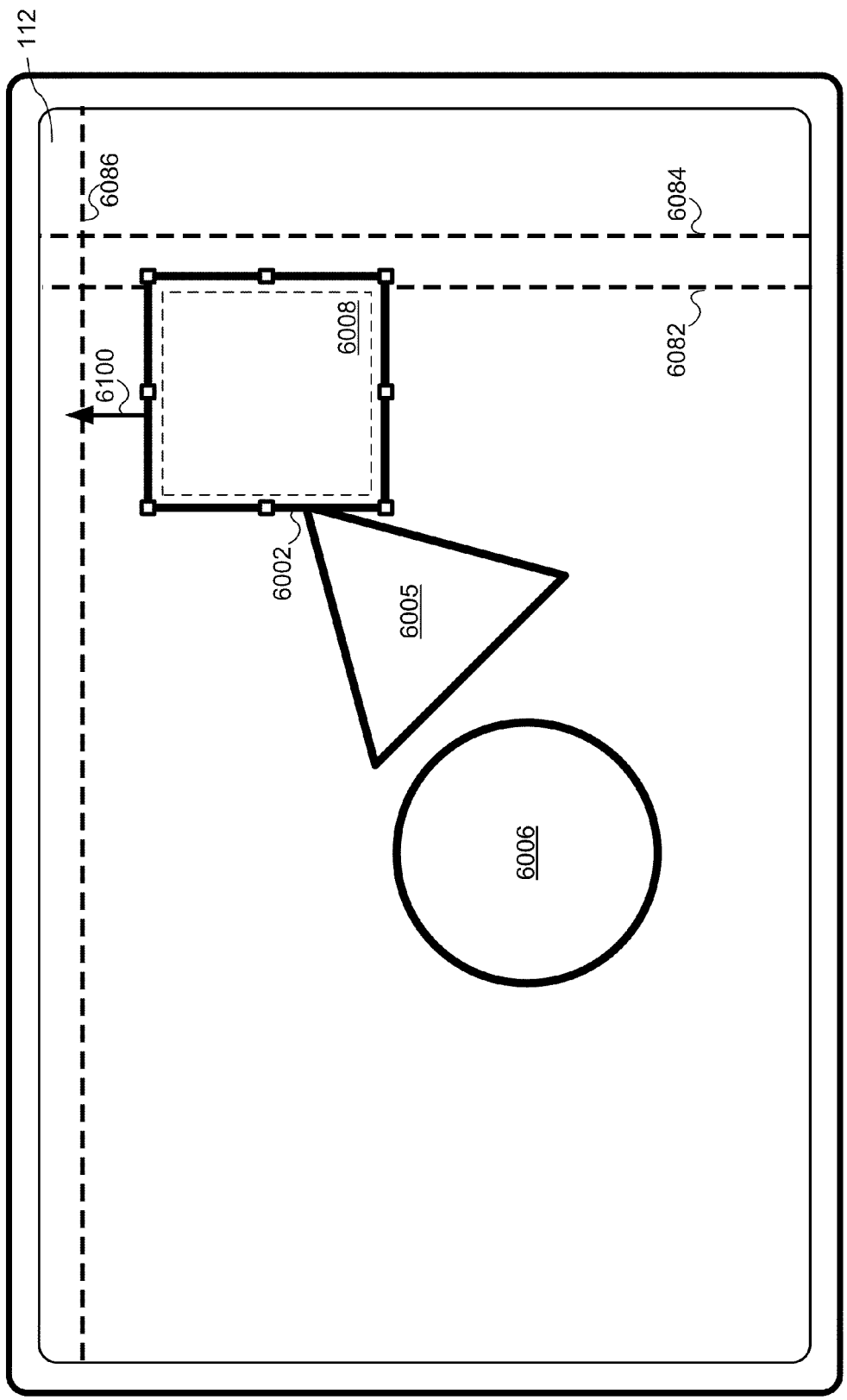
Figure 6P:
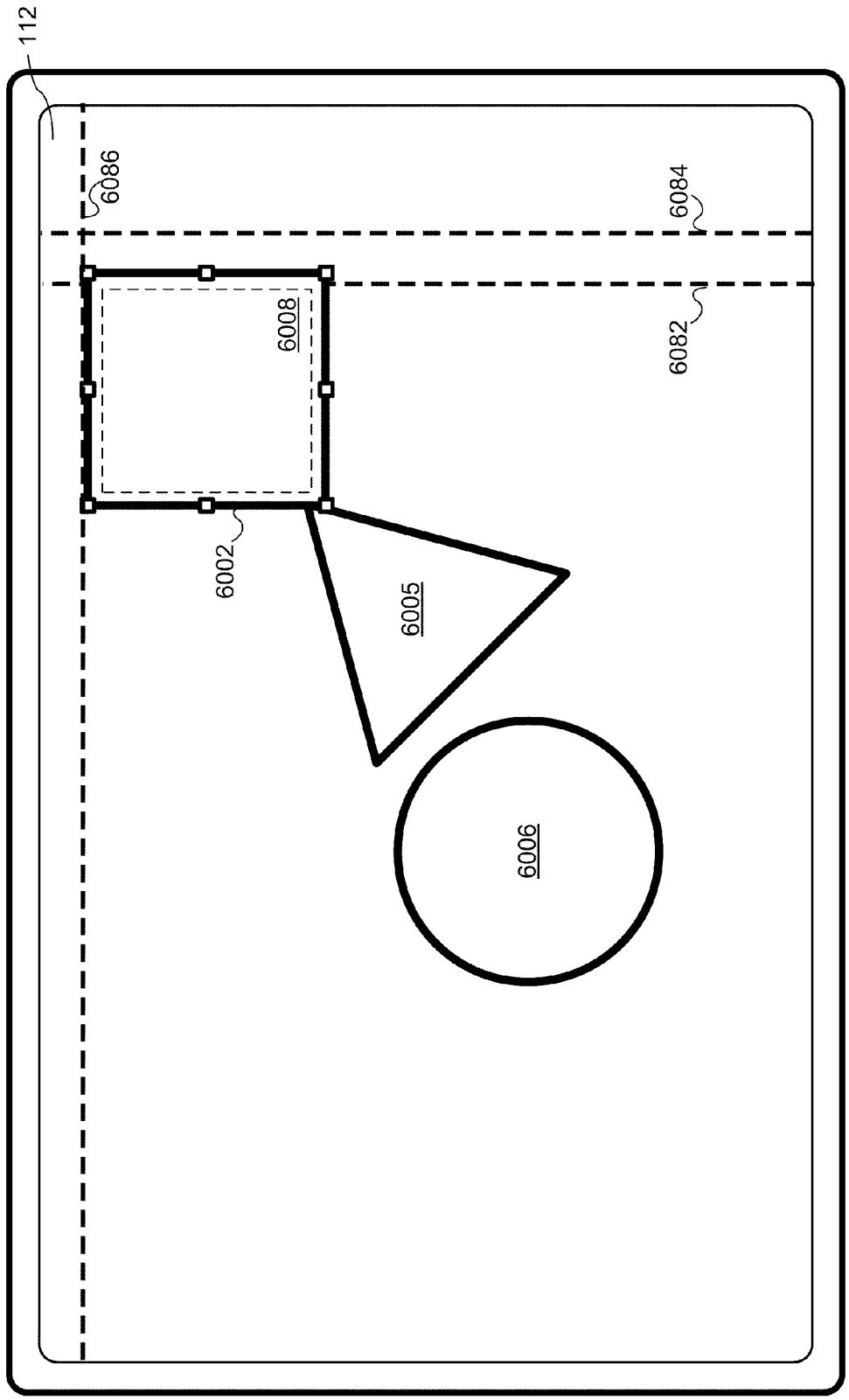

FIGS. 6E-6P illustrate exemplary user interfaces for simultaneously displaying a plurality of user interface objects (e.g., 6002, 6005 and 6006 in FIGS. 6E-6P), detecting a first input (e.g., tap and drag gesture including contact 6078 and movement 6080 of the contact from a first contact location 6078-1 to a second contact location 6078-2 in FIG. 6E); determining a first plurality of candidate actions (e.g., snapping a user interface object 6002 to first guide 6082, a second guide 6084, or third guide 6086) with a first ordering; performing a first candidate action (e.g., snapping the user interface object 6002 to the first guide 6082, as shown in FIGS. 6G-6H); detecting a second input (e.g., a keyboard command such as pressing control+z simultaneously); undoing the first candidate action (e.g., returning the user interface object 6002 to its initial position, as illustrated in FIG. 6I); receiving a third input (e.g., tap and drag gesture including contact 6090 and movement 6092 of the contact from a first contact location 6090-1 to a second contact location 6090-2 in FIG. 6I) determining a second plurality of candidate actions with a second ordering and performing a second candidate action (e.g., snapping the user interface object 6002 to the second guide 6084, as shown in FIGS. 6K-6L) and repeating these steps for an additional candidate action (e.g., snapping the user interface object 6002 to the third guide 6086, as shown in FIGS. 6O-6P) in accordance with some embodiments. The user interfaces in these figures are used to illustrate the processes described below, including the processes described in reference to FIGS. 9A-9D.

FIGS. 6E-6P also illustrate exemplary user interfaces for simultaneously displaying a plurality of user interface objects (e.g., 6002, 6005 and 6006 in FIGS. 6E-6P), detecting a first input (e.g., tap and drag gesture including contact 6078 and movement 6080 of the contact from a first contact location 6078-1 to a second contact location 6078-2 in FIG. 6E); determining a first plurality of candidate actions (e.g., snapping a user interface object 6002 to first guide 6082, a second guide 6084, or third guide 6086) with a first ordering; performing a first candidate action (e.g., snapping the user interface object 6002 to the first guide 6082, as shown in FIGS. 6G-6H); receiving a second input (e.g., tap and drag gesture including contact 6090 and movement 6092 of the contact from a first contact location 6090-1 in FIG. 6I to a second contact location 6090-2 in FIG. 6J) that undoes the first candidate action; determining a second plurality of candidate actions with a second ordering and performing a second candidate action (e.g., snapping the user interface object 6002 to the second guide 6084, as shown in FIGS. 6K-6L) and repeating these steps for an additional candidate action (e.g., snapping the user interface object 6002 to the third guide 6086, as shown in FIGS. 6O-6P) in accordance with some embodiments. The user interfaces in these figures are used to illustrate the processes described below, including the processes described in reference to FIG. 10.

Figure 7A:
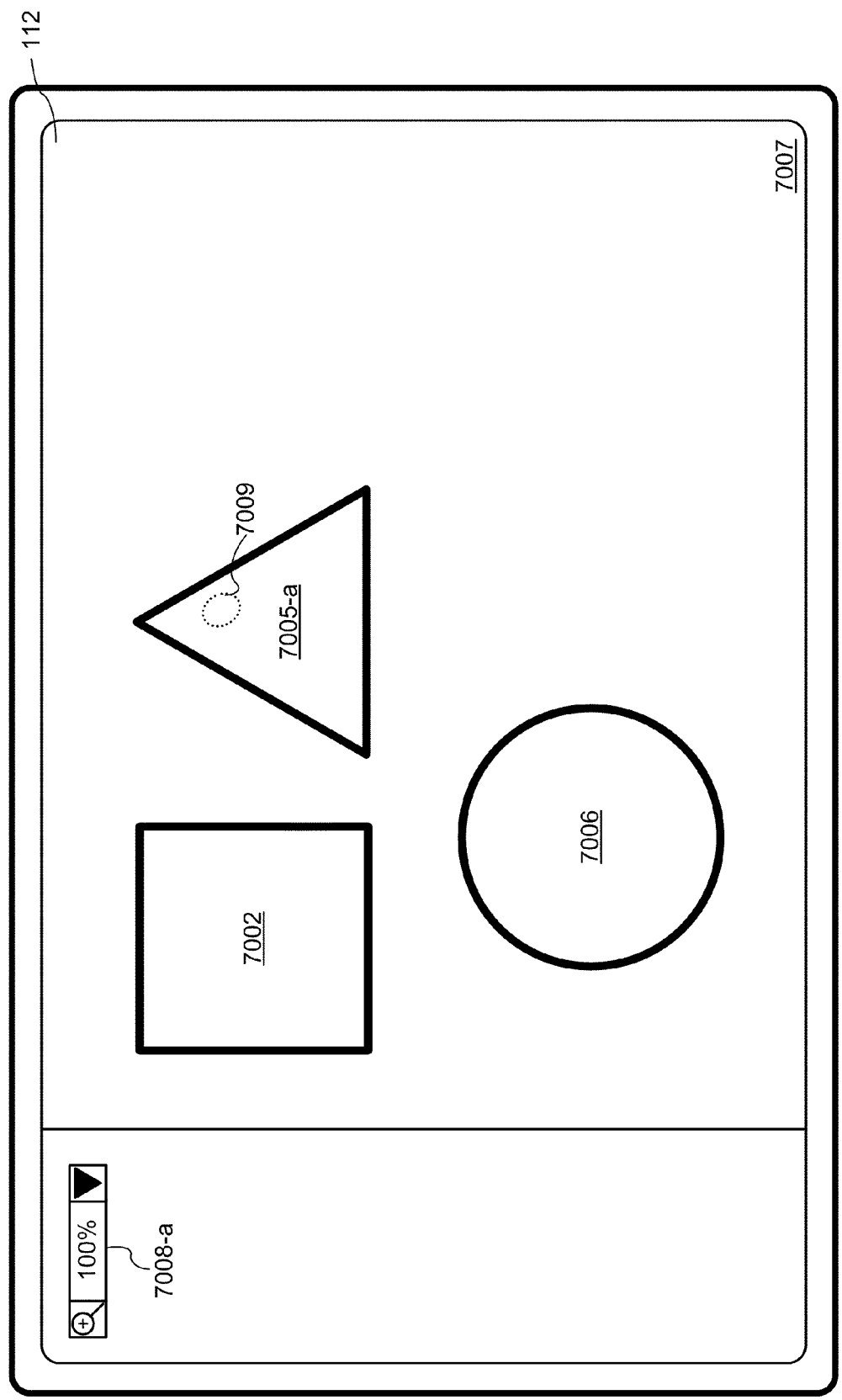
Figure 7B:
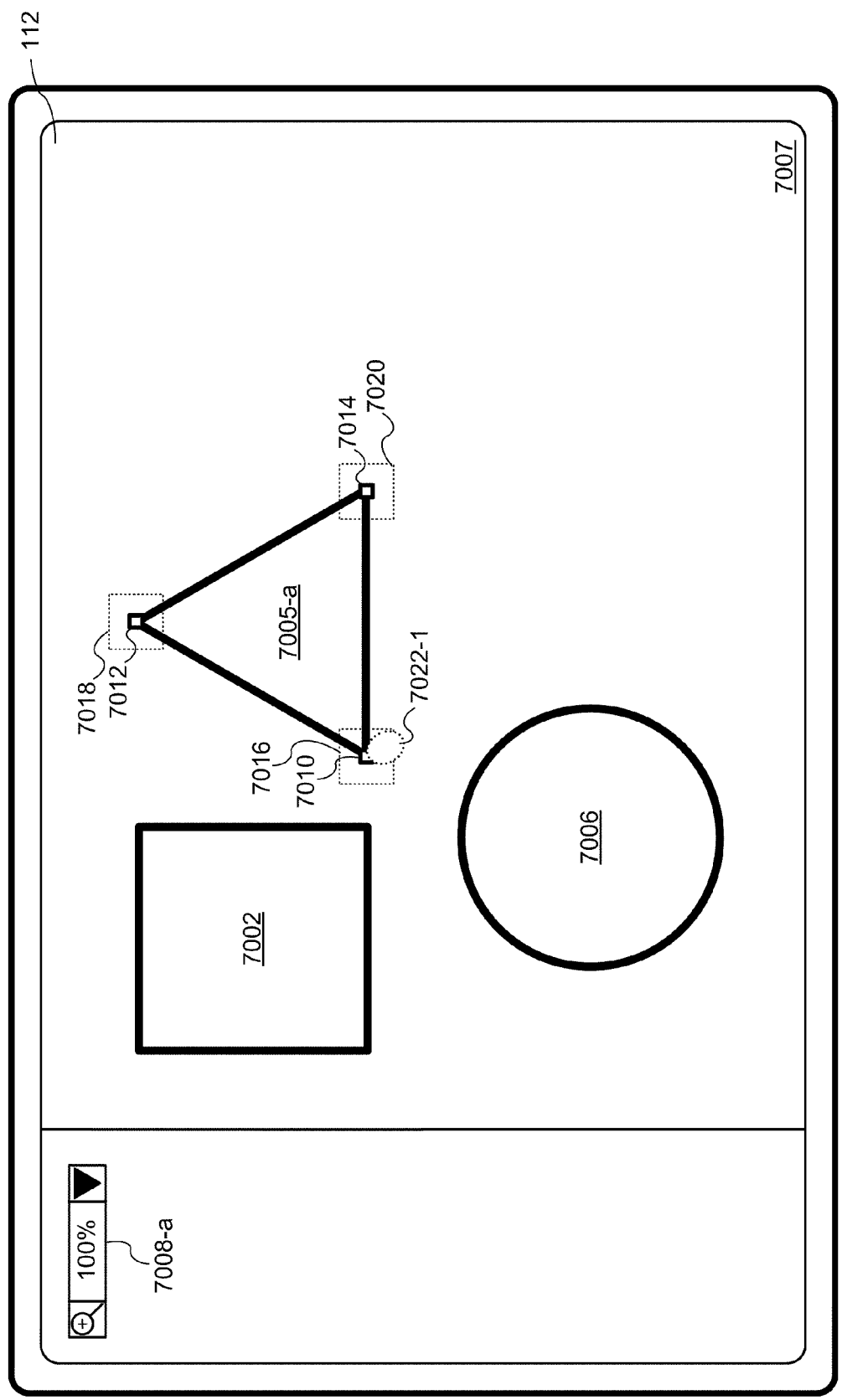
Figure 7C:
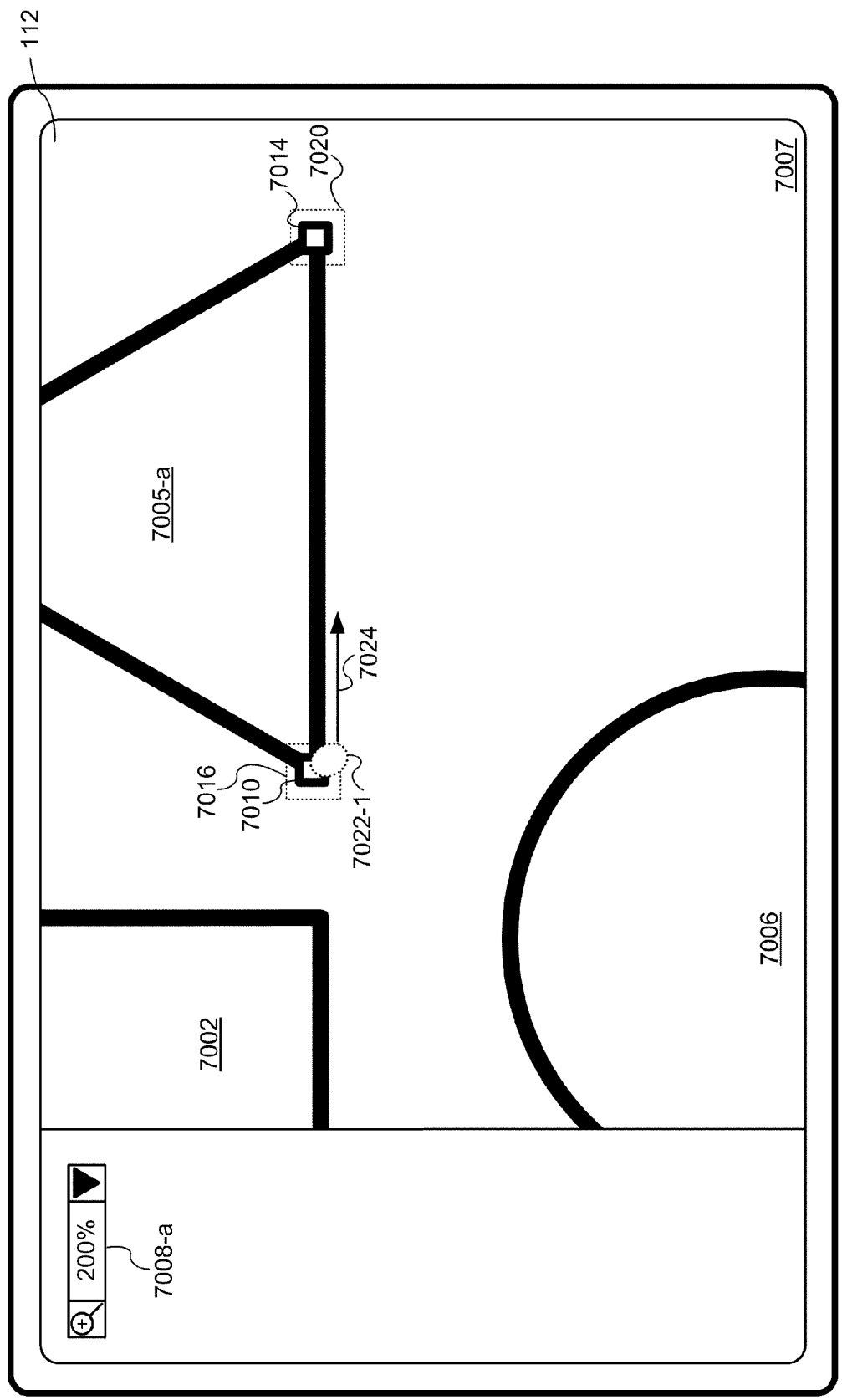
Figure 7D:
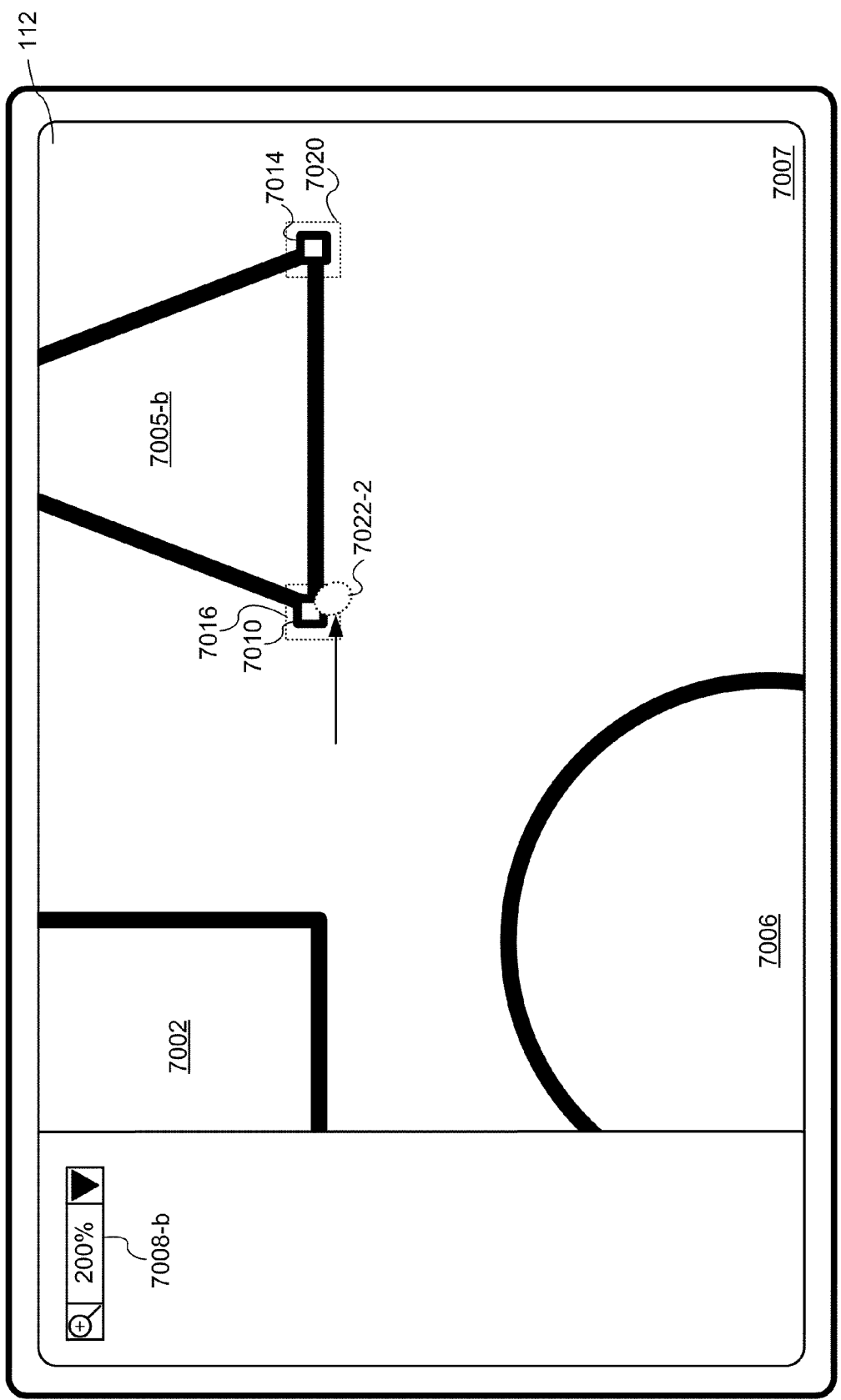

FIGS. 7A-7E illustrate exemplary user interfaces for simultaneously displaying a plurality of user interface objects (e.g., 7002, 7005 and 7006 in FIGS. 7A-7E) in a display area 7007; detecting selection of one of the user interface objects (e.g., 7005-a in FIG. 7A); detecting a first contact (e.g., 7022 in FIG. 7B) with a first handle activation region (e.g., 7016 in FIG. 7B) that corresponds to a first handle (e.g., 7010 in FIG. 7B), continuing to detect the first contact at the first location for a predefined amount of time and automatically zooming around the first contact zooming the display area to a higher magnification level (e.g., 200%, as illustrated in FIGS. 7C-7D); while the display area is at the second magnification level, detecting a movement of the first contact (e.g., movement 7024 of the contact 7022 from a first contact location 7022-1 in FIG. 7C to a second contact location 7022-2 in FIG. 7D); detecting a release of the first contact and returning the display area 7007 to the original magnification level (e.g., 100%, as illustrated in FIG. 7E) in accordance with some embodiments. The user interfaces in these figures are used to illustrate the processes described below, including the processes described in reference to FIGS. 11A-11C.

Figure 7F:
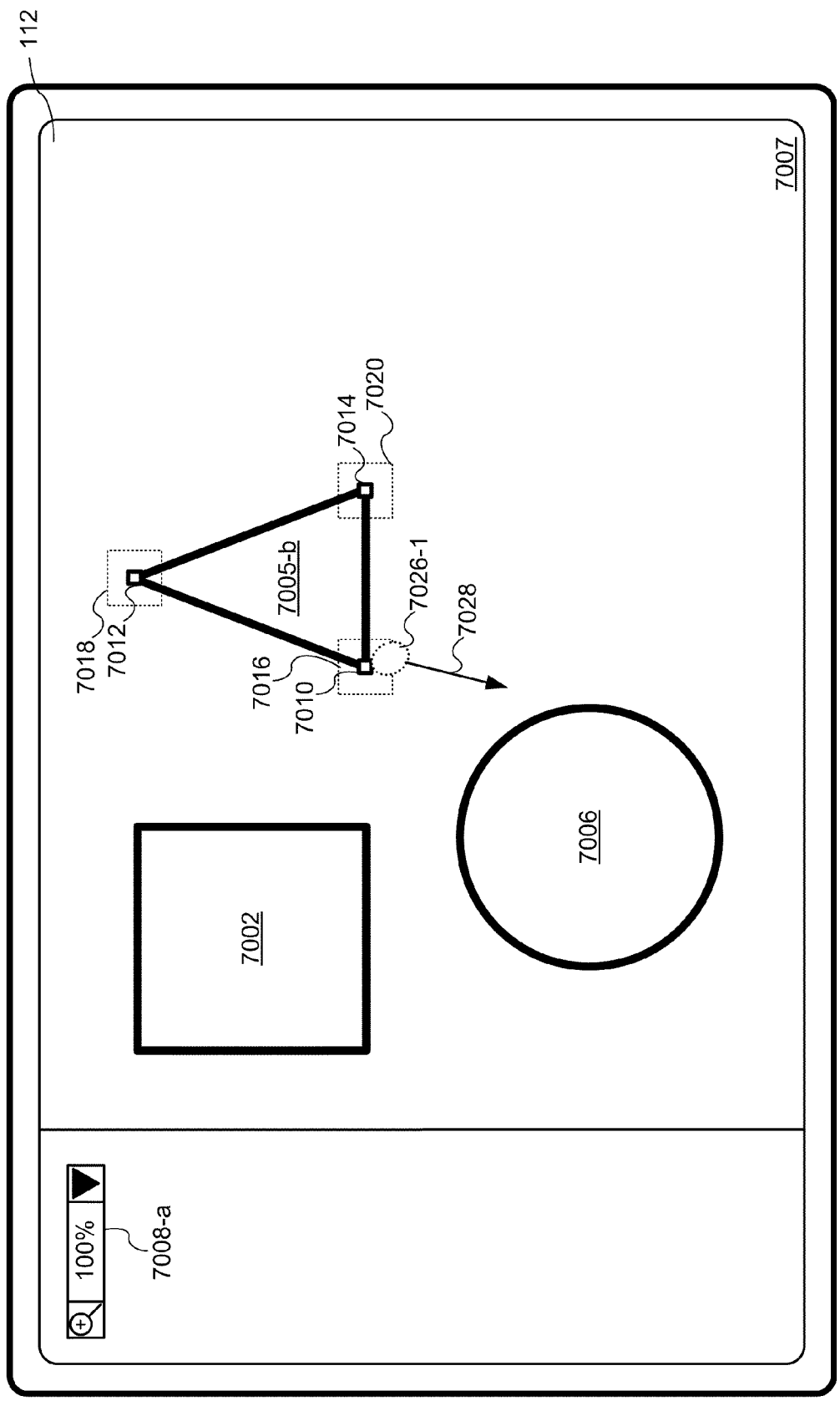
Figure 7G:
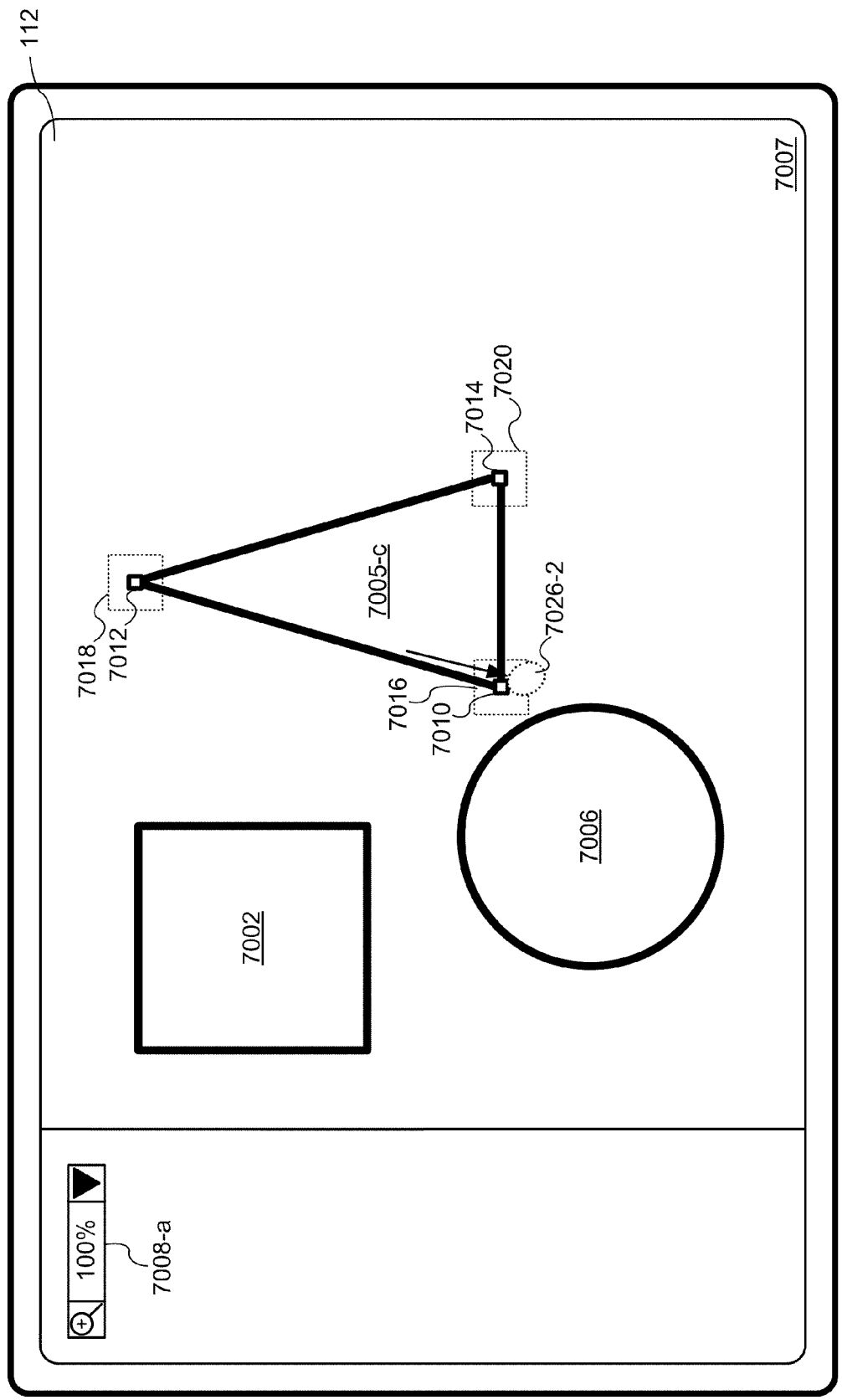
Figure 8A:
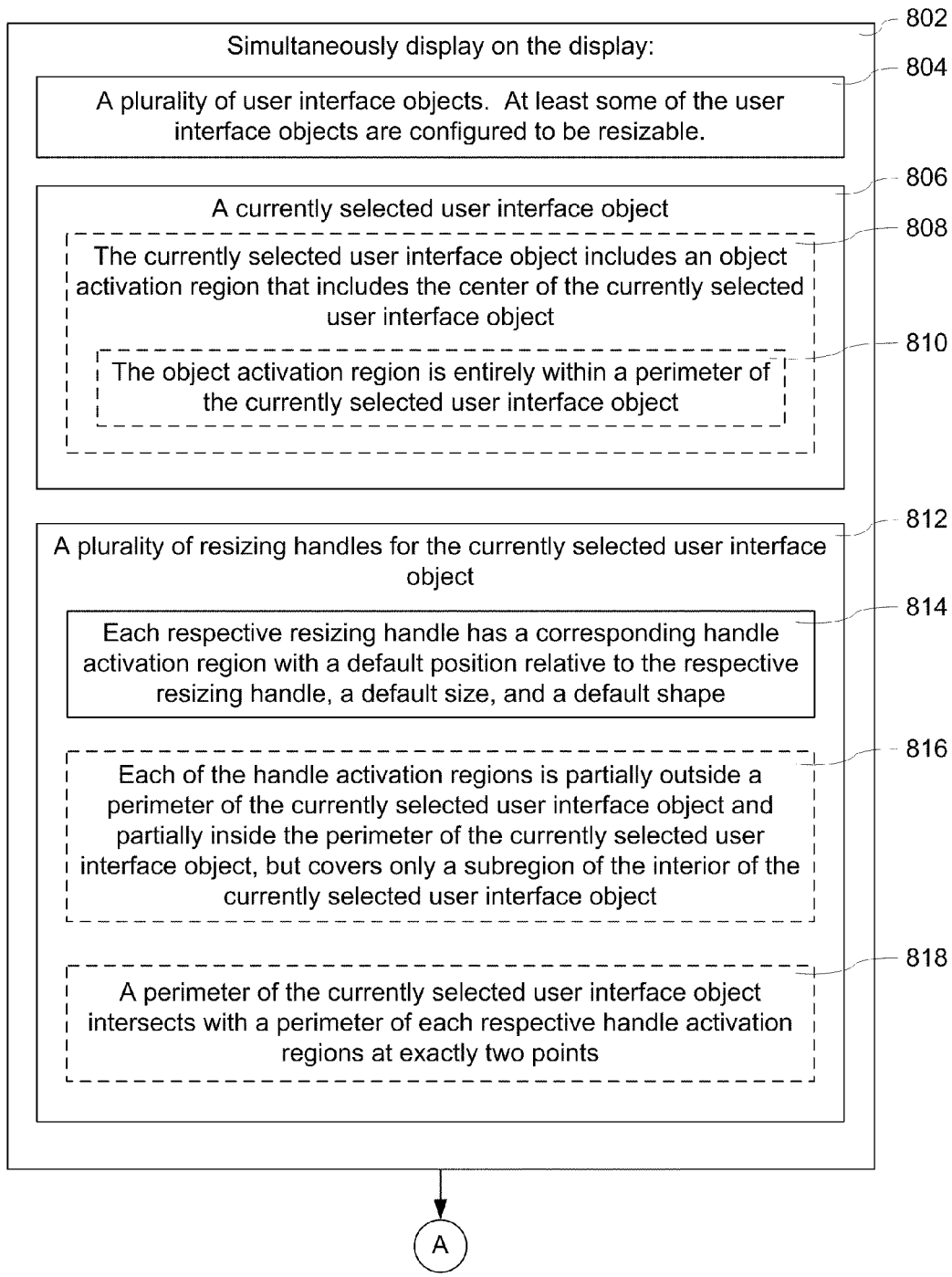
FIGS. 8A-8D are flow diagrams illustrating a method of modifying handle activation regions for resizing handles of a user interface object in accordance with some embodiments.
Figure 8A:
Figure 8B:
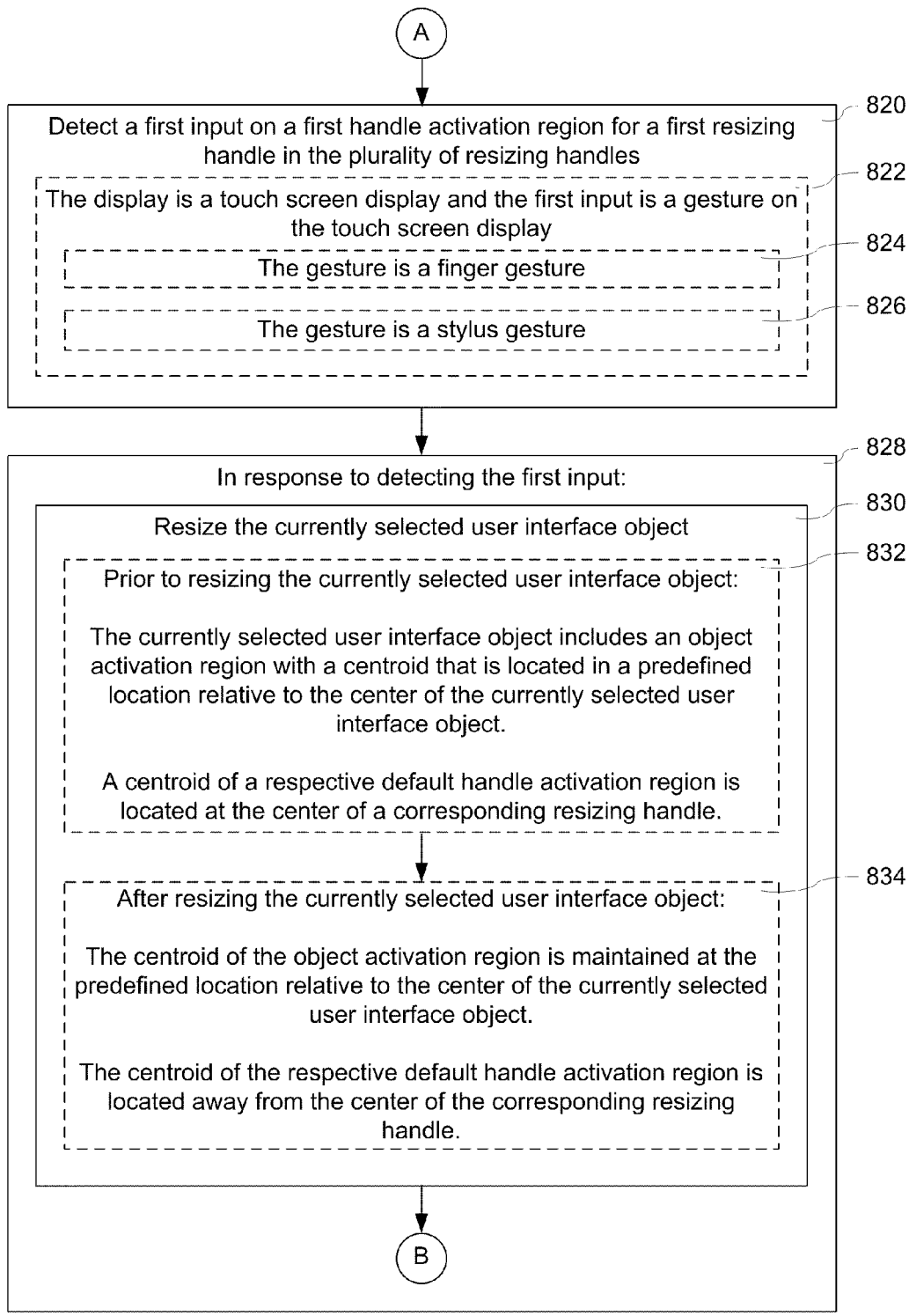
Figure 8C:
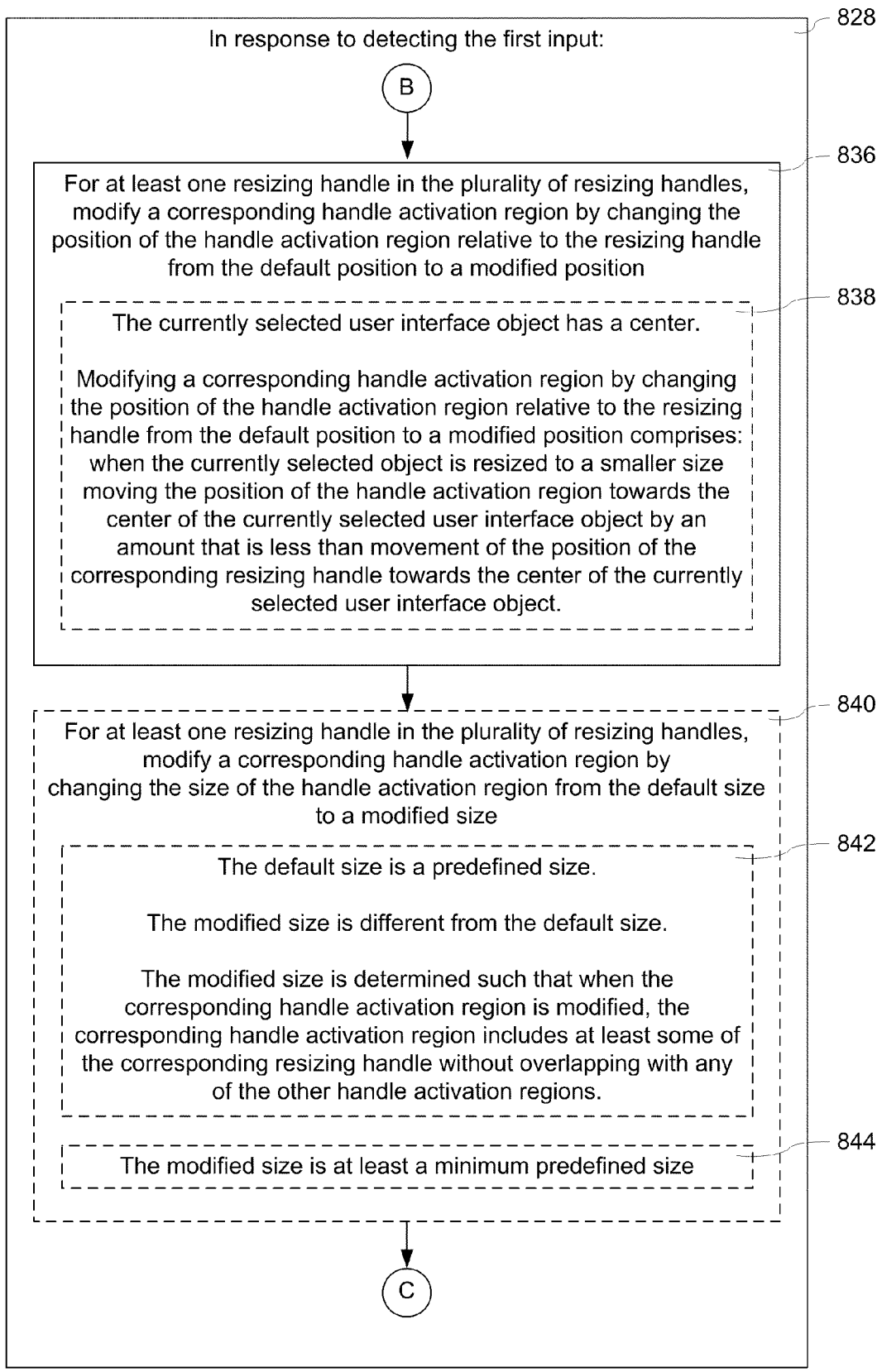
Figure 8D:
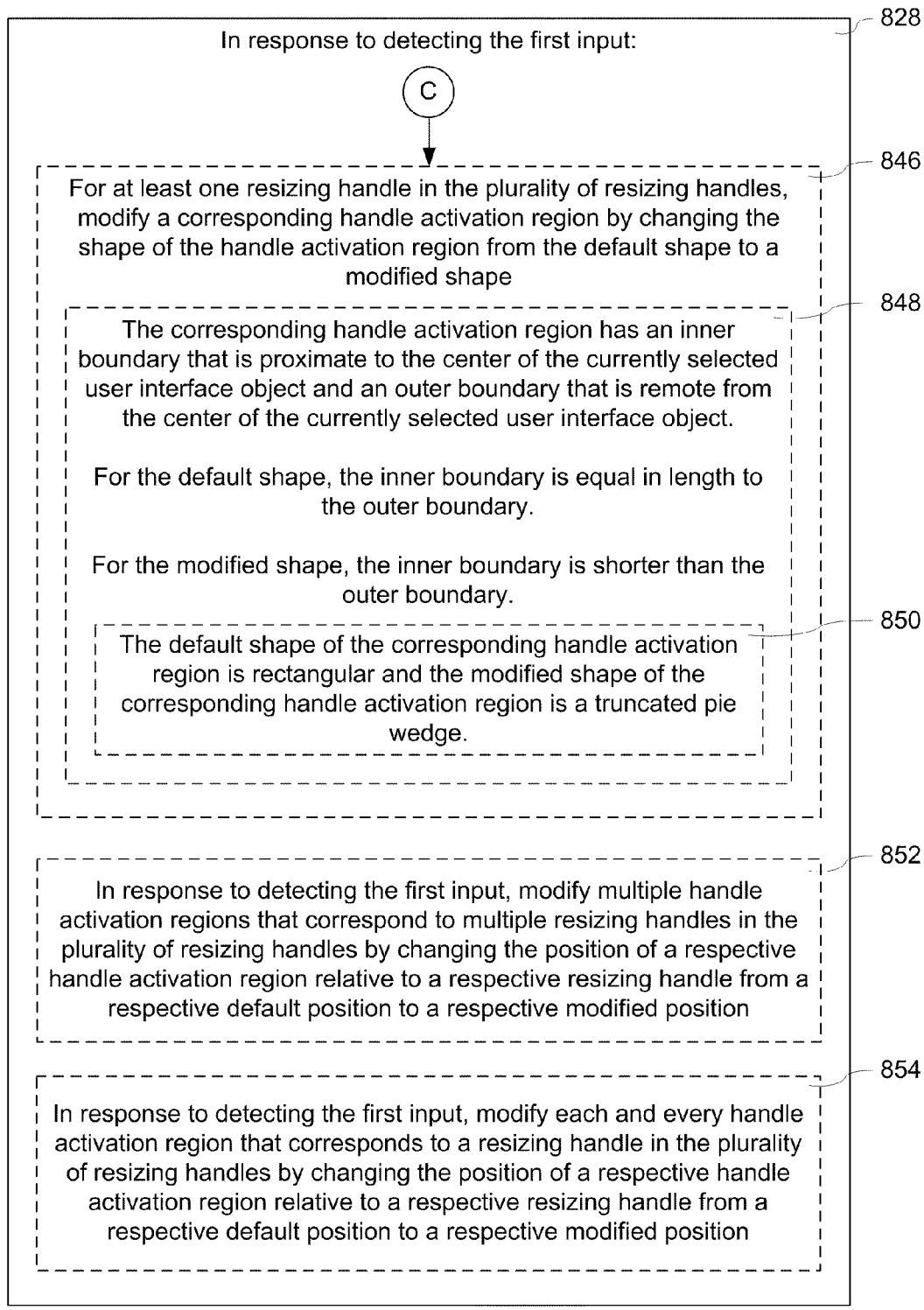
Figure 9A:
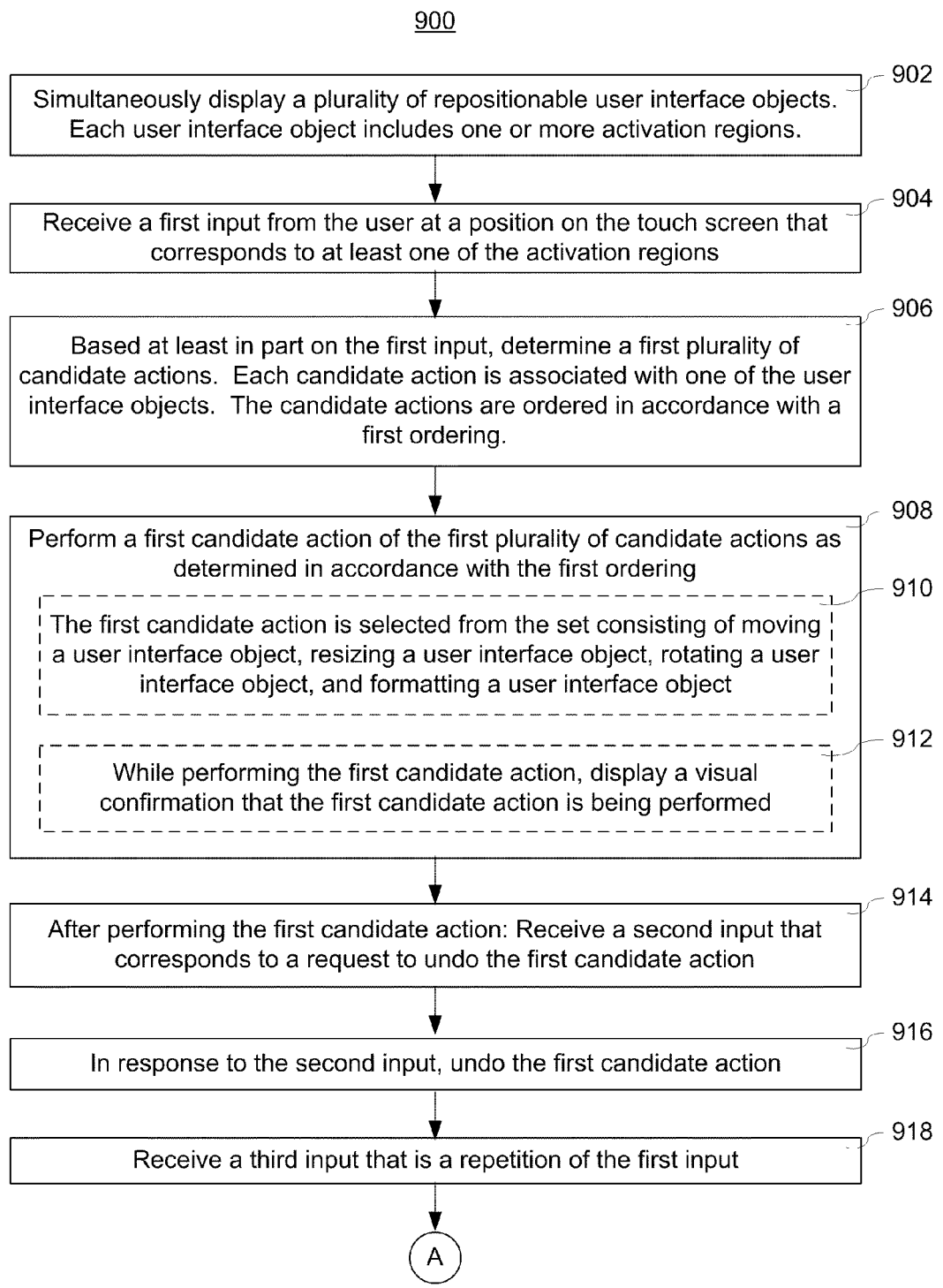
FIGS. 9A-9D are flow diagrams illustrating a method of selecting an alternative candidate action to perform in accordance with some embodiments.
Figure 9B:
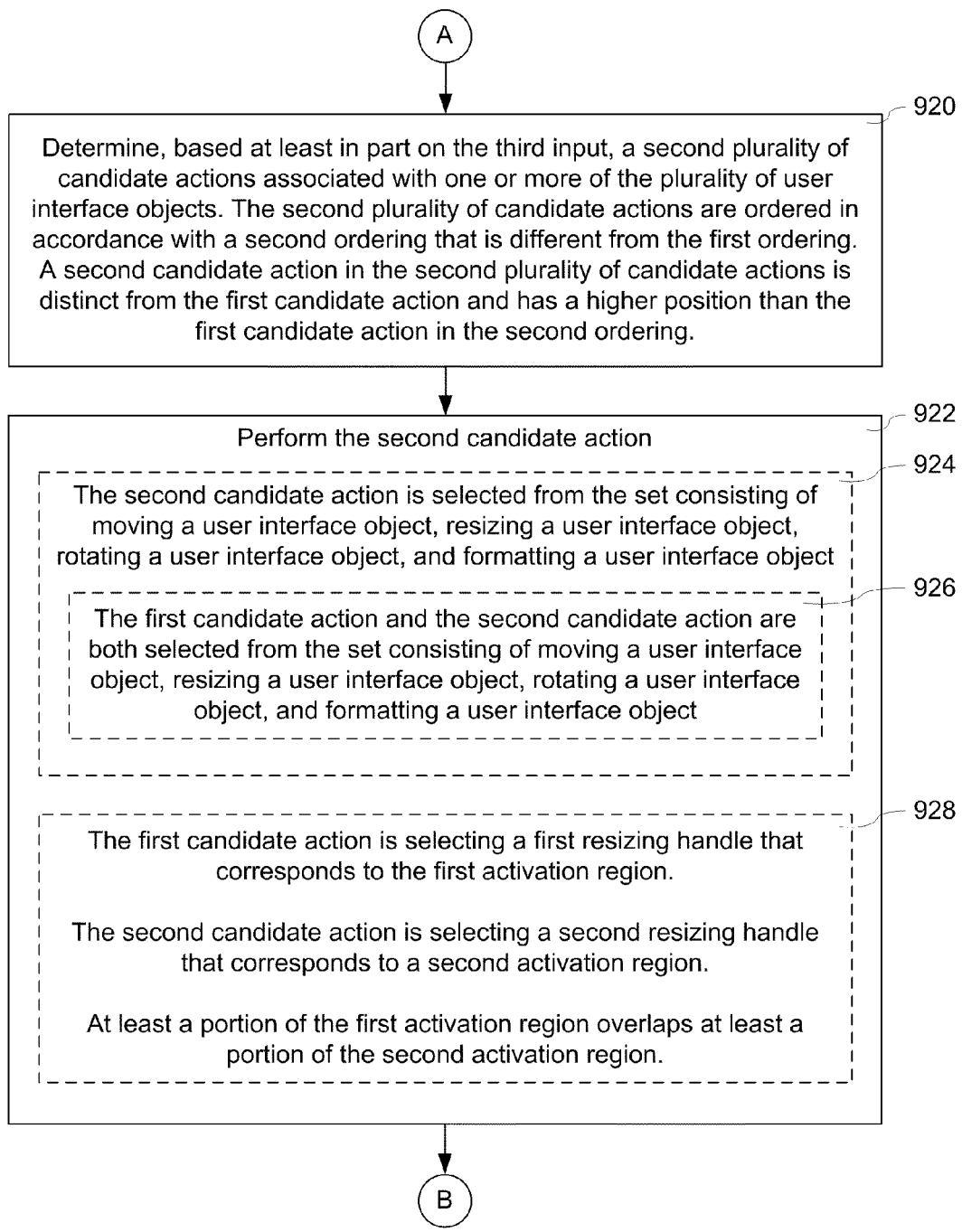
Figure 9C:
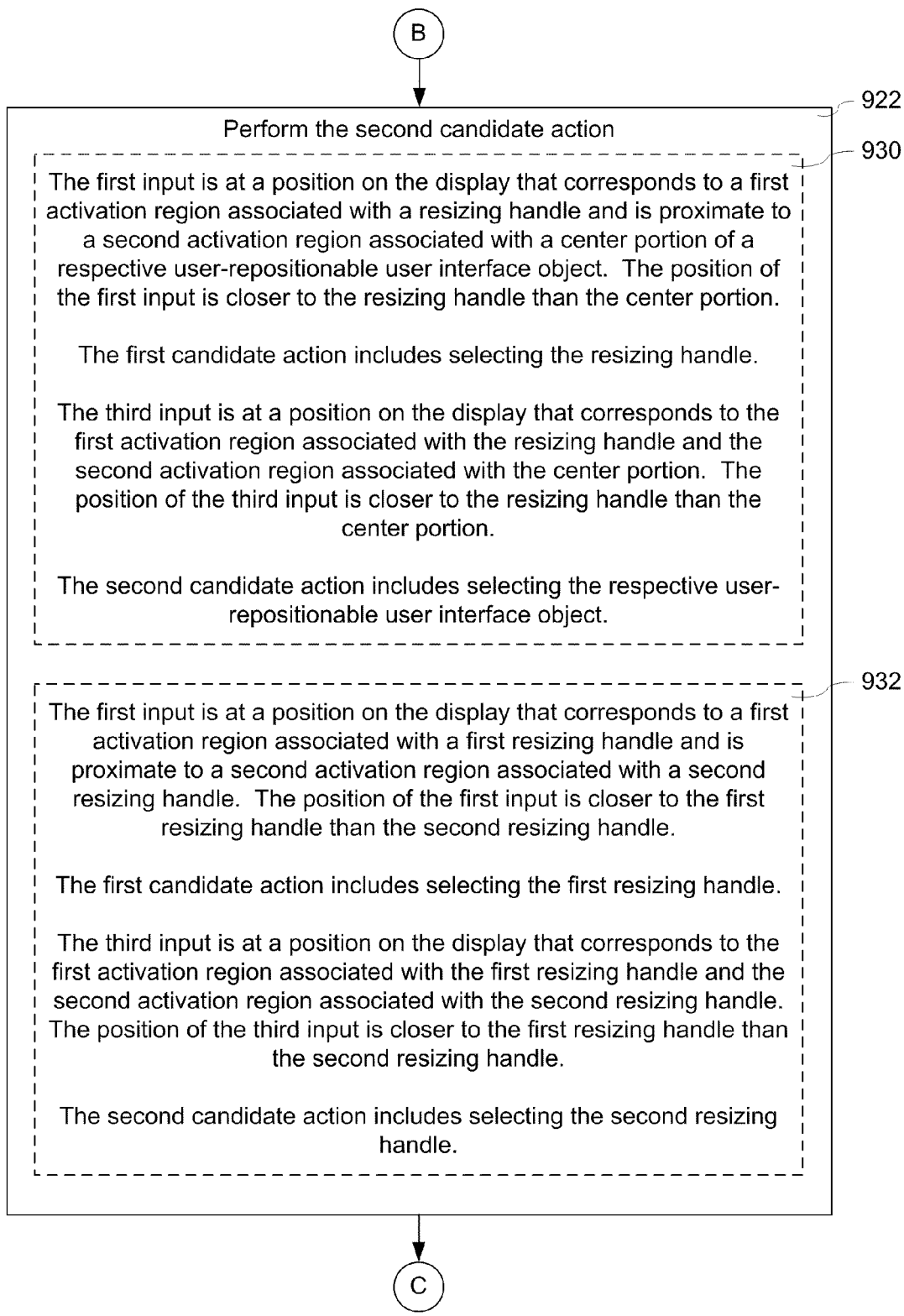
Figure 9D:
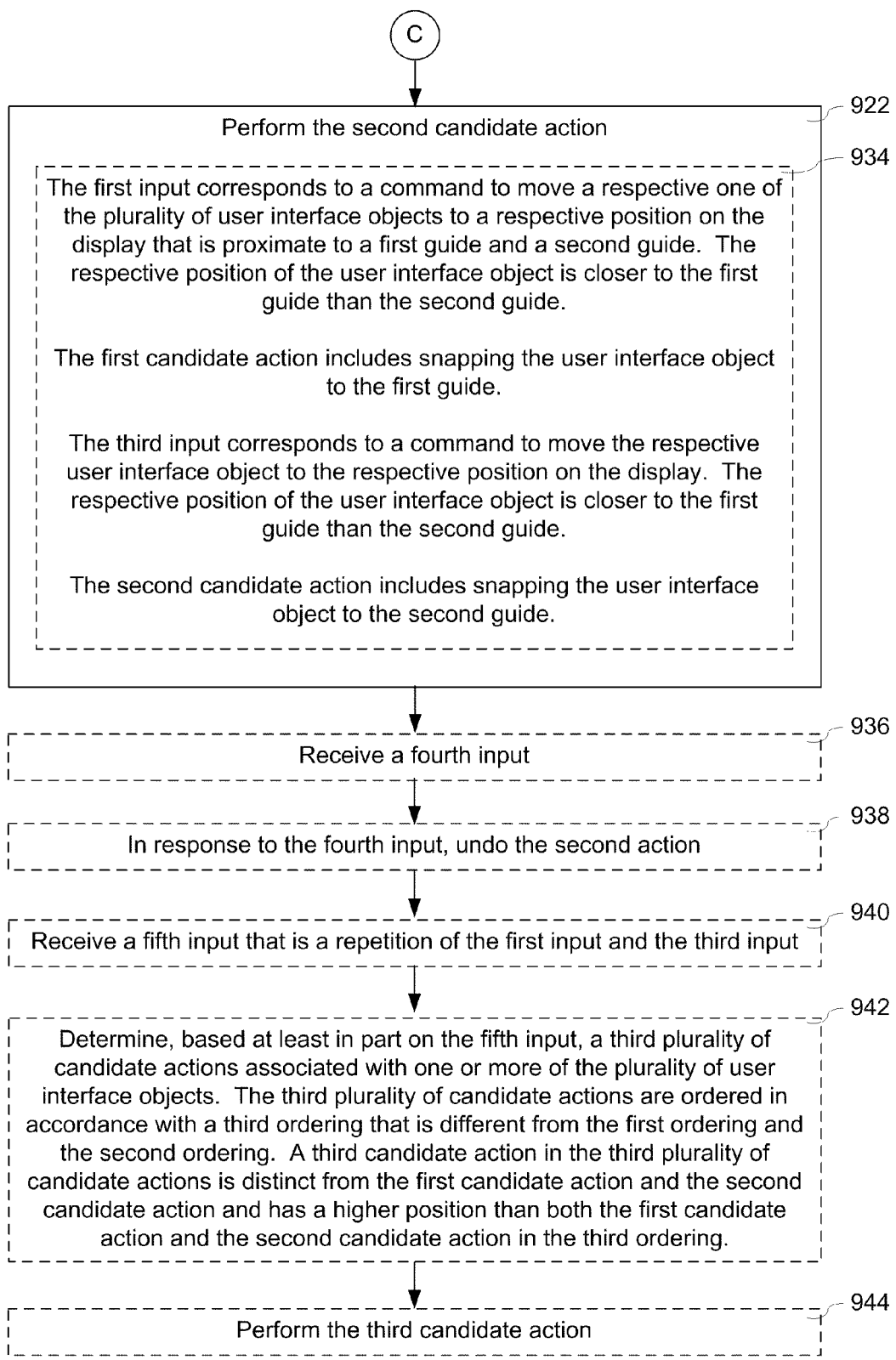

FIGS. 7F-7G illustrate exemplary user interfaces for simultaneously displaying a plurality of user interface objects (e.g., 7002, 7005 and 7006 in FIGS. 7F-7G) in a display area 7007; detecting a second contact (e.g., 7026 in FIG. 7F) with a first handle activation region (e.g., 7016 in FIG. 7F) that corresponds to a first handle (e.g., 7010 in FIG. 7F), detecting movement of the second contact (e.g., movement 7028 of the contact 7026 from a first contact location 7026-1 in FIG. 7F to a second contact location 7026-2 in FIG. 7G) from the first location before a predefined amount of time has elapsed, and maintaining the magnification level of the display area 7007 (e.g., 100%, as illustrated in FIGS. 7F-7G) while performing these operations, in accordance with some embodiments. The user interfaces in these figures are used to illustrate the processes described below, including the processes described in reference to FIGS. 11A-11C.

FIGS. 8A-8D are flow diagrams illustrating a method 800 of modifying handle activation regions for resizing handles of a user interface object in accordance with some embodiments. The method 800 is performed at a computing device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 800 may be combined and/or the order of some operations may be changed.

As described below, the method 800 provides an intuitive way to manipulate user interface objects using resizing handles for the user interface object. The method reduces the cognitive burden on a user when manipulating user interface objects using resizing handles for the user interface object by modifying the handle activation regions for the resizing handles to intuitive locations by modifying activation regions associated with the resizing handles, thereby creating a more efficient human-machine interface. For battery-operated computing devices, enabling a user to manipulate user interface objects using resizing handles for the user interface object faster and more efficiently conserves power and increases the time between battery charges.

The device simultaneously displays (802) on the display: a plurality of user interface objects (804) (e.g., 5002, 5004, 5005 and 5006 on touch screen display 112 in FIGS. 5A-5J), along with a currently selected user interface object (e.g., 5002-a in FIG. 5B) and a plurality of resizing handles (e.g., 5010, 5012, 5014, 5016, 5018, 5020, 5022, 5024 in FIGS. 5B-5D). At least some of the user interface objects are configured to be resizable (e.g., user interface object 5002-a is resized in response to user inputs, as shown in FIGS. 5B-5D and user interface object 5004-a is resized in response to user inputs, as shown in FIGS. 5E-5G).

While displaying the user interface objects (e.g., 5002, 5004, 5005, and 5006), the device simultaneously displays (806) the currently selected user interface object (e.g., 5002-a in FIG. 5B). In some embodiments, the currently selected user interface object includes (808) an object activation region (e.g., 5008-a in FIGS. 5A-5B, 5008-b in FIGS. 5C and 5008-c in FIG. 5C) that includes the center of the currently selected user interface object (e.g., 5002-a in FIG. 5B). This object activation region 5008 is for selecting and moving the user interface object 5002, rather than resizing the user interface object. For example, in FIG. 5A, the resizable user interface object 5002-a is selected in response to a finger tap gesture (e.g., contact 5009 in FIG. 5A) by a user input on a location on a touch-sensitive surface (e.g., touch screen display 112 in FIG. 5A) that corresponds to the object (e.g., 5002-a in FIG. 5A). In some embodiments, the object activation region (e.g., region 5008 in FIGS. 5A-5D) is (810) entirely within a perimeter of the currently selected user interface object (e.g., user interface object 5002 in FIGS. 5B-5D). For example, in FIGS. 5B-5D, even though the currently selected user interface object 5002 is resized in accordance with various user inputs, the object activation region 5008 remains entirely within the boundaries of the currently selected user interface object 5002. An advantage of this maintaining the object activation region entirely within the boundaries of the user interface object is that the center of the user interface object is preserved for user interface object "select" and "move" operations while the edges of the user interface object are preserved for user interface object "resize" operations.

While displaying the user interface objects including the currently selected user interface object, the device simultaneously displays (812) a plurality of resizing handles (e.g., 5010, 5012, 5014, 5016, 5018, 5020, 5022, 5024 in FIGS. 5B-5D) for the currently selected user interface object (e.g., 5002-a in FIG. 5A). In some embodiments, the resizing handles are only displayed for selected user interface objects. For example, before a user interface object is selected (e.g., 5002-a in FIG. 5A) no resizing handles are displayed. However, after the user interface object is selected (e.g., 5002-a in FIG. 5B), resizing handles (e.g., 5010, 5012, 5014, 5016, 5018, 5020, 5022, 5024 in FIG. 5B) are displayed. Each respective resizing handle has (814) a corresponding handle activation region (e.g., handle 5010 has handle activation region 5026, handle 5012 has handle activation region 5028, handle 5014 has handle activation region 5030, handle 5016 has handle activation region 5032, handle 5018 has handle activation region 5034, handle 5020 has handle activation region 5036, handle 5022 has handle activation region 5038, and handle 5024 has handle activation region 5040 in FIGS. 5B-5D). It should be understood that while the handle activation regions are shown in FIG. 5B, typically the handle activation regions will be hidden hit regions, and will not be displayed to the user. For this reason, in accordance with some embodiments, it is useful to modify the handle activation regions, as described in greater detail below, so that the handle activation regions are intuitively located (e.g., located where the user is likely to place a contact the display when attempting to activate a particular handle) and can easily activated by a user even when the handle activation regions are not displayed to the user.

In some embodiments, each handle activation region has a default position relative to the respective resizing handle, a default size, and a default shape. For example, in FIG. 5B, each of the handle activation regions is shown centered over the corresponding resizing handle with which it is associated (e.g., the centroid of activation region 5026 is located directly over the associated resizing handle 5010). In some embodiments, as described in greater detail below with reference to FIGS. 5E-5G, the currently selected user interface object includes a bounding box and the resizing handles are on the bounding box.

In some embodiments, each of the handle activation regions is (816) partially outside a perimeter of the currently selected user interface object and partially inside the perimeter of the currently selected user interface object, but covers only a subregion (e.g., a portion less than the whole) of the interior of the currently selected user interface object. For example, in FIGS. 5B-5D, for one of the handle activation regions 5026, the unshaded portion of the handle activation region 5026 is outside of the perimeter of the currently selected user interface object 5002, while the shaded portion of the handle activation region 5026 is inside the perimeter of the currently selected user interface object 5002. In some embodiments, a perimeter of the currently selected user interface object intersects (818) with a perimeter of each respective handle activation regions at exactly two points. For example, in FIGS. 5B-5D, each of the handle activation regions 5026, 5028, 5030, 5032, 5034, 5036, 5038, 5040 is a square that is located along the perimeter of the user interface object, and the perimeter of the user interface object passes through two distinct sides of each hit region. An advantage of the having multiple handle activation regions that are each partially overlapping the perimeter of a user interface object is that the handle activation region can each include a distinct resizing handle of the user interface object, thereby providing a margin of error in all directions from the resizing handle while still enabling a user to separately manipulate each resizing handle.

The device detects (820) a first input on or in a first handle activation region for a first resizing handle in the plurality of resizing handles. In some embodiments, the display is (822) a touch screen display (e.g., 112 in FIGS. 5A-5J) and the first input is a gesture on the touch screen display. In some embodiments, the gesture is (824) a finger gesture. For example, in FIGS. 5B-5C a finger contact 5042-1 on a handle activation region 5034 in FIG. 5B that corresponds to a resizing handle 5018 of the currently selected user interface object 5002-a on a touch screen display 112 and movement 5044 of the finger contact (e.g., from a first position 5042-1 in FIG. 5B to a second position 5042-2 in FIG. 5C) across the touch screen display 112. In some embodiments, the gesture is (826) a stylus gesture.

In accordance with some embodiments, steps 830-854 are performed in response (828) to detecting the first input (e.g., contact 5042 and subsequent movement 5044 of the contact across the touch screen display 112 in FIG. 5B). The device resizes (830) the currently selected user interface object (e.g., the device changes the size and/or shape of the user interface object). For example, in FIG. 5C, the user interface object 5002 has been resized from a first size and shape (e.g., 5002-a in FIG. 5B) to a second size and shape (e.g., 5002-b in FIG. 5C).

In some embodiments, prior to resizing the currently selected user interface object (832): the currently selected user interface object includes an object activation region (e.g., 5008-a in FIG. 5B) with a centroid that is located in a predefined location relative to the center of the currently selected user interface object (e.g., 5002-a in FIG. 5B). In some embodiments, the user interface object (e.g., 5002-a in FIG. 5B) also includes a centroid of a respective default handle activation region (e.g., activation region 5026 in FIG. 5B) located at the center of a corresponding resizing handle (e.g., resizing handle 5010 in FIG. 5B). In these embodiment, after resizing the currently selected user interface object (834) (e.g., from a first size and shape 5002-a in FIG. 5B to a second size and shape 5002-b in FIG. 5C), the centroid of the object activation region is maintained at the predefined location relative to the center of the currently selected user interface object, and the centroid of the respective default handle activation region is located away from the center of the corresponding resizing handle. For example, in FIG. 5C, the centroid of the object activation region 5008-b is still at the center of the currently selected user interface object 5002, while handle activation region 5026 is no longer centered over resizing handle 5010. In other words, when resizing the object, the centroid of the object activation region remains at the center of the object; but handle activation regions that become "too close" to the center are moved or resized and thus the centroids of these handle activation regions are no longer positioned over their respective resizing handles. An advantage of this modification of the position of the activation regions relative to their default locations is that the size of the handle activation regions is maintained, as much as possible, while avoiding overlap with the object activation region, so as to facilitate user selection of the resizing handles and/or the object (via the object activation region).

For at least one resizing handle (e.g., 5010 in FIGS. 5B-5C) in the plurality of resizing handles, the device modifies (836) a corresponding handle activation region (e.g., 5026 in FIGS. 5B-5C) by changing the position of the handle activation region relative to the resizing handle from the default position (e.g., 5026 in FIG. 5B) to a modified position (e.g., 5026 in FIG. 5C). In some embodiments, the currently selected user interface object has a center (838), and modifying a corresponding handle activation region by changing the position of the handle activation region relative to the resizing handle from the default position to a modified position comprises: when the currently selected user interface object (e.g., 5002 in FIGS. 5B-5C) is resized to a smaller size, the device moves the position of the handle activation region (e.g., 5026 in FIGS. 5B-5C) towards the center of the currently selected user interface object (e.g., 5002 in FIGS. 5B-5C) by an amount that is less than movement of the position of the corresponding resizing handle (e.g., 5010 in FIGS. 5B-5C) towards the center of the currently selected user interface object. In other words, from the frame of reference of the perimeter of the currently selected user interface object 5002, these movements move one or more handle activation regions outward from their respective resizing handles along the perimeter of the selected object (e.g., as shown in FIGS. 5B-5C), thereby leaving more area within the perimeter of the currently selected object (e.g., a greater percentage of the total internal area of the user interface object) for an object activation region (e.g., 5008 in FIGS. 5B-5C) for receiving inputs that are meant to move the selected object, rather than resize the selected object.

In some embodiments, one or more additional inputs are detected which further resize or reshape the currently selected user interface object and the handle activation regions are adjusted accordingly. As one example, the additional input is associated with a command to resize the user interface object to an even smaller size. For example, contact 5046-1 is detected at a first position on the touch screen display at a point that corresponds to a respective handle activation region 5038 for a respective resizing handle 5022 in FIG. 5C, and the device detects subsequent movement 5047 of the contact to a second position 5046-2 on the touch screen display. In response to the input, object is resized to a smaller size (e.g., from 5002-b in FIG. 5C to 5002-c in FIG. 5D), and for at least one resizing handle (e.g., 5010 in FIGS. 5C-5D) in the plurality of resizing handles, the device modifies a corresponding handle activation region (e.g., 5026 in FIGS. 5C-5D) by changing the position of the handle activation region relative to the resizing handle from the modified position (e.g., 5026 in FIG. 5C) to a further modified position (e.g., 5026 in FIG. 5D). As another example, the additional input is associated with a command to resize the user interface object to a larger size (e.g., back to the original size), and the handle activation regions are returned to their default positions (e.g., as shown in FIG. 5B).

It should be understood that in some embodiments the device modifies a corresponding handle activation region by simultaneously changing one or more of the position relative to the handle, the size of the handle activation region (as described in greater detail below with reference to FIGS. 5E-5G), and the shape of the handle activation region (e.g., as described in greater detail below with reference to FIGS. 5H-5J).

In some embodiments, while one user interface object is currently selected (e.g., 5002 in FIG. 5D) the device detects an input (e.g., tap gesture 5048 in FIG. 5D) on a different user interface object (e.g., 5004 in FIG. 5D). In response to the input, the different user interface object (e.g., 5004 in FIG. 5D) becomes the currently selected user interface object. It should be understood that multiple user interface objects could be selected simultaneously. In some embodiments, if multiple user interface objects are simultaneously selected (e.g., by holding down a modifier key and tapping on several currently displayed user interface objects) all of the selected user interface objects are treated as a single "currently selected user interface object" with a bounding box, and all of the simultaneously selected user interface objects are treated as a single currently selected user interface object with a bounding box, as described in greater detail below with reference to FIGS. 5E-5G.

In some embodiments, as shown in FIGS. 5E-5G, the currently selected user interface object 5004 includes a bounding box (e.g., 5049 in FIGS. 5E-5G) with resizing handles (e.g., 5050, 5052, 5054, 5056, 5058, 5060, 5062 and 5064 in FIGS. 5E-5G) located at the corners and in the middle of the sides of the bounding box 5049. In some embodiments, the handles each have a default handle activation region (e.g., handle 5050 has activation region 5066, handle 5052 has activation region 5068, handle 5054 has activation region 5070, handle 5056 has activation region 5072, handle 5058 has activation region 5074, handle 5060 has activation region 5076, handle 5062 has activation region 5078 and handle 5064 has activation region 5080 in FIGS. 5E-5G) that is centered over the handle. Typically a bounding box will be displayed when the user interface object has an irregular shape (e.g., in FIG. 5E the currently selected user interface object 5004-*a* is star shaped, and thus a bounding box 5049-*a* is displayed), or multiple user interface objects are simultaneously selected, as discussed in greater detail above. The resizing handles (e.g., 5050, 5052, 5054, 5056, 5058, 5060, 5062 and 5064 in FIGS. 5E-5G) are shown on the display and are visible to users, while the handle activation regions (e.g., 5066, 5068, 5070, 5072, 5074, 5076, 5078 and 5080 in FIGS. 5E-5G) are typically not displayed to the user. In other words, the handle activation regions are typically hidden hit regions surrounding the resizing handles.

Similar to the method described above with reference to FIGS. 5B-5D, the device detects (820) a first input on or in a first handle activation region for a first resizing handle in the plurality of resizing handles. In some embodiments, the display is (822) a touch screen display (e.g., 112 in FIGS. 5E-5G) and the first input is a gesture on the touch screen display. In some embodiments, the gesture is (824) a finger gesture. For example, in FIGS. 5E-5F a finger contact 5082-1 on a handle activation region 5074 in FIG. 5E that corresponds to a resizing handle 5058 of the currently selected user interface object 5004-*a* on the touch screen display 112 and movement 5084 of the finger contact (e.g., from a first position 5082-1 in FIG. 5E to a second position 5082-2 in FIG. 5F) across the touch screen display 112. In some embodiments, the gesture is (826) a stylus gesture.

In accordance with some embodiments, steps 830-854 are performed in response (828) to detecting the first input. The device resizes (830) the currently selected user interface object (e.g., the device changes the size and/or shape of the user interface object). For example, in FIG. 5F, the user interface object 5004 has been resized from a first size and shape 5004-*a* to a second size and shape 5004-*b*. Similarly, in FIG. 5F, the bounding box 5049 for the user interface object 5004 has also been resized from a first size and shape (e.g., 5049-*a* in FIG. 5E) to a second size and shape (e.g., 5049-*b* in FIG. 5F). Additionally, in FIG. 5F, the user interface object 5004 has also been resized from a first size and shape (e.g., 5004-*a* in FIG. 5E) to a second size and shape (e.g., 5004-*b* in FIG. 5F).

In some embodiments, in response to detecting the first input (e.g., contact 5082 and movement 5084 of the contact, as illustrated in FIG. 5E): for at least one resizing handle in the plurality of resizing handles, the device modifies a corresponding handle activation region by changing the size (840) of the handle activation region from the default size (e.g., the size of handle activation region 5074 in FIG. 5E) to a modified size (e.g., the size of handle activation region 5074 in FIG. 5F). In these embodiments, the default size is a predefined size (842) (e.g., the size defined is based on the average size of a finger contact, or based on a percentage of the size of the resizing handle). Additionally, in these embodiments, the modified size is different from the default size; and the modified size is determined such that when the corresponding handle activation region is modified, the corresponding handle activation region (e.g., 5074 in FIG. 5F) includes at least some of the corresponding resizing handle (e.g., 5058 in FIG. 5F) without overlapping with any of the other handle activation regions. In other words, when a currently selected user interface object is resized to a smaller size, the handle activation regions of the currently selected user interface object (e.g., 5004 in FIGS. 5E-5F) shrink to avoid overlapping with each other. For example, if handle activation regions 5070 and 5072 in FIG. 5E were moved towards each other without being resized (e.g., if the activation regions were not resized as shown in FIG. 5F), then they would overlap with each other. However, in FIG. 5F, the handle activation regions (e.g., 5070 and 5072) have been resized so as to avoid overlapping. In some embodiments, the modified size is (844) at least a minimum predefined size (e.g., 30 pixels by 30 pixels 50×50 pixels, or any reasonable size).

In some embodiments, one or more additional inputs are detected which further resize or reshape the currently selected user interface object and the handle activation regions are adjusted accordingly. As one example, the additional input is associated with a command to resize the user interface object to an even smaller size (e.g., contact 5086 at a first position 5086-1 on the touch screen display that corresponds to a respective handle activation region 5078 for a respective resizing handle 5062 in FIG. 5F, and subsequent movement 5088 of the contact to a second position 5086-2 on the touch screen display). In response to the input, the user interface object 5004 is resized to a smaller size (e.g., from 5004-*b* in FIG. 5F to 5004-*c* in FIG. 5G), and for at least one resizing handle (e.g., 5058 in FIGS. 5F-5G) in the plurality of resizing handles, the device modifies a corresponding handle activation region (e.g., 5074 in FIGS. 5F-5G) by changing the size (e.g., the size of handle activation region 5074 in FIG. 5F) of the handle activation region to a further modified size (e.g., 5074 in FIG. 5G). As another example, the additional input is associated with a command to resize the user interface object to a larger size (e.g., back to the original size), and the handle activation regions are returned to their default sizes (e.g., as shown in FIG. 5E).

It should be understood that, in some embodiments, the handle activation regions are simultaneously resized as illustrated in FIGS. 5E-5G and moved relative to their respective resizing handles (e.g., as described in greater detail above with reference to FIGS. 5B-5D), and/or reshaped (e.g., as described in greater detail below with reference to FIGS. 5H-5I).

In some embodiments, while one user interface object is currently selected (e.g., 5004-c in FIG. 5G) the device detects an input for the creation of a new user interface object. In response to the input, the new user interface object (e.g., 5089 in FIG. 5H) is created. In some embodiments, the new user interface object automatically becomes the currently selected user interface object.

In some embodiments, as shown in FIGS. 5H-5J, the currently selected user interface object 5089 includes resizing handles (e.g., 5090, 5092, 5094, 5096, 5098, 5100, 5102 and 5104 in FIGS. 5H-5J) that are located at the corners and in the middle of the sides of the bounding box 5089. In some embodiments the resizing handles have default handle activation regions (e.g., handle 5090 has activation region 5106, handle 5092 has activation region 5108, handle 5094 has activation region 5110, handle 5096 has activation region 5112, handle 5098 has activation region 5114, handle 5100 has activation region 5116, handle 5102 has activation region 5118 and handle 5104 has activation region 5120 in FIGS. 5H-5J) that initially are squares that are centered over each of the resizing handles on perimeter of the user interface object 5089, as illustrated in FIG. 5H. The resizing handles (e.g., 5090, 5092, 5094, 5096, 5098, 5100, 5102 and 5104 in FIGS. 5H-5J) are shown on the display and are visible to users, while the handle activation regions (e.g., 5106, 5108, 5110, 5112, 5114, 5116, 5118 and 5120 in FIGS. 5H-5J) are typically not displayed to the user. In other words, the handle activation regions are typically hidden hit regions surrounding the resizing handles.

Similar to the method described above with reference to FIGS. 5B-5D, the device detects (820) a first input on or in a first handle activation region for a first resizing handle in the plurality of resizing handles. In some embodiments, the display is (822) a touch screen display and the first input is a gesture on the touch screen display (e.g., 112 in FIGS. 5H-5J). In some embodiments, the gesture is (824) a finger gesture. For example, in FIGS. 5H-5I the device detects a finger contact 5122-1 on a handle activation region 5114 in FIG. 5H that corresponds to a resizing handle 5098 of the currently selected user interface object 5098-a on a touch screen display 112. Subsequently the device detects movement 5124 of the finger contact (e.g., from a first position 5122-1 in FIG. 5H to a second position 5122-2 in FIG. 5I) across the touch screen display 112. In some embodiments, the gesture is (826) a stylus gesture.

In accordance with some embodiments, steps 830-854 are performed in response (828) to detecting the first input (e.g., contact 5122 and movement 5124 of the contact, as illustrated in FIGS. 5H-5I). The device resizes (830) the currently selected user interface object (e.g., the device changes the size and/or shape of the user interface object). For example, in FIG. 5I, the user interface object 5089 has been resized from a first size and shape (e.g., 5089-a in FIG. 5H) to a second size and shape (e.g., 5089-b in FIG. 5I).

In some embodiments, for at least one resizing handle (e.g., 5094 in FIGS. 5H-5I) in the plurality of resizing handles, the device modifies a corresponding handle activation region (e.g., 5110 in FIGS. 5H-5I) by changing the shape (846) of the handle activation region from the default shape (e.g., a square 5110 in FIG. 5H) to a modified shape (e.g., a truncated pie wedge 5110 in FIG. 5I). In some embodiments, the corresponding handle activation region has (848) an inner boundary (e.g., 5126-a in FIG. 5H) that is proximate to the center of the currently selected user interface object and an outer boundary (e.g., 5128-a in FIG. 5H) that is remote from the center of the currently selected user interface object. In some embodiments, for the default shape (e.g., a square 5110 in FIG. 5H), the inner boundary (e.g., 5126-a in FIG. 5H) is equal (or substantially equal) in length to the outer boundary (e.g., 5128-a in FIG. 5H). For example, in FIG. 5H, the side 5126-a of a rectangular handle activation region 5110 that is fully inside of the user interface object is equal in size to the side 5128-a of the rectangular handle activation region 5110 that is fully outside of the user interface object.

In contrast, for the modified shape (e.g., the shape of handle activation region 5110 in FIG. 5I), the inner boundary (e.g., 5126-b in FIG. 5I) is shorter than the outer boundary (e.g., 5128-b in FIG. 5I). Continuing the example from above when the default shape of a hit region (e.g., 5110 in FIG. 5H) is changed to a modified shape of a handle activation region (e.g., 5110 in FIG. 5I), a side (e.g., 5126-b in FIG. 5I) of the handle activation region (e.g., 5110 in FIG. 5I) that is inside the user interface object (e.g., 5126-b in FIG. 5I) is shorter than a side (e.g., 5128-b in FIG. 5I) of the handle activation region (e.g., 5110 in FIG. 5I) that is outside of the user interface object. In some embodiments, the default shape of the corresponding handle activation region is (850) rectangular and the modified shape of the corresponding handle activation region is a truncated pie wedge. For example, in FIG. 5I, handle activation region 5110 has changed shape from a rectangular shape (e.g., 5110 in FIG. 5H) to a truncated pie wedge shape (e.g., 5110 in FIG. 5I).

In some embodiments, one or more additional inputs are detected which further resize or reshape the currently selected user interface object and the handle activation regions are adjusted accordingly. As one example, the additional input is associated with a command to resize the user interface object to an even smaller size (e.g., contact 5130 at a first position 5130-1 on the touch screen display 112 at a point that corresponds to a respective handle activation region 5118 for a respective resizing handle 5102 in FIG. 5I, and subsequent movement 5132 of the contact to a second position 5130-2 on the touch screen display 112 in FIG. 5J). In response to the input, the user interface object 5089 is resized to a smaller size (e.g., from 5089-b in FIG. 5I to 5089-c in FIG. 5J), and for at least one resizing handle (e.g., 5094 in FIGS. 5I-5J) in the plurality of resizing handles, the device modifies a corresponding handle activation region (e.g., 5110 in FIGS. 5I-5J) by changing the shape (e.g., the shape of handle activation region 5110 in FIG. 5I) of the handle activation region to a further modified shape (e.g., the shape of handle activation region 5110 in FIG. 5J). As another example, the additional input is associated with a command to resize the user interface object to a larger size (e.g., back to the original size), and the handle activation regions are returned to their default sizes (e.g., as shown in FIG. 5H).

It should be understood that, in some embodiments, the handle activation regions are simultaneously reshaped as illustrated in FIGS. 5H-5J and/or moved relative to their respective resizing handles (e.g., as described in greater detail above with reference to FIGS. 5B-5D), and/or resized (e.g., as described in greater detail above with reference to FIGS. 5E-5G).

In some embodiments, in response to detecting the first input (e.g., contact 5122-1 and subsequent movement 5124 of the contact in FIG. 5H to a new contact location 5122-2 in FIG. 5I), the device modifies (852) multiple handle activation regions that correspond to multiple resizing handles in the plurality of resizing handles by changing the position of a respective handle activation region relative to a respective resizing handle from a respective default position to a respective modified position. In some embodiments, only a subset of the handle activation regions of the user interface object are modified, while other hit regions of the user interface object remain unmodified. For example, when the user interface object is resized as shown in FIGS. 5H and 5I, handle activation regions 5108, 8110, 5112, 5116, 5118 and 5120 are all modified (e.g., in FIG. 5H handle activation regions 5108, 5110, 5112, 5116, 5118 and 5120 are all squares, while in FIG. 5I, after the currently selected user interface object 5089 is resized, handle activation regions 5108, 8110, 5112, 5116, 5118 and 5120 are reshaped into truncated pie wedges). In contrast, in this example, some of the handle activation regions are not modified (e.g., in FIG. 5H handle activation regions 5106 and 5114 are squares, and are maintained as be squares in FIG. 5I, instead of being reshaped).

In some embodiments, in response to detecting the first input (e.g., contact 5042-1 and subsequent movement 5044 of the contact in FIG. 5B to a new contact location 5042-2 in FIG. 5C), the device modifies (854) each and every handle activation region that corresponds to a resizing handle in the plurality of resizing handles by changing the position of a respective handle activation region relative to a respective resizing handle from a respective default position to a respective modified position. For example, when the user interface object is resized as shown in FIG. 5B and FIG. 5C, each of the handle activation regions 5026, 5028, 5030, 5032, 5034, 5036, 5038, 5040 associated with handles of the user interface object 5002-a in FIG. 5B is centered around its respective resizing handle. However, after the resizing command, each respective handle activation region 5026, 5028, 5030, 5032, 5034, 5036, 5038, 5040 associated with handles of the user interface object 5002-b in FIG. 5C is no longer centered around its respective resizing handle. Thus, in this example, all of the handle activation regions associated with resizing handles of user interface object 5002 are modified.

FIGS. 9A-9D are flow diagrams illustrating a method 900 of selecting an alternative candidate action to perform in accordance with some embodiments. The method 900 is performed at a computing device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 900 may be combined and/or the order of some operations may be changed.

As described below, the method 900 provides an intuitive way to select a candidate action to perform based on previously canceled candidate actions. The method reduces the cognitive burden on a user by dynamically selecting a likely candidate action based on candidate actions that have been cancelled in the past, thereby creating a more efficient human-machine interface. For battery-operated computing devices, enabling a user to request performance of the desired candidate action faster and more efficiently conserves power and increases the time between battery charges.

The device simultaneously displays (902) a plurality of user-repositionable user interface objects (e.g., 6002, 6005, 6006 in FIGS. 6A-6P), wherein each user interface object includes one or more activation regions (e.g., object activation region 6008 and handle activation regions 6010, 6012, 6014, 6016, 6018, 6020, 6020, 6022, 6024, 6026, 6028, 6030, 6032, 6034, 6036 and 6038 in FIGS. 6A-6D). In some embodiments, a user interface object is user-repositionable if it is moveable, relative to other displayed objects, in response to user inputs. For example, when the device detects a tap gesture (e.g., a contact) on an object activation region (e.g., 6008 in FIG. 6A) of a user-repositionable user interface object and a drag gesture in a respective direction, the repositionable user interface object moves in the respective direction, as described in greater detail below with reference to FIGS. 6E-6P. Conversely, the keys on a soft keyboard are not user-repositionable user interface objects, even if the keyboard layout changes from a first predefined layout (e.g., QWERTY) to a second predefined layout (e.g., DVORAK) in response to a user input.

The device receives (904) a first input (e.g., tap and hold gesture 6040 in FIG. 6B) from the user at a position on the touch screen that corresponds to at least one of the activation regions (e.g., activation region 6020 in FIG. 6B). Based at least in part on the first input, the device determines (906) a first plurality of candidate actions. Each candidate action in the first plurality of candidate actions is associated with one of the user interface objects and the candidate actions are ordered in accordance with a first ordering. In some embodiments, the objects are non-overlapping, or at least the portions of the user interface objects proximate to the first input are non-overlapping. For example, the first plurality of candidate actions includes, in order: (1) select a resize handle associated with a handle activation region 6020 for the square, (2) select a resize handle associated with a handle activation region 6026 for the triangle, (3) select an object associated with object activation region 6008 for the square, and (4) select resize handle associated with a handle activation region 6038 for the circle.

The device performs (908) a first candidate action (e.g., selecting resize handle 6052 associated with a handle activation region 6020 for the square in FIG. 6B) of the first plurality of candidate actions as determined in accordance with the first ordering. In some embodiments, the input includes a position on the display (e.g., the centroid of a tap and hold gesture 6040 on a touch screen display 112), and the ordering of the candidate actions is based on the distance of one or more predefined portions of the user interface objects from the position of the input. For example, as illustrated in FIG. 6B, the handle activation region 6020 for the square is closest to the centroid of the tap and hold gesture 6040, while the handle activation region 6026 for the triangle is second closest to the centroid of the tap and hold gesture 6040, the object activation region 6008 for the square is third closest to the centroid of the tap and hold gesture 6040, and the handle activation region 6038 is fourth closest to the centroid of the tap and hold gesture 6040. In some embodiments, the ordering includes a weight that is based on properties of the input other than the position of the input (e.g., the order of the layers for each of the user interface objects associated with the candidate actions, whether the user interface object associated with a candidate action is currently selected, whether the user interface object associated with a candidate action has recently been used, a number of sides for a shape of the user interface object associated with a candidate action, a transparency value of the user interface object associated with a candidate action and/or whether the candidate action was previously canceled by the user, etc.).

In some embodiments, the first candidate action is selected (910) from the set consisting of: moving a user interface object, resizing a user interface object, rotating a user interface object, and formatting a user interface object. In other words in some embodiments, the first candidate action is selected from the set consisting of actions other than merely selecting a user interface object (or resizing handle of a user interface object), as described in greater detail below with reference to FIGS. 6E-6P.

In some embodiments, while performing the first candidate action, the device displays (912) a visual confirmation that the first candidate action is being performed. In some embodiments, the visual confirmation includes one or more of: highlighting a perimeter of the user interface object, displaying a resizing handle (e.g., resizing handles 6042, 6044, 6046, 6048, 6050, 6052, 6054, 6056 and/or 6056 in FIG. 6B) on the user interface object, highlighting a center of the user interface object, displaying a pop-up notification that is indicative of the first candidate action (e.g., selecting a resizing handle 6052 associated with the handle activation region 6020 for a corner of the square). In some embodiments, a visual confirmation is displayed whenever any candidate action is performed. For example, when the first candidate action is the selection of an activation region associated with a first interface object (e.g., a first resizing handle for resizing the first user interface object or a center of the first user interface object), a plurality of resizing handles (e.g., 6042, 6044, 6046, 6048, 6050, 6052, 6054, 6056 and/or 6056 in FIG. 6B) are displayed on a perimeter of the first user interface object (e.g., 6002 in FIG. 6B). Similarly, when the first candidate action is the selection (e.g., a tap and hold gesture 6058 in FIG. 6C) of a second activation region (e.g., 6026 in FIG. 6C) associated with a second user interface object (e.g., 6005 in FIG. 6C) a second resizing handle (e.g., 6060, 6062 and/or 6064 in FIG. 6C) is displayed on the second user interface object.

After performing the first candidate action, the device receives (914) a second input (e.g., tap gesture 6057 in FIG. 6B) that corresponds to a request to undo or cancel the first candidate action. In some embodiments, the second input corresponds to an explicit undo command (e.g., a keyboard shortcut such as: command+z or ctrl+z, or selecting "undo" from an "edit" drop down menu). In some embodiments, the second input corresponds to an implicit undo command. One example of an implicit undo command is an input that is outside of the currently selected user interface object (e.g., tap gesture 6057 in FIG. 6B), which results in the device deselecting the object. In some embodiments, the second input corresponds to a failure of the device to detect a confirmation of the input. For example, for selection of a resize handle by a tap and hold gesture, a failure to confirm the input includes a failure to detect any movement of the contact prior to a subsequent liftoff of the contact, or failure to detect any movement of the contact within a predetermined period of time after the initial touchdown of the contact. In response to the second input (e.g., tap gesture 6066 in FIG. 6C), the device undoes (916) or cancels the first candidate action (e.g., by returning to a state where all of the user interface objects are unselected as illustrated in FIG. 6A).

The device receives (918) a third input (e.g., tap and hold gesture 6058 in FIG. 6C) within a predefined time period (e.g., 10 seconds or less) that is a repetition of the first input, or is substantially the same as the first input. In some embodiments, instead of receiving the third input within a predefined period of time, the device receives the third input before some other predefined event has occurred (e.g., before the current selection changes, or before a currently displayed subset of content is replaced with a different displayed subset of content either by scrolling through the displayed content or navigating to a different subset of content such as a next page or a next slide). In accordance with some embodiments, a third input is substantially the same as the first input if the same user interface object has been moved by the first input and the third input or if the third input is located at approximately the same location as the first input. The device determines, (920) based at least in part on the third input (e.g., contact 6058 in FIG. 6C), a second plurality of candidate actions associated with one or more of the plurality of user interface objects. The second plurality of candidate actions are ordered in accordance with a second ordering that is different from the first ordering. A second candidate action in the second plurality of candidate actions is distinct from the first candidate action and has a higher position than the first candidate action in the second ordering. For example, for the situation illustrated in FIG. 6C, in some embodiments the second plurality of candidate actions includes, in order: (1) select a resize handle associated with a handle activation region 6026 for the triangle, (2) select an object associated with object activation region 6008 for the square, (3) select a resize handle associated with a handle activation region 6038 for the circle, and (4) select a resize handle associated with a handle activation region 6020 for the square.

It should be noted that, in this embodiment, the candidate action that was previously the highest candidate action in the first plurality of candidate actions is now the lowest candidate action in the second plurality of candidate actions. This is because the device previously received an input to cancel the first candidate action, and thus it is unlikely that the user wishes to perform that candidate action. While, in the present example, the candidate action "select resize handle associated with a handle activation region 6020 for the square" is included in both the first plurality of candidate actions and the second plurality of candidate actions, it should be understood that, in another embodiment, this candidate action (which was previously canceled) could be removed from the list entirely. It should be understood that if the first action is removed from the second plurality of candidate actions, the first candidate action effectively is assigned the lowest position in the second plurality of candidate actions.

The device performs (922) the second candidate action (e.g., select resize handle 6060 in FIG. 6C associated with a handle activation region 6026 for the triangle). In other words, even if the exact same input is detected twice in a row, the device will perform a different action. An advantage of adjusting the plurality of candidate actions after receiving a second input that corresponds to a request to undo a previous candidate action is that it improves the likelihood that when the device dynamically performs the second candidate action that is the candidate action that the user desires to perform. A similar advantage is provided by the reordering of candidate actions discussed in greater detail below with reference to other embodiments.

In some embodiments, the second candidate action (924) is selected from the set consisting of moving a user interface object, resizing a user interface object, rotating a user interface object, and formatting a user interface object. In other words in some embodiments, the second candidate action is selected from the set consisting of actions other than merely selecting a user interface object (or resizing handle of a user interface object), as described in greater detail below with reference to FIGS. 6E-6P. It should be understood that, in some embodiments, the first candidate action and the second candidate action are both selected (926) from the set consisting of moving a user interface object, resizing a user interface object, rotating a user interface object, and formatting a user interface object. In other words in some embodiments, both the first candidate action and the second candidate action are selected from the set consisting of actions other than merely selecting a user interface object (or resizing handle of a user interface object), as described in greater detail below with reference to FIGS. 6E-6P.

In some embodiments, the first candidate action is (928) selecting a first resizing handle (e.g., resizing handle 6052 for the corner of the square in FIG. 6B) that corresponds to the first activation region (e.g., 6020 in FIG. 6B). In these embodiments, the second candidate action is selecting a second resizing handle (e.g., resizing handle 6060 for the corner of the triangle in FIG. 6C) that corresponds to a second activation region (e.g., 6026 in FIG. 6C). In these embodiments, at least a portion of the first activation region overlaps at least a portion of the second activation region (e.g., the shaded portion of activation region 6020 and activation region 6026 in FIG. 6C). In some embodiments, the first input (e.g., tap and hold gesture 6040 in FIG. 6B) and the second input (e.g., tap and hold gesture 6058 in FIG. 6C) are located on the portion of the first activation region that overlaps the portion of the second activation region (e.g., the shaded portion of activation region 6020 and activation region 6026 in FIG. 6C). In other words, in some embodiments, the method described herein is used to disambiguate inputs that are detected in overlapping activation regions.

In some embodiments, the third input (e.g., tap and hold gesture 6058 in FIG. 6C) is a repetition of the first input (e.g., tap and hold gesture 6040 in FIG. 6B) when one or more of the following is true: (1) the first input is received at a first time, the third input is received at a second time and the difference between the first time and the second time is less than a predetermined amount of time; (e.g., 0.01 seconds, 0.05 seconds, 0.1 seconds, 0.5 seconds, 1 second, 5 seconds or any reasonable amount of time) the first input and the third input are the same type of input (e.g., a tap and hold gesture, a tap gesture, a swipe gesture, a pinch gesture, a de-pinch gesture, etc.); (2) an initial position of the third input (e.g., tap and hold gesture 6058 in FIG. 6C) on the display is within a predefined distance (e.g., a radius of 40 pixels) of an initial position of the first input (e.g., tap and hold gesture 6040 in FIG. 6B); (3) a final position of the third input (e.g., as shown in FIG. 6J and described in greater detail below) on the display is within a predefined distance (e.g., a radius of 40 pixels) of a final position of the first input (e.g., as shown in FIG. 6F and described in greater detail below); and/or (4) the first input and the second input include repositioning a respective user interface object, and a final position the respective user interface object after it is repositioned in accordance with the first input (e.g., as illustrated in FIG. 6F and described in greater detail below) is substantially the same as a final position of the respective user interface object after it is repositioned in accordance with the third input (e.g., as illustrated in FIG. 6J and described in greater detail below).

In some embodiments, the device receives a fourth input (e.g., tap gesture 6066 in FIG. 6C). In these embodiments, in response to the fourth input, the device undoes or cancels the second action (e.g., returns to the state of the user interface illustrated in FIG. 6A). In some embodiments, the device receives a fifth input (e.g., tap and hold gesture 6068 in FIG. 6D) within a predefined time period that is a repetition of the first input (e.g., tap and hold gesture 6040 in FIG. 6B) and the third input (e.g., tap and hold gesture 6058 in FIG. 6C). In some embodiments, the device determines, based at least in part on the fifth input (e.g., tap and hold gesture 6068 in FIG. 6D), a third plurality of candidate actions associated with one or more of the plurality of user interface objects. The third plurality of candidate actions are ordered in accordance with a third ordering that is different from the first ordering and the second ordering. In some embodiments, the third plurality of candidate actions includes only candidate actions that are in the first plurality of candidate actions and the second plurality of candidate actions (e.g., the intersection of the first plurality of candidate actions and the second plurality of candidate actions). In some embodiments, the third plurality of candidate actions includes all candidate actions that are in either the first plurality of candidate actions or the second plurality of candidate actions (e.g., the union of the first plurality of candidate actions and the second plurality of candidate actions). For example, the third plurality of candidate actions is, in order (1) select a resize handle associated with a handle activation region 6038 for the circle, (2) select an object associated with object activation region 6008 for the square, (3) select a resize handle associated with a handle activation region 6020 for the square, and (4) select a resize handle associated with a handle activation region 6026 for the triangle. A third candidate action in the third plurality of candidate actions (e.g., selecting a resize handle associated with a handle 6076 activation region 6038 for the circle) is distinct from the first candidate action (e.g., selecting a resize handle associated with a handle activation region 6020 for the square, as illustrated in FIG. 6B) and the second candidate action (e.g., selecting a resize handle associated with a handle activation region 6026 for the triangle as illustrated in FIG. 6C) and has a higher position than both the first candidate action and the second candidate action in the third ordering, and the device performs (944) the third candidate action.

In some embodiments, the first candidate action is selecting a handle activation region and the second candidate action is selecting a user interface object activation region. In these embodiments, the first input (e.g., tap and hold gesture 6040 in FIG. 6B) is (930) at a position on the display that corresponds to a first activation region (e.g., 6020 in FIG. 6B) associated with a resizing handle (e.g., 6052 in FIG. 6B) and is proximate to a second activation region (e.g., 6008 in FIG. 6B) associated with a center portion of a respective user-repositionable user interface object (e.g., 6002 in FIG. 6B). In some embodiments, the resizing handle and the center portion are for the same user-repositionable user interface object (e.g., resizing handle 6052 and user interface object 6002 in FIG. 6B). In these of these embodiments, the position of the first input (e.g., tap and hold gesture 6040 in FIG. 6B) is closer to the resizing handle than the center portion and the first candidate action includes selecting the resizing handle. For example, for the situation illustrated in FIG. 6B, in some embodiments the first plurality of candidate actions includes, in order: (1) select a resize handle associated with a handle activation region 6020 for the square, (2) select an object associated with object activation region 6008 for the square, (3) select a resize handle associated with a handle activation region 6038 for the circle, and (4) select resize handle 6060 associated with a handle activation region 6026 for the triangle.

In these embodiments, the third input (e.g., a repeat of tap and hold gesture 6040 in FIG. 6B) is at a position on the display that corresponds to the first activation region associated with the resizing handle and is proximate to the second activation region (e.g., 6008 in FIG. 6B) associated with the center portion of the square (e.g., user interface object 6002 in FIG. 6B). In this example, the second plurality of candidate actions is similar to the first plurality of candidate actions, only the order has been changed so that the prior first candidate action is moved lower in the order. In some embodiments, the first candidate action has been removed from the plurality of candidate actions. Thus, in some embodiments, the second plurality of candidate actions is, in order: (1) select an object associated with object activation region 6008 for the square, (2) select a resize handle associated with a handle activation region 6038 for the circle, (3) select resize handle 6060 associated with a handle activation region 6026 for the triangle, and (4) select a resize handle associated with a handle activation region 6020 for the square. In this embodiment, the position of the third input (e.g., a repeat of tap and hold gesture 6040) is still closer to the resizing handle (e.g., 6060 in FIG. 6B) than the object activation region (e.g., 6008 in FIG. 6B) associated with the center portion of the square (e.g., user interface object 6002 in FIG. 6B), however the second candidate action includes selecting the respective user-repositionable user interface object (e.g., 6002 in FIG. 6B) instead of selecting the resizing handle.

In other words, in this embodiment, without taking into account non-location factors (e.g., past cancellations of candidate actions), in response to the third input, the candidate action of selecting the resizing handle would be higher on the second ordered list than the candidate action of selecting the center portion (e.g., the entire respective user-repositionable user interface object). However, the second candidate action is selected in response to the third input because of the differences between the first ordering and the second ordering. In some embodiments, the ordering of the second plurality of candidate actions is different from the ordering of the first plurality of candidate actions because of the undoing/cancelling of the first candidate action (e.g., the first candidate action is removed from consideration when generating the second pluralities of candidate actions or the second candidate action is weighted so that it is lower in the order than other candidate actions). An advantage of adjusting the plurality of candidate actions after receiving a second input that corresponds to a request to undo a previous candidate action is that it improves the likelihood that when the device dynamically performs the second candidate action that is the candidate action that the user desires to perform.

While the preceding example has been given with respect to an object activation region and a handle activation region for the same user interface object (e.g., the square 6002), it should be understood that the object activation region and the handle activation region are, in some embodiments associated with different user interface objects. For example, in one embodiment, the resizing handle is for a first user-repositionable user interface object (e.g., the resizing handle 6060 associated with handle activation region 6026 for the triangle user interface object 6005 in FIG. 6C) and the object activation region (e.g., 5008 in FIG. 6C) that is associated with the center portion of a user interface object is for a second user-repositionable user interface object (e.g., square 6002 in FIG. 6C) that is distinct from the first user-repositionable user interface object (e.g., 6005 in FIG. 6C).

In some embodiments, the first candidate action is selecting a first handle activation region and the second candidate actions is selecting a second handle activation region. In these embodiments, the first input (e.g., tap and hold gesture 6040 in FIG. 6B) is (932) at a position on the display that corresponds to a first activation region (e.g., 6020 in FIG. 5B) associated with a first resizing handle (e.g., 6060 in FIG. 5B) and is proximate to a second activation region (e.g., 6026 in FIG. 6B) associated with a second resizing handle; the position of the first input is closer to the first resizing handle than the second resizing handle; the first candidate action includes selecting the first resizing handle, as described in greater detail above with reference to FIG. 6B. In these embodiments, the third input (e.g., tap and hold gesture 6058 in FIG. 6C) is at a position on the display that corresponds to the first activation region (e.g., 6020 in FIG. 6C) associated with the first resizing handle and is proximate to the second activation region (e.g., 6026 in FIG. 6C) associated with the second resizing handle (e.g. 6060 in FIG. 6C). In this embodiment, the position of the third input (e.g., touch and hold gesture 6058 in FIG. 6C) is still closer to the first resizing handle than the second resizing handle, however the second candidate action includes selecting the second resizing handle (e.g., 6060 in FIG. 6C).

In other words, in these embodiments, without taking into account non-location factors (e.g. past cancellations), in response to the third input, the candidate action of selecting the first resizing handle would be higher on the second ordered list than the candidate action of selecting the second resizing handle. However, the second candidate action is selected in response to the third input because of the differences between the first ordering and the second ordering. In some embodiments, the ordering of the second plurality of candidate actions is different from the ordering of the first plurality of candidate actions because of the undoing/cancelling of the first candidate action (e.g., the first candidate action is removed from consideration when generating the second pluralities of candidate actions or the second candidate action is weighted so that it is lower in the order than other candidate actions). An advantage of adjusting the plurality of candidate actions after receiving a second input that corresponds to a request to undo a previous candidate action is that this adjustment improves the likelihood that when the device dynamically performs the second candidate action it is the candidate action that the user desires/intended to perform.

In some embodiments, the first candidate action is snapping the user interface object to a first guide and the second candidate action is snapping the user interface object to a second guide. In these embodiments, the first input (e.g., a contact at a contact location 6078-1 associated with an object activation region 6008 for a respective user interface object 6002 and subsequent movement 6080 as illustrated in FIG. 6E of the contact across the touch screen display to new contact location 6078-2 in FIG. 6F) corresponds (934) to a command to move a respective one of the plurality of user interface objects (e.g., 6002 in FIG. 6E) to a respective position (e.g., 6002 in FIG. 6F) on the display that is proximate to a first guide (e.g., 6082 in FIG. 6F) and a second guide (e.g., 6084 in FIG. 6F). In some embodiments, the respective position is also proximate to a third guide (e.g., 6086 in FIG. 6F) as discussed in greater detail below. As discussed in greater detail above, the device determines a first plurality of candidate action and a first order for the first plurality of candidate actions. For example, the first plurality of candidate actions includes, in order: (1) snap the user interface object 6002 to the first guide 6082, (2) snap the user interface object 6002 to the second guide 6084, and (3) snap the user interface object 6002 to the third guide 6086. In these embodiments, after being moved in accordance with the first input, the respective position of the user interface object (e.g., 6002 in FIG. 6F) is closer to the first guide 6082 than the second guide 6084, and the first candidate action includes snapping the user interface object to the first guide (e.g., the candidate action of the first plurality of candidate actions that is highest in the first order).

In some embodiments, after determining the first plurality of candidate actions and a first order for the first plurality of candidate actions, the device performs the top candidate action in the first order (e.g., by snapping the user interface object 6002 to the first guide 6082). For example, as illustrated in FIGS. 6G and 6F, after the first input ends (e.g., after the device ceases to detect contact 6078, as illustrated in FIG. 6G), the device automatically, without user intervention, moves 6088 the user interface object 6002 to the left so as to align one edge of the user interface object 6002 with the first guide 6082 (e.g., in FIG. 6G, the user interface object 6002 is not aligned with the first guide 6082, whereas in FIG. 6H, the user interface object 6002 has been aligned with the first guide 6082 by the device).

In some embodiments, the device detects a second input that corresponds to a request to undo the first candidate action (e.g., control+z or command+z), as discussed in greater detail above. The device undoes the first candidate action, and in some embodiments undoes any other action performed in response to the first input. In the present example, after receiving the second input, undoing other actions includes the device returning the user interface object 6002 to its initial location, as illustrated in FIG. 6I.

The device detects a third input (e.g., a contact 6090 at a contact location 6090-1 associated with an object activation region 6008 for the respective user interface object 6002 and subsequent movement 6092 in FIG. 6I of the contact 6090 across the touch screen display to new contact location 6090-2 in FIG. 6J) that is a repetition of the first input. The criteria for determining whether one input is a repetition of another input are discussed in greater detail above. In these embodiments, the third input corresponds to a command to move the respective user interface object (e.g., 6002 in FIG. 6I) to the same respective position on the display (e.g., the square user interface object 6002 in FIG. 6J is in the same position as the square user interface object 6002 in FIG. 6F). As discussed in greater detail above, the device determines a second plurality of candidate actions and a second order for the second plurality of candidate actions. For example, the second plurality of candidate actions includes, in order: (1) snap the user interface object 6002 to the second guide 6084, (2) snap the user interface object 6002 to the third guide 6086, and (3) snap the user interface object 6002 to the first guide 6082.

In these embodiments, after being moved in accordance with the first input, the respective position of the user interface object (e.g., 6002 in FIG. 6J) is still closer to the first guide 6082 than the second guide 6084, but the second candidate action of snapping the user interface object to the second guide is now first in the second order for the second plurality of candidate actions.

In other words, in these embodiments, without taking into account non-location factors (e.g., past cancellations), in response to the third input, the candidate action of snapping the user interface object to the first guide would be higher on the second ordered list than the candidate action of snapping the user interface object to the second guide. However, the second candidate action of snapping the user interface object to the second guide is selected in response to the third input because of the differences between the first ordering and the second ordering. In some embodiments, the ordering of the second plurality of candidate actions is different from the ordering of the first plurality of candidate actions because of the undoing/cancelling of the first candidate action (e.g., the first candidate action is removed from consideration when generating the second pluralities of candidate actions or the second candidate action is weighted so that it is lower in the order than other candidate actions). An advantage of adjusting the plurality of candidate actions after receiving a second input that corresponds to a request to undo a previous candidate action is that it improves the likelihood that when the device dynamically performs the second candidate action that it is the candidate action that the user desires/intended to perform.

In these embodiments, after determining the first plurality of candidate actions and a first order for the first plurality of candidate actions, the device performs the second candidate action (e.g., by snapping the user interface object 6002 to the second guide 6084, as illustrated in FIGS. 6K and 6L). For example, in FIGS. 6K and 6L, after the second input ends (e.g., after the device ceases to detect contact 6090, as illustrated in FIG. 6K), the device automatically, without user intervention, moves 6094 the user interface object 6002 to the right so as to align one edge of the user interface object 6002 with the second guide 6084 (e.g., in FIG. 6K, the user interface object 6002 is not aligned with the second guide 6084, whereas in FIG. 6L, the user interface object 6002 has been aligned with the second guide 6084 by the device).

In some embodiments, the device receives (936) a fourth input that corresponds to a request to undo the first candidate action (e.g., control+z or command+z), as described in greater detail above. In these embodiments, in response to the fourth input, the device undoes (938) or cancels the second action. In some embodiments, in response to the fourth input the device also undoes any other movement of the user interface object 6002 in accordance with the third input (e.g., by returning the user interface object 6002 to its initial location as illustrated in FIG. 6M).

In some embodiments, the device receives (940) a fifth input (e.g., a contact 6096 at a contact location 6096-1 associated with an object activation region 6008 for the respective user interface object 6002 and subsequent movement 6098 in FIG. 6M of the contact 6096 across the touch screen display to new contact location 6096-2 as illustrated in FIG. 6N) that is a repetition of the first input (e.g., contact 6078 and subsequent movement 6080 as illustrated in FIG. 6E) and the third input (e.g., contact 6090 and subsequent movement 6092 as illustrated in FIG. 6I). In some embodiments, the fifth input must be received within a predefined time period of the third input to be considered a repetition of the third input. Other criteria for determining if an input is a repetition of a previous input are discussed in greater detail above.

In some embodiments, the device determines, (942) based at least in part on the fifth input, a third plurality of candidate actions associated with one or more of the plurality of user interface objects. The third plurality of candidate actions are ordered in accordance with a third ordering that is different from the first ordering and the second ordering. A third candidate action in the third plurality of candidate actions is distinct from the first candidate action and the second candidate action and has a higher position than both the first candidate action and the second candidate action in the third ordering. For example, in some embodiments the second plurality of candidate actions includes, in order: (1) snap the user interface object 6002 to the third guide 6086, (2) snap the user interface object 6002 to the first guide 6082, and (3) snap the user interface object 6002 to the second guide 6084.

In these embodiments, the device performs (944) the third candidate action (e.g., by snapping the user interface object 6002 to the third guide 6086, as illustrated in FIGS. 6O and 6P). For example, in FIGS. 6O and 6P, after the second input ends (e.g., after the device ceases to detect contact 6096, as illustrated in FIG. 6O), the device automatically, without user intervention, moves 6100 the user interface object 6002 upwards so as to align one edge of the user interface object 6002 with the third guide 6086 (e.g., in FIG. 6O, the user interface object 6002 is not aligned with the third guide 6086, whereas in FIG. 6P, the user interface object 6002 has been aligned with the third guide 6086 by the device).

It should be understood that if the first candidate action and/or the second candidate action are removed from the third plurality of candidate actions, the first candidate action and/or second candidate action are effectively assigned the lowest position in the third plurality of candidate actions. Additionally, in some embodiments, there may be more than three candidate actions and more than three inputs (e.g., a sixth input, a seventh input, a eighth input, etc.) are detected and the ordering of a plurality of candidate actions is determined with each subsequent input. In other words, even if the exact same input is detected two, three, four or more times in a row, the device may perform a different action each time the input is received, depending on the ordering of the candidate actions. It should also be understood that, in some embodiments, one or more previously performed candidate actions are repeated after other candidate actions have been performed and undone in response to other user inputs.

Figure 10:
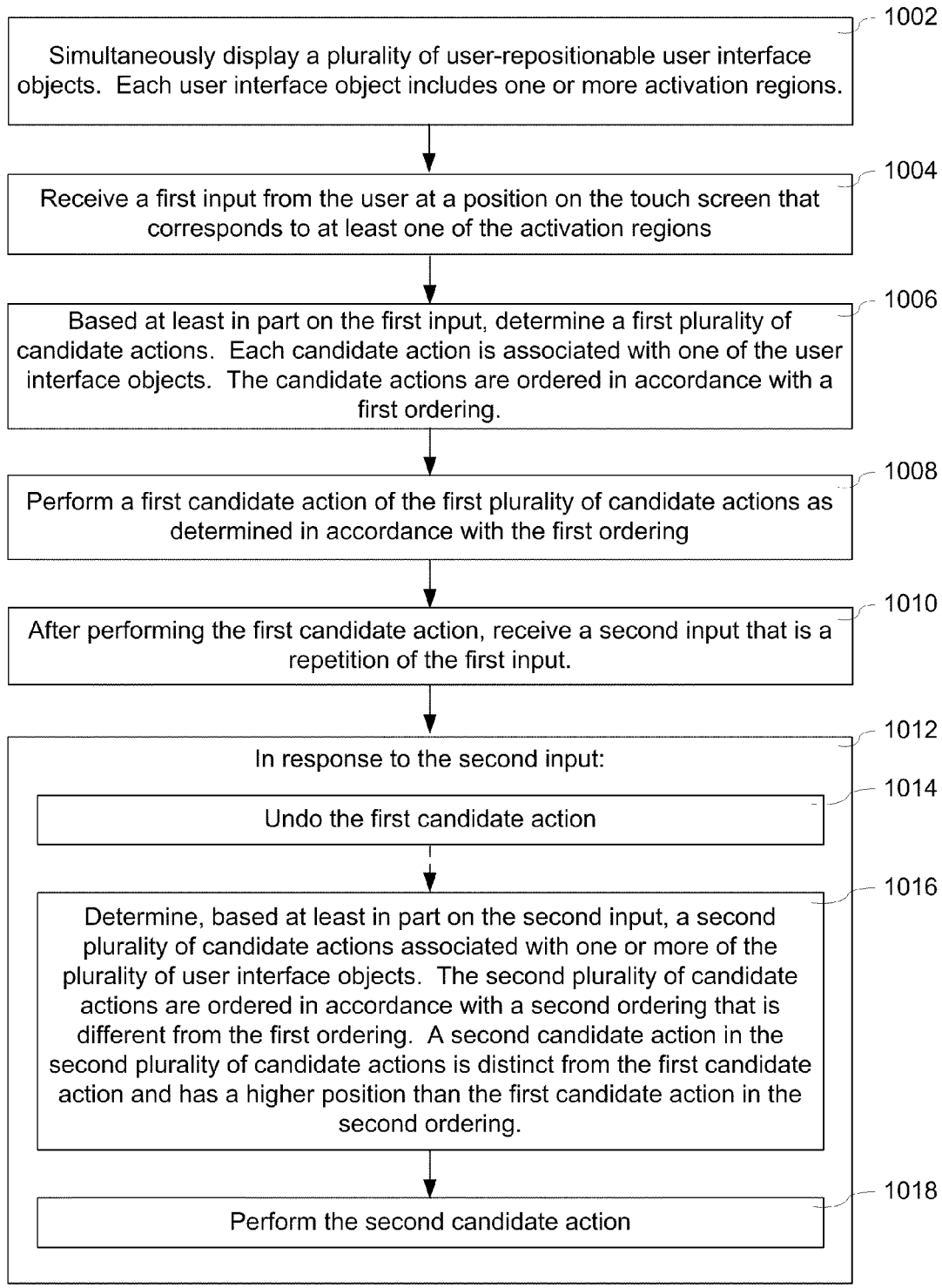
FIG. 10 is a flow diagram illustrating a method of selecting an alternative candidate action to perform in accordance with some embodiments.

FIG. 10 is a flow diagram illustrating a method 1000 of selecting an alternative candidate action to perform in accordance with some embodiments. The method 1000 is performed at a computing device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 1000 may be combined and/or the order of some operations may be changed.

As described below, the method 1000 provides an intuitive way to select a candidate action to perform based on previously canceled candidate actions. The method reduces the cognitive burden on a user by dynamically selecting a likely candidate action based on candidate actions that have been cancelled in the past, thereby creating a more efficient human-machine interface. For battery-operated computing devices, enabling a user to perform the desired candidate action faster and more efficiently conserves power and increases the time between battery charges.

The device simultaneously displays (1002) a plurality of user-repositionable user interface objects (e.g., 6002, 6005 and 6006 in FIG. 6A). Each user interface object includes one or more activation regions (e.g., object activation region 6008 and handle activation regions 6010, 6012, 6014, 6016, 6018, 6020, 6022, 6024, 6026, 6028, 6030, 6032, 6034, 6036 and 6038 in FIG. 6A). In some embodiments, a user interface object is user-repositionable if it is moveable in to an arbitrary position on the display, relative to other displayed objects, in response to user inputs. For example, if a user selects a repositionable user interface object 6002 and drags it in a respective direction (e.g., as illustrated in FIGS. 6E-6F), the repositionable user interface object 6002 moves in the respective direction. Conversely, the keys on a soft keyboard are not user-repositionable user interface objects, even if the keyboard layout changes from a first predefined layout (e.g., QWERTY) to a second predefined layout (e.g., DVORAK) in response to a user input. In some embodiments, the objects are non-overlapping, or at least the portion of the user interface objects proximate to the first input is non-overlapping.

The device receives (1004) a first input (e.g., tap and hold gesture 6040 in FIG. 6B) from the user at a position on the touch screen that corresponds to at least one of the activation regions (e.g., 6020 in FIG. 6B). Based at least in part on the first input (e.g., tap and hold gesture 6040 in FIG. 6B), the device determines (1006) a first plurality of candidate actions. Each candidate action in the first plurality of candidate actions is associated with one of the user interface objects and the candidate actions are ordered in accordance with a first ordering. As one example, the first plurality of candidate actions includes, in order (1) select a resize handle associated with a handle activation region 6020 for the square, (2) select a resize handle associated with a handle activation region 6026 for the triangle, (3) select an object associated with object activation region 6008 for the square, and (4) select a resize handle associated with a handle activation region 6038 for the circle.

The device performs (1008) a first candidate action (e.g., selecting a resize handle 6052 associated with a handle activation region 6020 for the square) of the first plurality of candidate actions as determined in accordance with the first ordering. In some embodiments, the input includes a position on the display (e.g., the centroid of a tap and hold gesture 6040 on a touch screen display 112), and the ordering of the candidate actions is based on the distance of one or more predefined portions of the user interface objects from the position of the input (e.g., the handle activation region 6020 for the square is closest to the centroid of the tap and hold gesture 6040, while the handle activation region 6026 for the triangle is second closest to the centroid of the tap and hold gesture 6040, the object activation region 6008 for the square is third closest to the centroid of the tap and hold gesture 6040, and the handle activation region 6038 is fourth closest to the centroid of the tap and hold gesture 6040 in FIG. 6B). In some embodiments, the ordering includes a weight that is based on properties of the input other than the position of the input (e.g., the layer of each of the user interface objects associated with the candidate actions, whether the user interface object associated with a candidate action is currently selected, whether the user interface object associated with a candidate action has recently been used, a number of sides for a shape of the user interface object associated with a candidate action, a transparency value of the user interface object associated with a candidate action, and/or whether the candidate action was previously selected by the user, etc.)

After performing the first candidate action, the device receives (1010) a second input (e.g., tap and hold gesture 6058 in FIG. 6C) that is a repetition of the first input. In some embodiments, the second input must be received within a predefined time period (e.g., 10 seconds or less) in order to be considered a repetition of the first input, criteria for determining whether a second input is a repetition of a first input are discussed in greater detail above with reference to FIGS. 9A-9D. In some embodiments, instead of receiving the third input within a predefined period of time, the device receives the third input before some other predefined event has occurred (e.g., before the current selection changes, or before a currently displayed subset of content is replaced with a different displayed subset of content either by scrolling through the displayed content or navigating to a different subset of content such as a next page or a next slide). In accordance with some embodiments, a third input is substantially the same as the first input if the same user interface object has been moved by the first input and the third input or if the same third input is located at approximately the same location as the first input. In response (1012) to the second input, the device undoes (1014) or cancels the first candidate action (e.g., the device deselects the resize handle 6052 of the square user interface object 5002, as illustrated in FIG. 6C, where resize handle 6052 is not selected and is also not displayed). The device determines (1016), based at least in part on the second input (e.g., tap and hold gesture 6058 in FIG. 6C), a second plurality of candidate actions associated with one or more of the plurality of user interface objects. The second plurality of candidate actions are ordered in accordance with a second ordering that is different from the first ordering. Additionally, a second candidate action in the second plurality of candidate actions is distinct from the first candidate action and has a higher position than the first candidate action in the second ordering. As one example, for the situation shown in FIG. 6C, the second plurality of candidate actions includes, in order: (1) select a resize handle associated with a handle activation region 6026 for the triangle, (2) select an object associated with object activation region 6008 for the square, (3) select a resize handle associated with a handle activation region 6038 for the circle, and (4) select a resize handle associated with a handle activation region 6020 for the square. It should be understood that if the first action is removed from the second plurality of candidate actions, the first candidate action effectively is assigned the lowest position in the second plurality of candidate actions. In other words, in some embodiments, even if the exact same action is detected twice in a row, the device will perform a different action.

The device performs (1018) the second candidate action (e.g., selecting a resize handle 6060 associated with a handle activation region 6026 for the triangle user interface object 6005 in FIG. 6C).

Note that details of the processes described above with respect to method 900 (e.g., FIGS. 9A-9D, and 6A-6P) are also applicable in an analogous manner to the method 1000. For example, the first candidate action and the second candidate action described with reference to FIG. 10 may have one or more of the characteristics of the various candidate actions described above with reference to method 900. Additionally, as described above in greater detail with reference to method 900, it should be understood that, in some embodiments, there may be more than two candidate actions and more than two inputs and a plurality of candidate actions (and an associated ordering) is determined for each subsequent input, the primary difference being that no explicit cancellation/undo input is received by the device. For brevity, these details are not repeated here.

Figure 11A:
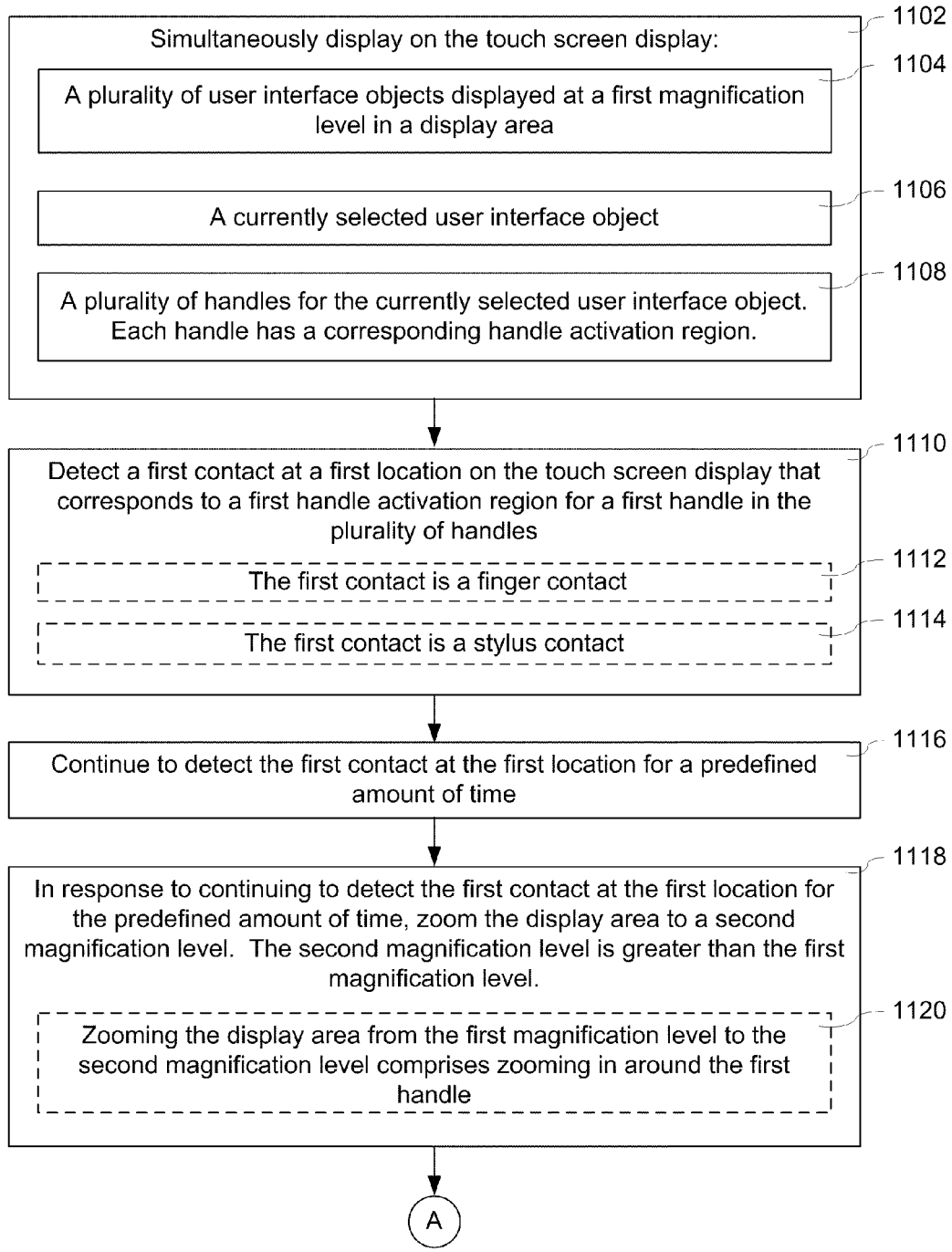
FIGS. 11A-11C are flow diagrams illustrating a method of automatically zooming a display area to finely manipulate a user interface object in accordance with some embodiments.
Figure 11B:
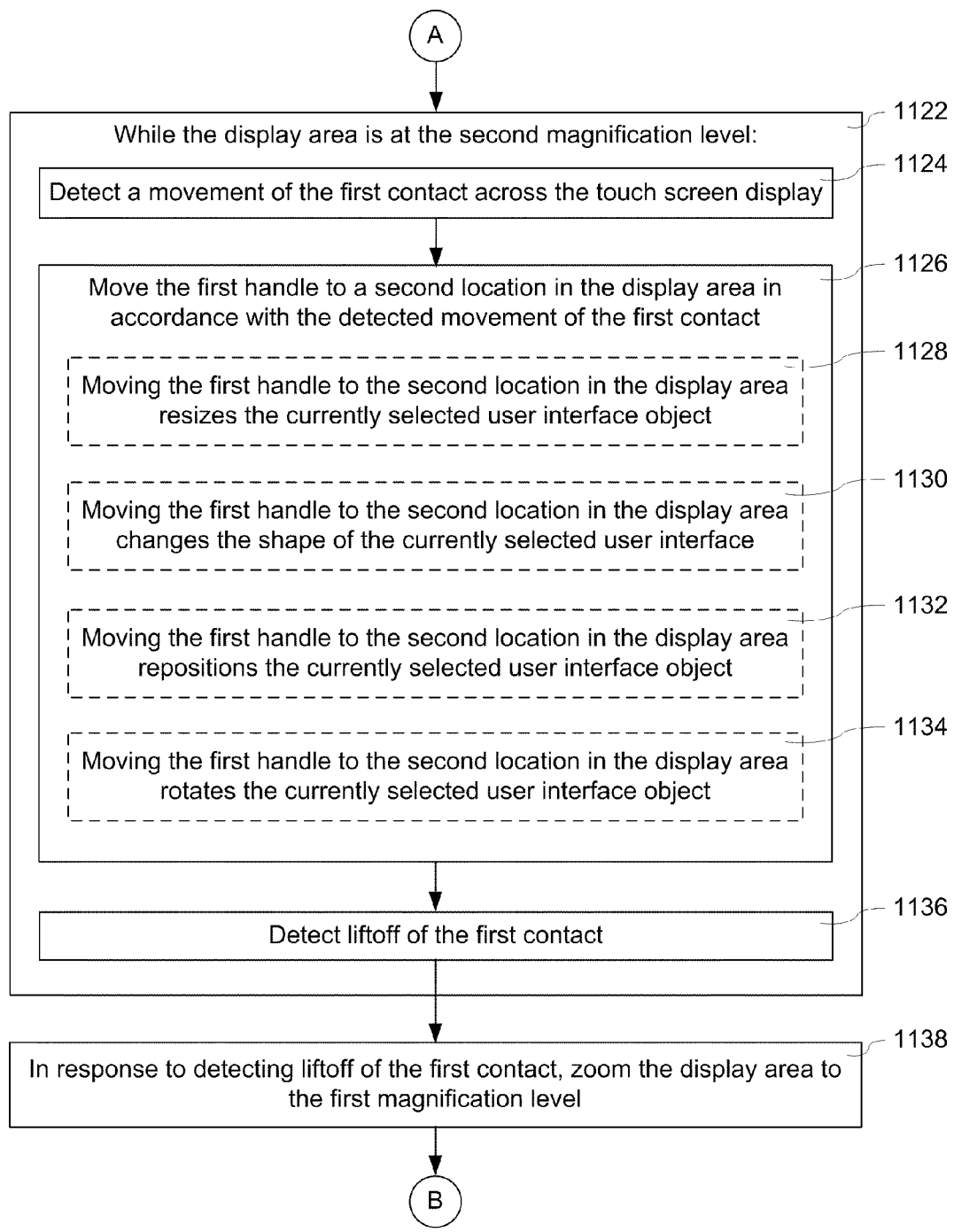
Figure 11C:
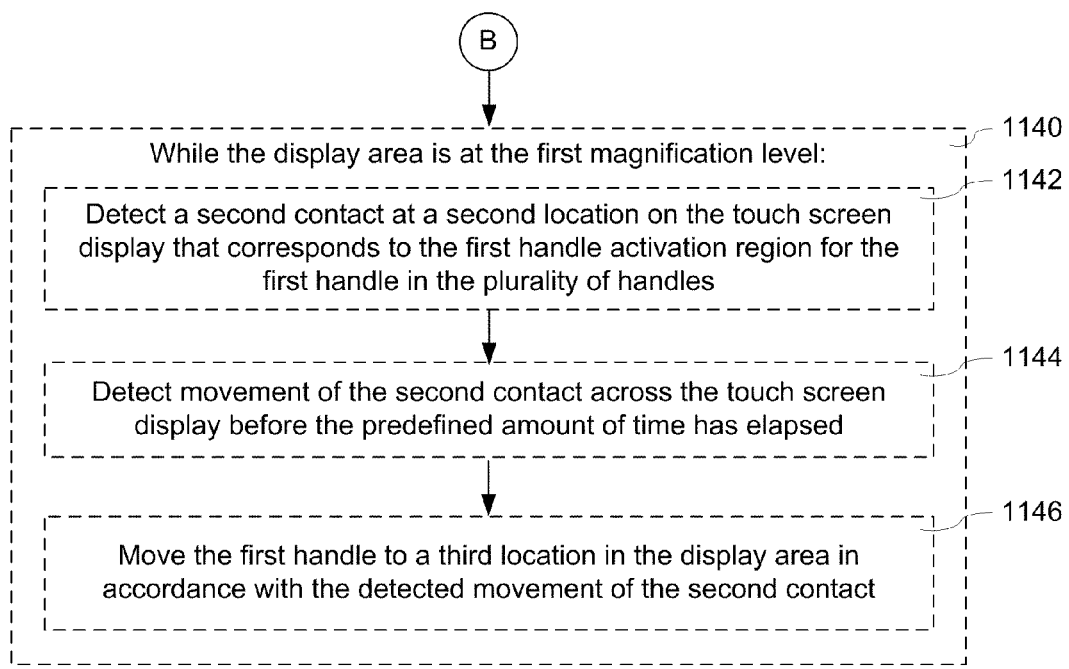

FIGS. 11A-11C are flow diagrams illustrating a method 1100 of automatically zooming a display area to finely manipulate a user interface object in accordance with some embodiments. The method 1100 is performed at a computing device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 1100 may be combined and/or the order of some operations may be changed.

As described below, the method 1100 provides an intuitive way to automatically zoom a display area to finely manipulate a user interface object. The method reduces the cognitive burden on a user when zooming a display area to finely manipulate a user interface object, thereby creating a more efficient human-machine interface. For battery-operated computing devices, enabling a user to zoom a display area to finely manipulate a user interface object faster and more efficiently conserves power and increases the time between battery charges.

The device simultaneously displays (1102) on the touch screen display: a plurality of user interface objects (1104) (e.g., 7002, 7005, and 7006 in FIGS. 7A-7G) displayed at a first magnification (e.g., 100%) level in a display area (e.g., 7007 in FIGS. 7A-7G) on the display (e.g., 112 in FIGS. 7A-7G). In some embodiments the display area 7007 is a workspace of a current application that is distinct from a command or information region of the touch screen display. In some embodiments, a zoom indicator (e.g., 7008-*a*) is displayed in a command or information region of the touch screen display, and the zoom indicator indicates the current magnification level of the display area on the display (e.g., in FIGS. 7A-7B, the current magnification level of the display area is 100%). In some embodiments, in response to an input by the user (e.g., a finger tap gesture 7009 by a user on a location on the touch screen display that corresponds to the object 7005-*a* in FIG. 7A), the device selects the user interface object (e.g., 7005-*a* in FIG. 7B).

The device simultaneously displays the user interface objects (e.g., 7002, 7006 and 7005 in FIG. 7B) including the currently selected user interface object (1106) (e.g., 7005-*a* in FIG. 7B), which is displayed simultaneously with a plurality of handles (1108) (e.g., 7010, 7012 and 7014 in FIG. 7B-7G) for the currently selected user interface object (e.g., 7005-*a* in FIG. 7B). Each handle has a corresponding handle activation region (e.g., handle 7010 has activation region 7016, handle 7012 has activation region 7018, and handle 7014 has activation region 7020 in FIGS. 7B-7C and 7E-7G, while handle 7010 has activation region 7016, and handle 7014 has activation region 7020 in FIG. 7D). It should be understood that these activation regions may have some or all of the properties of the handle activation regions discussed in greater detail above with reference to FIGS. 5A-5J and 6A-6P.

The device detects (1110) a first contact (e.g., contact 7022 at a first contact location 7022-1 in FIG. 7B) at or in a first location on the touch screen display that corresponds to a first handle activation region (e.g., 7016 in FIG. 7B) for a first handle (e.g., 7010 in FIG. 7B) in the plurality of handles (e.g., this contact is a finger contact on a handle activation region that corresponds to a resizing handle of the currently selected user interface object on the touch screen display). In some embodiments, the first contact is (1112) a finger contact. In some embodiments, the first contact is (1114) a stylus contact. It should be understood that, in some embodiments, the above method is performed using an alternative user input device, such as a mouse or touch pad. For example, instead of a first contact, the device detects a mouse-down event while a cursor is over the first handle activation region; instead of detecting movement of the second contact, the device detects movement of the cursor from the first location to a second location; and instead of detecting liftoff the contact, the device detects a mouse-up event (e.g., release of the mouse button).

The device continues (1116) to detect the first contact at the first location for a predefined amount of time (e.g., 0.1, 0.5, 1, or 2 seconds). In some embodiments, the first contact is substantially stationary (e.g., detected movement of the first input is less than a predefined amount). In response to continuing to detect the first contact at the first location for the predefined amount of time, the device zooms (1118) the display area to a second magnification level (e.g., 200%). The second magnification level is greater than the first magnification level. In some embodiments, the magnification level of the command or information area is not zoomed in. In some embodiments, the zoom indicator (e.g., 7008-*b*) is displayed, and the zoom indicator indicates the current magnification level of the display area on the display (e.g., in FIGS. 7C-7D, the current magnification level of the display area is 200%). In some embodiments, zooming the display area from the first magnification level to the second magnification level comprises (1120) zooming in around the first handle (e.g., in FIG. 7C, the first handle 7010 is in the same location in the display area that the first handle 7010 was located in previously in FIG. 7B).

In some embodiments, operations 1124-1136 are performed while the display area is (1122) at the second magnification level (e.g., 200%). The device detects (1124) a movement of the first contact across the touch screen display (e.g., movement 7024 of the contact 7022 from a first contact location 7022-1 in FIG. 7C to a second contact location 7022-2 in FIG. 7D). It should be understood that movement of the contact while the display area is at the second, higher magnification level ("zoomed in") allows the user to have finer control over the movement of the first resizing handle. Thus, "zooming in" results in greater accuracy (e.g., "sub-pixel accuracy") for resizing and otherwise manipulating the user interface object 7005. Moreover, because the device "zooms in" automatically, the user is not required to perform a discrete command to change the magnification level after selecting the handle, and consequently can modify the user interface object more quickly and efficiently.

The device moves (1126) the first handle (e.g., 7010 in FIG. 7D) to a second location in the display area in accordance with the detected movement of the first contact (e.g., 7022 in FIGS. 7C-7D). In some embodiments, moving the first handle to the second location in the display area resizes (1128) the currently selected user interface object (e.g., 7005 in FIGS. 7C-7D). In some embodiments, the user interface object is resized without changing the shape of the user interface object. In some embodiments, moving the first handle to the second location in the display area changes (1130) the shape of the currently selected user interface object. As one example, the first handle is a handle for moving a single side of the currently selected user interface object. Alternatively, the first handle is a handle for changing the curvature of a perimeter of the currently selected user interface object. As another example, in FIG. 7C, before the movement is detected, the user interface object (e.g., 7005-*a* in FIG. 7D), has a first shape (e.g., the user interface object is a triangle with a base of a first length) while in FIG. 7D, after the movement is detected, the user interface object (e.g., 7005-*b* in FIG. 7D) has a second shape (e.g., the user interface object is a triangle with a base of a second length that is different from the first length). In some embodiments, moving the first handle to the second location in the display area repositions (1132) the currently selected user interface object (e.g., the first handle is a handle for translating the entire object). In some embodiments, moving the first handle to the second location in the display area rotates (1134) the currently selected user interface object (e.g., the first handle is an object rotation handle).

The device detects (1136) liftoff of the first contact (e.g., in FIG. 7E, after detecting the movement of the contact to contact location 7022-2, the device detects a liftoff of contact 7022 and transitions to the user interface displayed in FIG. 7E). In response to detecting liftoff of the first contact (e.g., automatically, without other intervening user inputs), the device zooms (1138) the display area to the first magnification level (e.g., the display area is "zoomed out" to the previous zoom level 100%, as illustrated in FIG. 7E). In some embodiments, the zoom indicator (e.g., 7008-*a*) is displayed, and the zoom indicator indicates the current magnification level of the display area on the display (e.g., in FIGS. 7E-7G, the current magnification level of the display area is 100%).

It should be understood that this process provides faster, more efficient, and more precise manipulation of a handle (e.g., resize handle 7010) for a user interface object (e.g., 7005 in FIGS. 7A-7E). To provide finer control, the display area is automatically "zoomed in" (e.g., when a user contact is paused over a resizing handle) and when the user is done with the finer control (e.g., when the user lifts up the contact) the display area is automatically "zoomed out" to the previous magnification level. This process is advantageous, because it replaces multiple discrete user gestures (e.g., discrete gestures to "select," "zoom-in," "move," and "zoom-out") with a gesture input that uses a single continuous contact with the touch screen display to smoothly and intuitively provide inputs instructing the device to perform these operations.

In some embodiments, operations 1142-1146 are performed while (1140) the display area is at the first magnification level (e.g., 100%). In some embodiments, the device detects (1142) a second contact (e.g., 7026 in FIG. 7F) at a second location (e.g., 7026-1 in FIG. 7F) on the touch screen display that corresponds to the first handle activation region (e.g., 7016 in FIG. 7F) for the first handle (e.g., 7010 in FIG. 7F) in the plurality of handles (e.g., 7010, 7012, and 7016 in FIG. 7F). In some embodiments, the second contact (e.g., 7026 in FIG. 7F) is detected before the first contact (e.g., 7022 in FIG. 7B). In some embodiments, the second contact (e.g., 7026 in FIG. 7F) is detected after the gesture made with the first contact (e.g., 7022 in FIGS. 7B-7D). In other words, the user interface object can be modified with the automatic zooming or modified without the automatic zooming in any order.

In some embodiments, the device detects (1144) movement of the second contact across the touch screen display before the predefined amount of time has elapsed (e.g., movement 7028 of the contact 7026 from a first contact location 7026-1 in FIG. 7F to a second contact location 7026-2 in FIG. 7G). In some embodiments, the second contact (e.g., 7026 in FIGS. 7F-7G) moves more than a predefined amount from the second location (e.g., initial position of the second contact 7026-1 in FIG. 7F). In some embodiments, the device moves (1146) the first handle (e.g., 7010 in FIG. 7F) to a third location (e.g., 7010 in FIG. 7G) in the display area (e.g., 7007 in FIG. 7F) in accordance with the detected movement of the second contact (e.g., the movement 7028 of contact 7026 to contact location 7026-2 in FIG. 7G). In other words, when the contact moves more than a predefined amount (e.g., distance) within the predefined amount of time, there is no zooming in. The initial movement indicates that the user is not trying to precisely position the first handle. An advantage of not automatically zooming the display area when the user starts moving the contact within a predetermined period of time is that if the user starts moving the contact with the predetermined period of time, it is likely that the user does not need fine control of the modification of the user interface object, and increasing the magnification level is likely to be confusing to the user and possibly hide the position on the display to which the user would like to move the contact. Thus, not automatically zooming the display area when the user starts moving the contact within a predetermined period of time increases the efficiency of manipulation of user interface objects by the user.

The steps in the information processing methods described above may be implemented by running one or more functional modules in an information processing apparatus such as general purpose processors or application specific chips. These modules, combinations of these modules, and/or their combination with general hardware (e.g., as described above with respect to FIGS. 1A, 1B and 3) are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
at a computing device with a display:
simultaneously displaying on the display:
a plurality of user interface objects, wherein at least some of the user interface objects are configured to be resizable;
a currently selected user interface object; and
a plurality of resizing handles for the currently selected user interface object, wherein each respective resizing handle has a corresponding handle activation region with a default position relative to the respective resizing handle, a default size distinct from a displayed size of the respective resizing handle, and a default shape;
detecting a first input on a first handle activation region for a first resizing handle in the plurality of resizing handles;
in response to detecting the first input:
resizing the currently selected user interface object; and
for at least one resizing handle in the plurality of resizing handles, modifying a corresponding handle activation region by changing the position of the handle activation region relative to the resizing handle from the default position to a modified position and changing the size of the handle activation region from the default size to a modified size.

2. The method of claim 1, wherein the display is a touch screen display and the first input is a gesture on the touch screen display.

3. The method of claim 1, further comprising:
in response to detecting the first input:
for at least one resizing handle in the plurality of resizing handles, modifying a corresponding handle activation region by:
changing the shape of the handle activation region from the default shape to a modified shape.

4. The method of claim 1, wherein:
the default size is a predefined size; and
the modified size is determined such that when the corresponding handle activation region is modified, the corresponding handle activation region includes at least some of the corresponding resizing handle without overlapping with any of the other handle activation regions.

5. The method of claim 1, wherein the modified size is at least a minimum predefined size.

6. The method of claim 1, wherein the corresponding handle activation region has an inner boundary that is proximate to the center of the currently selected user interface object and an outer boundary that is remote from the center of the currently selected user interface object, and:
for the default shape, the inner boundary is equal in length to the outer boundary; and
for the modified shape, the inner boundary is shorter than the outer boundary.

7. The method of claim 3, wherein the default shape of the corresponding handle activation region is rectangular and the modified shape of the corresponding handle activation region is a truncated pie wedge.

8. The method of claim 1, wherein the currently selected user interface object has a center, and modifying a corresponding handle activation region by changing the position of the handle activation region relative to the resizing handle from the default position to a modified position comprises:
when the currently selected object is resized to a smaller size, moving the position of the handle activation region towards the center of the currently selected user interface object by an amount that is less than movement of the position of the corresponding resizing handle towards the center of the currently selected user interface object.

9. The method of claim 1, wherein the currently selected user interface object includes an object activation region that includes the center of the currently selected user interface object.

10. The method of claim 9, wherein the object activation region is entirely within a perimeter of the currently selected user interface object.

11. The method of claim 1, wherein each of the handle activation regions is partially outside a perimeter of the currently selected user interface object and partially inside the perimeter of the currently selected user interface object, but covers only a subregion of the interior of the currently selected user interface object.

12. The method of claim 1, wherein a perimeter of the currently selected user interface object intersects with a perimeter of each respective handle activation regions at exactly two points.

13. The method of claim 1, wherein,
prior to resizing the currently selected user interface object:
the currently selected user interface object includes an object activation region with a centroid that is located in a predefined location relative to the center of the currently selected user interface object; and
a centroid of a respective default handle activation region is located at the center of a corresponding resizing handle; and
after resizing the currently selected user interface object:
the centroid of the object activation region is maintained at the predefined location relative to the center of the currently selected user interface object; and
the centroid of the respective default handle activation region is located away from the center of the corresponding resizing handle.

14. The method of claim 1, wherein, in response to detecting the first input, multiple handle activation regions that correspond to multiple resizing handles in the plurality of resizing handles are modified by changing the position of a respective handle activation region relative to a respective resizing handle from a respective default position to a respective modified position.

15. The method of claim 1, wherein, in response to detecting the first input, each and every handle activation region that corresponds to a resizing handle in the plurality of resizing handles is modified by changing the position of a respective handle activation region relative to a respective resizing handle from a respective default position to a respective modified position.

16. A graphical user interface on a computing device with a display, the graphical user interface comprising:

a plurality of user interface objects, wherein at least some of the user interface objects are configured to be resizable;
a currently selected user interface object; and
a plurality of resizing handles for the currently selected user interface object, wherein each respective resizing handle has a corresponding handle activation region with a default position relative to the respective resizing handle, a default size distinct from a displayed size of the respective resizing handle, and a default shape;
a first input is detected on a first handle activation region for a first resizing handle in the plurality of resizing handles;
in response to detecting the first input:
the currently selected user interface object is resized; and
for at least one resizing handle in the plurality of resizing handles, a corresponding handle activation region is modified by changing the position of the handle activation region relative to the resizing handle from the default position to a modified position and changing the size of the handle activation region from the default size to a modified size.

17. A computing device, comprising:
a display;
one or more processors;
memory; and
one or more programs, wherein the one or more programs are stored in the memory and configured to be executed by the one or more processors, the one or more programs including instructions for:
simultaneously displaying on the display:
a plurality of user interface objects, wherein at least some of the user interface objects are configured to be resizable;
a currently selected user interface object; and
a plurality of resizing handles for the currently selected user interface object, wherein each respective resizing handle has a corresponding handle activation region with a default position relative to the respective resizing handle, a default size distinct from a displayed size of the respective resizing handle, and a default shape;
detecting a first input on a first handle activation region for a first resizing handle in the plurality of resizing handles; and
in response to detecting the first input:
resizing the currently selected user interface object; and
for at least one resizing handle in the plurality of resizing handles, modifying a corresponding handle activation region by changing the position of the handle activation region relative to the resizing handle from the default position to a modified position and changing the size of the handle activation region from the default size to a modified size.

18. A non-transitory computer readable storage medium storing one or more programs, the one or more programs comprising instructions, which when executed by a computing device with a display, cause the device to:
simultaneously display on the display:
a plurality of user interface objects, wherein at least some of the user interface objects are configured to be resizable;
a currently selected user interface object; and
a plurality of resizing handles for the currently selected user interface object, wherein each respective resizing handle has a corresponding handle activation region with a default position relative to the respective resizing handle, a default size distinct from a displayed size of the respective resizing handle, and a default shape;
detect a first input on a first handle activation region for a first resizing handle in the plurality of resizing handles; and
in response to detecting the first input:
resize the currently selected user interface object; and
for at least one resizing handle in the plurality of resizing handles, modify a corresponding handle activation region by changing the position of the handle activation region relative to the resizing handle from the default position to a modified position and changing the size of the handle activation region from the default size to a modified size.

19. A method, comprising:
at a computing device with a display:
simultaneously displaying on the display:
a plurality of user interface objects, wherein at least some of the user interface objects are configured to be resizable;
a currently selected user interface object; and
a plurality of resizing handles for the currently selected user interface object, wherein each respective resizing handle has a corresponding handle activation region with a default position relative to the respective resizing handle, a default size distinct from a displayed size of the respective resizing handle, and a default shape;
detecting a first input on a first handle activation region for a first resizing handle in the plurality of resizing handles;
in response to detecting the first input:
resizing the currently selected user interface object; and
for at least one resizing handle in the plurality of resizing handles, modifying a corresponding handle activation region by changing the position of the handle activation region relative to the resizing handle from the default position to a modified position and changing the shape of the handle activation region from the default shape to a modified shape.

20. A graphical user interface on a computing device with a display, the graphical user interface comprising:
a plurality of user interface objects, wherein at least some of the user interface objects are configured to be resizable;
a currently selected user interface object; and
a plurality of resizing handles for the currently selected user interface object, wherein each respective resizing handle has a corresponding handle activation region with a default position relative to the respective resizing handle, a default size distinct from a displayed size of the respective resizing handle, and a default shape;
a first input is detected on a first handle activation region for a first resizing handle in the plurality of resizing handles;
in response to detecting the first input:
the currently selected user interface object is resized; and
for at least one resizing handle in the plurality of resizing handles, a corresponding handle activation region is modified by changing the position of the handle activation region relative to the resizing handle from the default position to a modified position and changing the shape of the handle activation region from the default shape to a modified shape.

21. A computing device, comprising:
a display;
one or more processors;
memory; and
one or more programs, wherein the one or more programs are stored in the memory and configured to be executed by the one or more processors, the one or more programs including instructions for:
  simultaneously displaying on the display:
    a plurality of user interface objects, wherein at least some of the user interface objects are configured to be resizable;
    a currently selected user interface object; and
    a plurality of resizing handles for the currently selected user interface object, wherein each respective resizing handle has a corresponding handle activation region with a default position relative to the respective resizing handle, a default size distinct from a displayed size of the respective resizing handle, and a default shape;
  detecting a first input on a first handle activation region for a first resizing handle in the plurality of resizing handles; and
  in response to detecting the first input:
    resizing the currently selected user interface object; and
    for at least one resizing handle in the plurality of resizing handles, modifying a corresponding handle activation region by changing the position of the handle activation region relative to the resizing handle from the default position to a modified position and changing the shape of the handle activation region from the default shape to a modified shape.

22. A non-transitory computer readable storage medium storing one or more programs, the one or more programs comprising instructions, which when executed by a computing device with a display, cause the device to:
  simultaneously display on the display:
    a plurality of user interface objects, wherein at least some of the user interface objects are configured to be resizable;
    a currently selected user interface object; and
    a plurality of resizing handles for the currently selected user interface object, wherein each respective resizing handle has a corresponding handle activation region with a default position relative to the respective resizing handle, a default size distinct from a displayed size of the respective resizing handle, and a default shape;
  detect a first input on a first handle activation region for a first resizing handle in the plurality of resizing handles; and
  in response to detecting the first input:
    resize the currently selected user interface object; and
    for at least one resizing handle in the plurality of resizing handles, modify a corresponding handle activation region by changing the position of the handle activation region relative to the resizing handle from the default position to a modified position and changing the shape of the handle activation region from the default shape to a modified shape.

* * * * *